US012710852B2

(12) United States Patent
Lim

(10) Patent No.: US 12,710,852 B2
(45) Date of Patent: Aug. 18, 2026

(54) ELECTRONIC DEVICE COMPRISING DISPLAY LAYER AND SENSOR LAYER

(71) Applicant: Samsung Display Co., Ltd., Yongin-si (KR)

(72) Inventor: Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/034,361

(22) Filed: Jan. 22, 2025

(65) Prior Publication Data

US 2025/0264967 A1 Aug. 21, 2025

(30) Foreign Application Priority Data

Feb. 20, 2024 (KR) ........................ 10-2024-0023921

(51) Int. Cl.
*G06F 3/044* (2006.01)
*G06F 3/041* (2006.01)

(52) U.S. Cl.
CPC ...... *G06F 3/0446* (2019.05); *G06F 3/041662* (2019.05); *G06F 3/0443* (2019.05); *G06F 2203/04106* (2013.01); *G06F 2203/04111* (2013.01); *G06F 2203/04112* (2013.01)

(58) Field of Classification Search
CPC ............. G06F 3/0443; G06F 3/041662; G06F 3/0446; G06F 2203/04112; G06F 2203/04111; G06F 2203/04106
See application file for complete search history.

(56) References Cited

U.S. PATENT DOCUMENTS 11,625,118 B2 4/2023 Kim et al.
11,782,550 B2 10/2023 Cho et al.
11,989,368 B2 5/2024 Li
2022/0404931 A1* 12/2022 Kim .................... G06F 3/04164
2023/0116927 A1* 4/2023 Lee ....................... G06F 3/0446
2023/0118885 A1* 4/2023 Rhe ....................... G06F 3/0412 345/173
2025/0021182 A1* 1/2025 Kim .................... G06F 3/04162

FOREIGN PATENT DOCUMENTS

CN 115113764 A 9/2022
KR 10-2020-0060601 A 6/2020
KR 10-2022-0062191 A 5/2022

* cited by examiner

*Primary Examiner* — Deeprose Subedi
(74) *Attorney, Agent, or Firm* — Womble Bond Dickinson (US) LLP

(57) ABSTRACT

An electronic device includes a display layer including a display area and a non-display area adjacent to the display area and a sensor layer on the display layer. The sensor layer includes a plurality of first electrodes arranged in a first direction, a plurality of second electrodes arranged in a second direction intersecting the first direction and intersecting the first electrodes, a plurality of first auxiliary electrodes arranged in the first direction and overlapping the first electrodes, a plurality of second auxiliary electrodes arranged in the second direction and overlapping the second electrodes, and an auxiliary trace line electrically connected to at least one second auxiliary electrode among the second auxiliary electrodes. At least a portion of the auxiliary trace line overlaps the display area.

35 Claims, 42 Drawing Sheets

ATL
DMP
230p1
240ms2
240t
240ms1
230p2
CNc
DMP
240ms1-e
240ms1-l
CDR1
DR1
DR2
CDR2
DR3

FIG. 12B

210-SP
210ms1
210ms2
210-SP
230pb
CNc
CDR1
DR1
DR2
DR3
CDR2

210-SP
210ms1
210ms2
230p1
DMP
DMP
240ms2
240t
240ms1
230p2
230pb
CNc
240ms1-e
240ms1-l
CDR1
DR1
DR2
CDR2
DR3

ELECTRONIC DEVICE COMPRISING DISPLAY LAYER AND SENSOR LAYER

CROSS-REFERENCE TO RELATED APPLICATION

The present application claims priority to and the benefit of Korean Patent Application No. 10-2024-0023921, filed on Feb. 20, 2024, in the Korean Intellectual Property Office, the entire disclosure of which is incorporated herein by reference.

BACKGROUND

1. Field

Aspects of some embodiments of the present disclosure relate to an electronic device capable of sensing an input generated by a pen.

2. Description of Related Art

Multimedia electronic devices, such as televisions, mobile phones, tablet computers, notebook computers, navigation units, and game units, include a display device to display images. The electronic device may include a sensor layer (or an input sensor) that provides a touch-based input method allowing users to relatively easily and intuitively input information or commands in addition to the usual input methods, such as a button, a keyboard, a mouse, etc. The sensor layer senses a touch or pressure generated by a user's body. Meanwhile, consumer demand for the use of a pen is increasing for users who are familiar with inputting information using a writing instrument or for specific application programs (e.g., for sketching or drawing application programs) that require detailed and precise touch input.

The above information disclosed in this Background section is only for enhancement of understanding of the background and therefore the information discussed in this Background section does not necessarily constitute prior art.

SUMMARY

Aspects of some embodiments of the present disclosure include an electronic device capable of sensing an input generated by a pen.

Aspects of some embodiments of the present disclosure include an electronic device including a display layer including a display area defined therein and a non-display area defined therein and adjacent to the display area, and a sensor layer located on the display layer. According to some embodiments, the sensor layer includes a plurality of first electrodes arranged in a first direction, a plurality of second electrodes arranged in a second direction intersecting the first direction and intersecting the plurality of first electrodes, a plurality of third electrodes arranged in the first direction and overlapping the plurality of first electrodes, a plurality of fourth electrodes arranged in the second direction and overlapping the plurality of second electrodes, and an auxiliary trace line electrically connected to at least one fourth electrode among the plurality of fourth electrodes. According to some embodiments, at least a portion of the auxiliary trace line overlaps the display area.

According to some embodiments, the auxiliary trace line includes a first portion extending from the at least one fourth electrode and overlapping the non-display area, a second portion extending from the first portion and overlapping the display area, and a third portion extending from the second portion and overlapping the non-display area.

According to some embodiments, at least one third electrode among the plurality of third electrodes includes a first electrode portion, a second electrode portion, and an auxiliary bridge electrically connected to the first electrode portion and the second electrode portion. According to some embodiments, the first electrode portion and the second electrode portion are spaced apart from each other with the auxiliary trace line interposed therebetween in the second direction, and the auxiliary trace line is insulated from the auxiliary bridge while intersecting the auxiliary bridge.

According to some embodiments, the auxiliary trace line includes a first layer line and a second layer line located on the first layer line and electrically connected to the first layer line, at least one third electrode among the plurality of third electrodes includes a first electrode portion, a second electrode portion, and an auxiliary bridge electrically connected to the first electrode portion and the second electrode portion, the first electrode portion and the second electrode portion are spaced apart from each other with the first layer line interposed between, the first layer line is insulated from the auxiliary bridge while intersecting the auxiliary bridge, at least one first electrode among the first electrodes includes a first electrode pattern portion, a second electrode pattern portion, and an auxiliary bridge pattern electrically connected to the first electrode pattern portion and the second electrode pattern portion, the first electrode pattern portion is spaced apart from the second electrode pattern portion with the second layer line interposed therebetween, and the second layer line is insulated from the auxiliary bridge pattern while intersecting the auxiliary bridge pattern.

According to some embodiments, a length in the second direction of at least one third electrode among the plurality of third electrodes is shorter than a length in the second direction of another third electrode among the plurality of third electrodes.

According to some embodiments, the at least one third electrode is spaced apart from the non-display area with the auxiliary trace line interposed therebetween when viewed in a plane.

According to some embodiments, the sensor layer further includes an auxiliary electrode bridge electrically connected to the at least one third electrode and insulated from the auxiliary trace line while intersecting the auxiliary trace line.

According to some embodiments, the auxiliary trace line includes a first layer line and a second layer line located on the first layer line and electrically connected to the first layer line, the auxiliary electrode bridge is insulated from the first layer line while intersecting the first layer line, and the second layer line includes a first line portion and a second line portion spaced apart from the first line portion with the auxiliary electrode bridge interposed therebetween.

According to some embodiments, the auxiliary trace line is connected to the at least one fourth electrode in an area overlapping the display area.

According to some embodiments, the sensor layer further includes an additional auxiliary trace line that electrically connects the at least one fourth electrode to at least another fourth electrode among the plurality of fourth electrodes, and the additional auxiliary trace line overlaps the non-display area.

According to some embodiments, the auxiliary trace line is electrically connected to at least another fourth electrode among the plurality of fourth electrodes in the area overlapping the display area.

According to some embodiments, the sensor layer further includes a plurality of first auxiliary trace lines electrically connected to the plurality of third electrodes, and a portion of at least one first auxiliary trace line of the plurality of first auxiliary trace lines overlaps the display area.

According to some embodiments, a length in the second direction of at least one third electrode electrically connected to the at least one first auxiliary trace line among the plurality of third electrodes is equal to or smaller than a length in the second direction of another third electrode among the plurality of third electrodes.

According to some embodiments, the auxiliary trace line is located between the at least one first auxiliary trace line and the non-display area when viewed in the plane.

According to some embodiments, the at least one first auxiliary trace line is located between the auxiliary trace line and the non-display area when viewed in the plane.

According to some embodiments, another fourth electrode among the plurality of fourth electrodes includes a first electrode portion, a second electrode portion, and an auxiliary bridge electrically connected to the first electrode portion and the second electrode portion, the first electrode portion and the second electrode portion are spaced apart from each other with the auxiliary trace line interposed therebetween in the first direction, and the auxiliary trace line is insulated from the auxiliary bridge while intersecting the auxiliary bridge.

According to some embodiments, the sensor layer further includes a plurality of first trace lines electrically connected to the plurality of first electrodes and a plurality of second trace lines electrically connected to the plurality of second electrodes, and the auxiliary trace line is insulated from at least one second trace line among the plurality of second trace lines while intersecting the at least one second trace line.

According to some embodiments, the auxiliary trace line includes a first portion extending from the at least one of the plurality of fourth electrodes and overlapping the non-display area and a second portion extending from the first portion to the display area, and the at least one second trace line is insulated from the second portion while intersecting the second portion.

According to some embodiments, the auxiliary trace line overlaps at least one first electrode among the plurality of first electrodes, the at least one first electrode includes a first mesh line extending in a first intersecting direction and a second mesh line extending in a second intersecting direction intersecting the first intersecting direction, and the auxiliary trace line includes a third mesh line extending in the first intersecting direction and a fourth mesh line extending in the second intersecting direction.

According to some embodiments, the first mesh line intersects and overlaps the fourth mesh line when viewed in the plane, and the second mesh line intersects and overlaps the third mesh line when viewed in the plane.

According to some embodiments, the third mesh line includes an end portion connected to the fourth mesh line and an extension portion extending from the end portion to the first intersecting direction, and the extension portion does not overlap the first mesh line.

According to some embodiments, each of the first electrodes includes a plurality of sensing patterns spaced apart from each other in the second direction and a plurality of bridge patterns electrically connected to the plurality of sensing patterns, and the auxiliary trace line is located closer to the display layer than the plurality of sensing patterns.

Aspects of some embodiments of the present disclosure include an electronic device including a display layer including a display area defined therein and a non-display area defined therein and adjacent to the display area and a sensor layer on the display layer. According to some embodiments, the sensor layer includes a plurality of first electrodes arranged in a first direction, a plurality of second electrodes arranged in a second direction intersecting the first direction and intersecting the plurality of first electrodes, a sensing auxiliary electrode including a plurality of auxiliary electrodes extending in the first direction and arranged in the second direction, and an auxiliary trace line electrically connected to the sensing auxiliary electrode. According to some embodiments, at least a portion of the auxiliary trace line overlaps the display area.

According to some embodiments, the sensor layer further includes an additional auxiliary trace line that electrically connects the plurality of auxiliary electrodes and overlaps the non-display area.

According to some embodiments, the auxiliary trace line includes a first portion extending from the sensing auxiliary electrode and overlapping the non-display area, a second portion extending from the first portion and overlapping the display area, and a third portion extending from the second portion and overlapping the non-display area.

According to some embodiments, the sensor layer further includes a plurality of charging electrodes extending in the second direction and arranged in the first direction, a plurality of first trace lines electrically connected to the plurality of first electrodes, a plurality of second trace lines electrically connected to the plurality of second electrodes, and a plurality of first auxiliary trace lines electrically connected to the plurality of charging electrodes.

According to some embodiments, a portion of at least one first auxiliary trace line among the plurality of first auxiliary trace lines overlaps the display area, and the portion of the at least one first auxiliary trace line is between the auxiliary trace line and the non-display area.

According to some embodiments, the sensor layer further includes a second auxiliary trace line electrically connected to the plurality of charging electrodes, the second auxiliary trace line is provided to surround an area in which the plurality of first trace lines, the plurality of second trace lines, the auxiliary trace line, and the plurality of first auxiliary trace lines are arranged.

According to some embodiments, the auxiliary trace line overlaps at least one first electrode among the plurality of first electrodes, the at least one first electrode includes a first mesh line extending in a first intersecting direction and a second mesh line extending in a second intersecting direction intersecting the first intersecting direction, the auxiliary trace line includes a third mesh line extending in the first intersecting direction and a fourth mesh line extending in the second intersecting direction, the first mesh line overlaps and intersects the fourth mesh line when viewed in a plane, and the second mesh line overlaps and intersects the third mesh line when viewed in the plane.

Aspects of some embodiments of the present disclosure include an electronic device including a sensor layer including a sensing area and a peripheral area adjacent to the sensing area and a sensor driver driving the sensor layer and being selectively driven in a first mode in which a touch input is sensed or a second mode in which a pen input is sensed. According to some embodiments, the sensor layer includes a plurality of first electrodes on the sensor layer, a plurality of second electrodes on the sensor layer, a sensing auxiliary electrode on the sensor layer, and an auxiliary trace line electrically connected to the sensing auxiliary electrode and partially in the sensing area. According to some embodiments, the sensing auxiliary electrode is floated or grounded in the first mode.

According to some embodiments, the auxiliary trace line includes a first portion extending from the sensing auxiliary electrode and overlapping the peripheral area, a second portion extending from the first portion and overlapping the sensing area, and a third portion extending from the second portion and overlapping the peripheral area.

According to some embodiments, the auxiliary trace line is connected to the sensing auxiliary electrode in the sensing area.

According to some embodiments, the auxiliary trace line overlaps at least one first electrode among the plurality of first electrodes, the at least one first electrode includes a first mesh line extending in a first intersecting direction and a second mesh line extending in a second intersecting direction intersecting the first intersecting direction, the auxiliary trace line includes a third mesh line extending in the first intersecting direction and a fourth mesh line extending in the second intersecting direction, the first mesh line overlaps and intersects the fourth mesh line when viewed in a plane, and the second mesh line overlaps and intersects the third mesh line when viewed in the plane.

According to some embodiments, the second mode includes a charging driving mode and a pen sensing driving mode, and the sensing auxiliary electrode is floated in the pen sensing driving mode.

According to some embodiments of the present disclosure, not only a touch input but also a pen input may be sensed using the sensor layer. Because an additional component, e.g., a digitizer, to sense the pen input may not be required, the increase in thickness and weight and the decrease in flexibility of the electronic device due to the addition of the digitizer may be avoided. In addition, among the trace lines located in an area where the trace lines are intensively (or densely) arranged in the peripheral area, e.g., an area between the sensing area and an area where the pads are located, at least a portion of some trace lines is located in the sensing area. Accordingly, the area occupied by the trace lines in the peripheral area may be relatively reduced, and the area where the trace lines are not located, i.e., an unused area, in the peripheral area may increase. When the unused area is removed, for example, by cutting, the area occupied by the peripheral area in a total area of the display panel is reduced, and thus, a narrow bezel is implemented. In addition, a line width of each of the first trace lines or the second trace lines is able to be adjusted to relatively improve a resistance thereof by utilizing the unused area. In this case, a sensing sensitivity of the sensor layer may be enhanced.

BRIEF DESCRIPTION OF THE DRAWINGS

The above and other aspects and characteristics of embodiments according to the present disclosure will become readily apparent by reference to the following detailed description when considered in conjunction with the accompanying drawings wherein:

FIG. 12B is an enlarged plan view of a portion of a second conductive layer of a sensing unit according to some embodiments of the present disclosure;

DETAILED DESCRIPTION

Figure 1A:
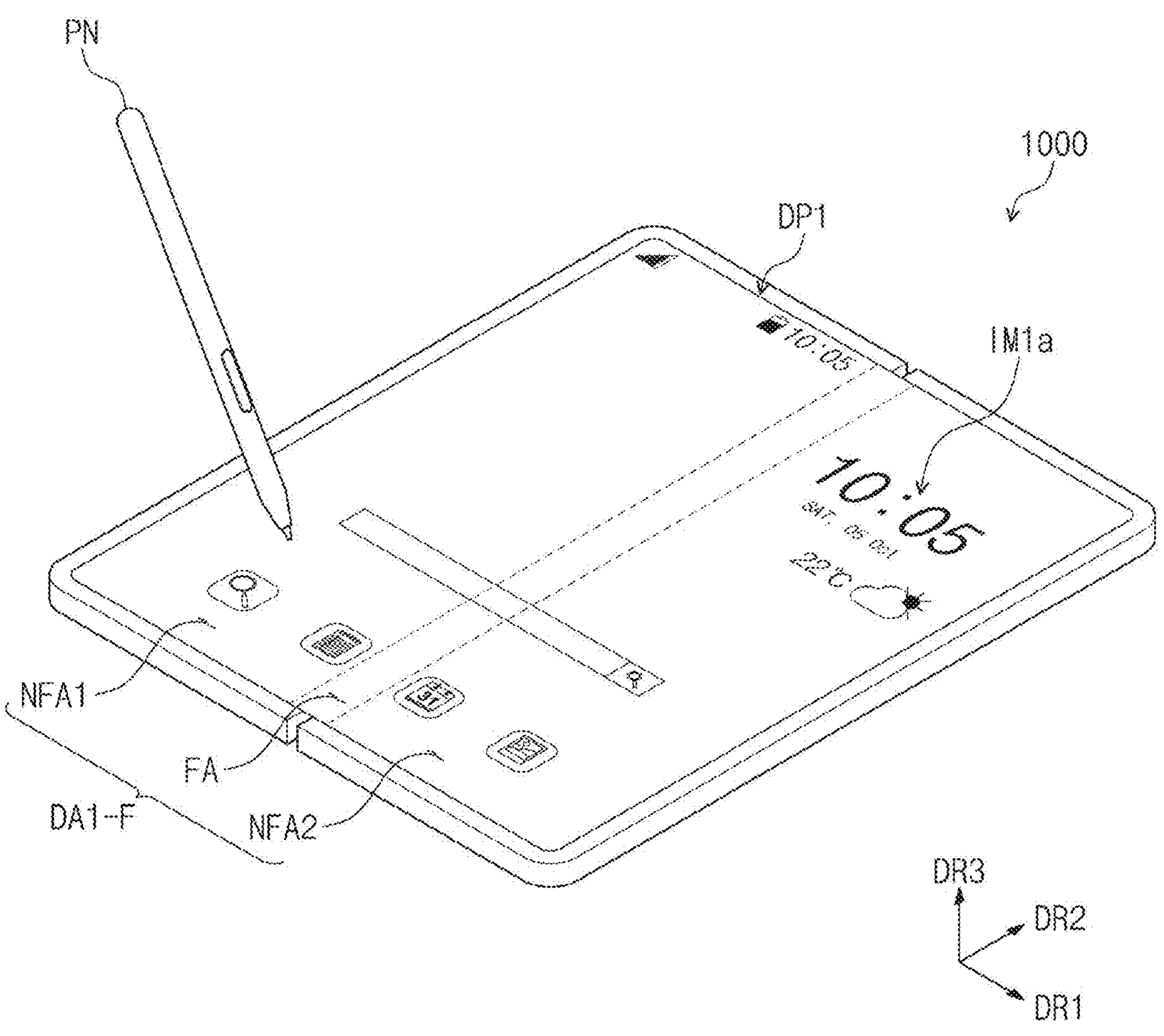
FIG. 1A is a perspective view of an electronic device according to some embodiments of the present disclosure.

In the present disclosure, it will be understood that when an element (or area, layer, or portion) is referred to as being “on”, “connected to” or “coupled to” another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term “and/or” may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, “a”, “an” and “the” are intended to include the plural forms as well, unless the context clearly indicates otherwise.

Spatially relative terms, such as “beneath”, “below”, “lower”, “above”, “upper” and the like, may be used herein for ease of description to describe one element or feature’s relationship to another elements or features as shown in the figures.

It will be further understood that the terms “include” and/or “including”, when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term “part” or “unit” as used herein is intended to mean a software component or a hardware component that performs a specific function. The hardware component may include, for example, a field-programmable gate array (FPGA) or an application-specific integrated circuit (ASIC). The software component may refer to an executable code and/or data used by the executable code in an addressable storage medium. Thus, the software components may be, for example, object-oriented software components, class components, and task components, and may include processes, functions, attributes, procedures, subroutines, segments of program code, drivers, firmware, micro codes, circuits, data, a database, data structures, tables, arrays, or variables.

Hereinafter, embodiments of the present disclosure will be described with reference to accompanying drawings.

Figure 1B:
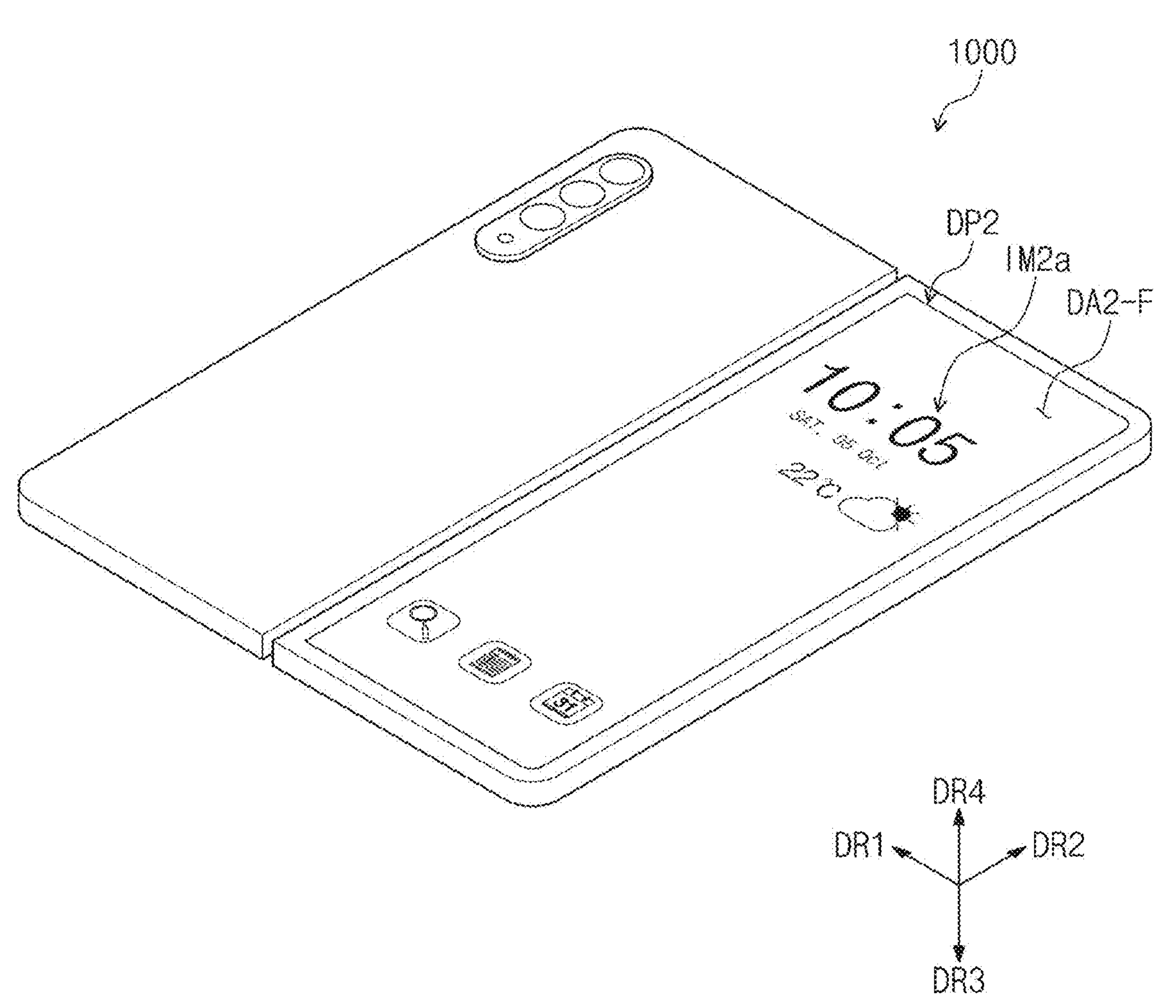
FIG. 1B is a rear perspective view of an electronic device according to some embodiments of the present disclosure.

FIG. 1A is a perspective view of an electronic device 1000 according to some embodiments of the present disclosure, and FIG. 1B is a rear perspective view of the electronic device 1000 according to some embodiments of the present disclosure.

Referring to FIGS. 1A and 1B, the electronic device 1000 may be activated in response to electrical signals. As an example, the electronic device 1000 may display images and may sense external inputs applied thereto from the outside. The external input may be a user input. The user input may include a variety of forms of external inputs, such as a part of user’s body, pen PN, light, heat, or pressure.

The electronic device 1000 may include a first display panel DP1 and a second display panel DP2. The first display panel DP1 and the second display panel DP2 may be panels separated from each other. The first display panel DP1 may be referred to as a main display panel, and the second display panel DP2 may be referred to as an auxiliary display panel or an external display panel.

The first display panel DP1 may include a first display part DA1-F, and the second display panel DP2 may include a second display part DA2-F. The second display panel DP2 may have a size smaller than a size of the first display panel DP1. Similar to the size of the first display panel DP1 and the size of the second display panel DP2, the first display part DA1-F may have a size greater than a size of the second display part DA2-F.

When the electronic device 1000 is in an unfolded state, the first display part DA1-F may include a plane parallel to each of a first direction DR1 and a second direction DR2. A thickness direction of the electronic device 1000 may be substantially parallel to a third direction DR3 intersecting the first direction DR1 and the second direction DR2. Hereinafter, front (or upper) and rear (or lower) surfaces of each member of the electronic device 1000 may be distinguished from each other based on the third direction DR3.

The first display panel DP1 or the first display part DA1-F may include a folding area FA folded or unfolded and a plurality of non-folding areas NFA1 and NFA2 spaced apart from each other with the folding area FA interposed therebetween. The second display panel DP2 may overlap one of the non-folding areas NFA1 and NFA2. As an example, the second display panel DP2 may overlap a first non-folding area NFA1.

A display direction of a first image IM1*a* displayed through a portion of the first display panel DP1, for example, the first non-folding area NFA1, may be opposite to a display direction of a second image IM2*a* displayed through the second display panel DP2. As an example, the first image IM1*a* may be displayed to the third direction DR3, and the second image IM2*a* may be displayed to a fourth direction DR4 opposite to the third direction DR3.

The folding area FA may be folded with respect to a folding axis extending in a direction parallel to long sides of the electronic device 1000, e.g., a direction parallel to the second direction DR2. When the electronic device 1000 is in a folded state, the folding area FA may be folded to have a curvature (e.g., a set or predetermined curvature) and a radius of curvature. The electronic device 1000 may be inwardly folded (inner-folding) such that the first non-folding area NFA1 may face a second non-folding area NFA2 and the first display part DA1-F is not exposed to the outside.

According to some embodiments, the electronic device 1000 may be outwardly folded (outer-folding) such that the first display part DA1-F may be exposed to the outside. According to some embodiments, the electronic device 1000 may be inwardly folded or outwardly folded from an unfolded state, however, it should not be limited thereto or thereby.

FIG. 1A shows the structure in which the electronic device 1000 includes one folding area FA defined therein as a representative example, however, the present disclosure should not be limited thereto or thereby. As an example, the electronic device 1000 may include a plurality of folding axes defined therein and a plurality of folding areas corresponding thereto, and the electronic device 1000 may be inwardly or outwardly folded from an unfolded state in each of the folding areas.

According to some embodiments, at least one of the first display panel DP1 or the second display panel DP2 may sense an input given thereto by the pen PN even though the at least one of the first display panel DP1 or the second display panel DP2 does not include a digitizer. Because the digitizer required to sense the input by the pen PN is omitted, an increase in thickness and weight and a decrease in flexibility of the electronic device 1000 due to the addition of the digitizer may be prevented or reduced. Thus, not only the first display panel DP1 but also the second display panel DP2 may also be designed to sense the pen PN, because there is no concern of increased thickness and increased weight.

Figure 2:
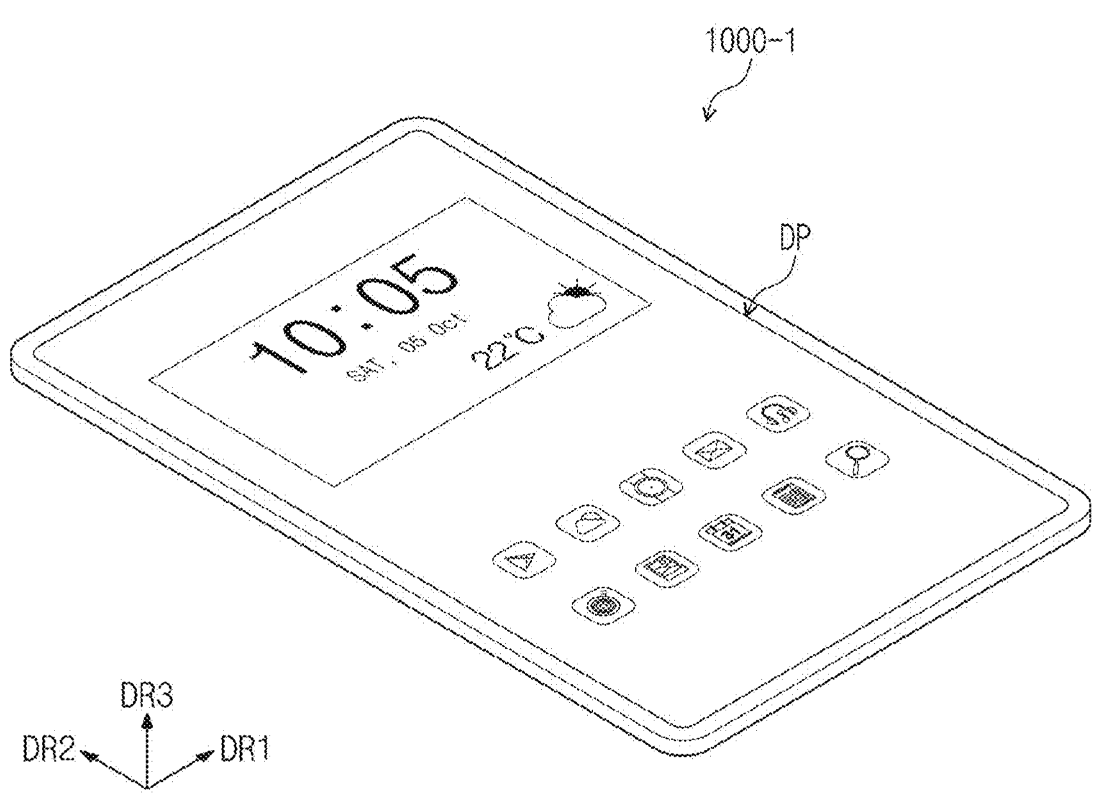
FIG. 2 is a perspective view of an electronic device according to some embodiments of the present disclosure.
Figure 3:
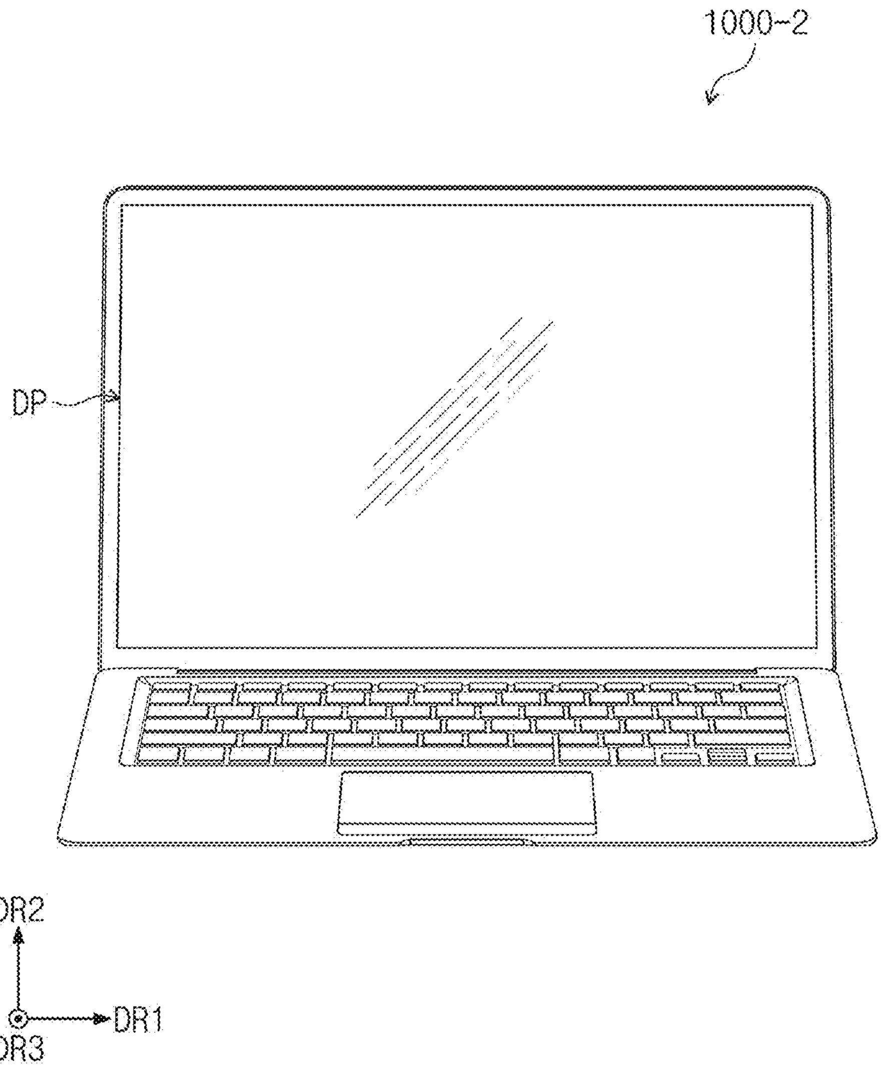
FIG. 3 is a perspective view of an electronic device according to some embodiments of the present disclosure.

FIG. 2 is a perspective view of an electronic device 1000-1 according to some embodiments of the present disclosure, and FIG. 3 is a perspective view of an electronic device 1000-2 according to some embodiments of the present disclosure.

FIG. 2 shows a mobile phone as a representative example of the electronic device 1000-1, and the electronic device 1000-1 may include a display panel DP. FIG. 3 shows a notebook computer as a representative example of the electronic device 1000-2, and the electronic device 1000-2 may include a display panel DP. Although FIG. 3 is the perspective view of an electronic device 1000-2, the coordinate axes included in FIG. 3 are displayed based on the display panel DP within the electronic device 1000-2.

The display panel DP may sense external inputs applied thereto from the outside. The external input may be a user input. The user input may include a variety of forms of external inputs, such as a part of user's body, pen (refer to PN of FIG. 1A), light, heat, or pressure.

According to some embodiments, even though the display panel DP does not include a digitizer, the display panel DP may sense an input given thereto by the pen PN. Because the digitizer required to sense the input by the pen PN is omitted, an increase in thickness and weight of the electronic device 1000-1 or 1000-2 due to the addition of the digitizer may be prevented or reduced.

FIG. 1A shows a foldable-type electronic device 1000, FIG. 2 shows a bar-type electronic device 1000-1, however, embodiments according to the present disclosure are not limited thereto or thereby. As an example, the following descriptions may be applied to various electronic devices, such as a rollable type electronic device, a slidable type electronic device, a stretchable type electronic device, etc.

Figure 4:
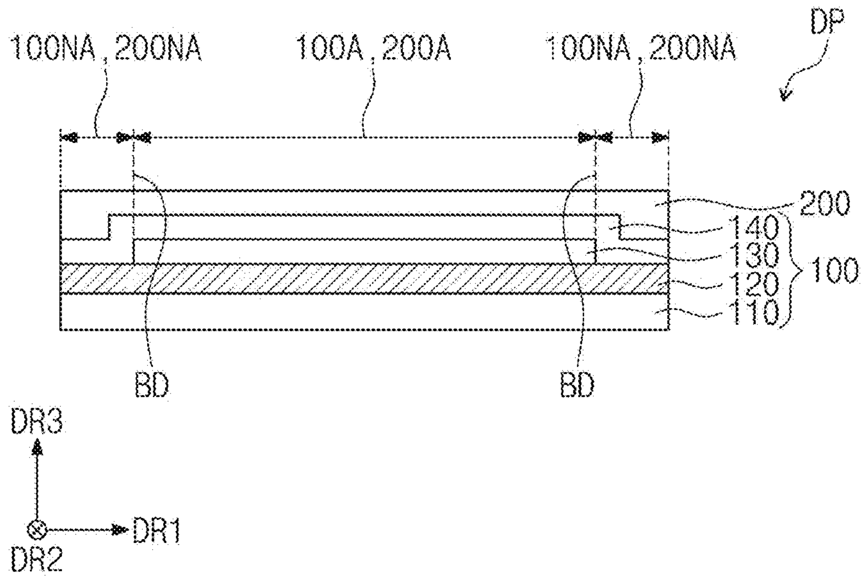
FIG. 4 is a cross-sectional view of a display panel according to some embodiments of the present disclosure.

FIG. 4 is a cross-sectional view of a display panel DP according to some embodiments of the present disclosure.

Referring to FIG. 4, the display panel DP may include a display layer 100 and a sensor layer 200.

The display layer 100 may have a configuration that substantially generates the image. The display layer 100 may include a display area 100A and a non-display area 100NA adjacent to (e.g., in a periphery or outside a footprint of) the display area 100A, which are defined therein. The image may be displayed through the display area 100A.

The display layer 100 may be a light emitting type display layer. For example, the display layer 100 may be an organic light emitting display layer, an inorganic light emitting display layer, an organic-inorganic light emitting display layer, a quantum dot display layer, a micro-LED display layer, or a nano-LED display layer. The display layer 100 may include a base layer 110, a circuit layer 120, a light emitting element layer 130, and an encapsulation layer 140.

The base layer 110 may provide a base surface on which the circuit layer 120 is located. The base layer 110 may have a single-layer or multi-layer structure. The base layer 110 may be a glass substrate, a metal substrate, a silicon substrate, or a polymer substrate, however, embodiments according to the present disclosure are not limited thereto.

The circuit layer 120 may be located on the base layer 110. The circuit layer 120 may include an insulating layer, a semiconductor pattern, a conductive pattern, and a signal line. An insulating layer, a semiconductor layer, and a conductive layer may be formed on the base layer 110 by a coating or depositing process. Then, the insulating layer, the semiconductor layer, and the conductive layer may be selectively patterned through several photolithography processes.

The light emitting element layer 130 may be located on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be located on the light emitting element layer 130. The encapsulation layer 140 may protect the light emitting element layer 130 from moisture, oxygen, and foreign substances, such as dust particles.

The sensor layer 200 may be located on the display layer 100. The sensor layer 200 may include a sensing area 200A and a peripheral area 200NA adjacent to the sensing area 200A, which are defined therein. The sensing area 200A may overlap the display area 100A, and the peripheral area 200NA may overlap the non-display area 100NA.

As shown in FIG. 4, a boundary BD between the display area 100A and the non-display area 100NA may overlap a boundary BD between the sensing area 200A and the peripheral area 200NA, however, this is merely an example. As an example, a size of the sensing area 200A may be greater than a size of the display area 100A, or the size of the display area 100A may be greater than the size of the sensing area 200A.

The sensor layer 200 may sense an external input applied thereto from the outside. The sensor layer 200 may be an integrated sensor formed continuously in a manufacturing process of the display layer 100, or the sensor layer 200 may be an external type sensor attached to the display layer 100. The sensor layer 200 may be referred to as a sensor, an input sensing layer, an input sensing panel, or an input-coordinate sensing electronic device.

According to some embodiments, the sensor layer 200 may sense inputs from a passive type input such as a part of a user's body and an input device that generates a magnetic field of a resonant frequency (e.g., a set or predetermined resonant frequency). The input device may be referred to as a pen, an input pen, a magnetic pen, a stylus pen, or an electromagnetic resonance pen.

Figure 5:
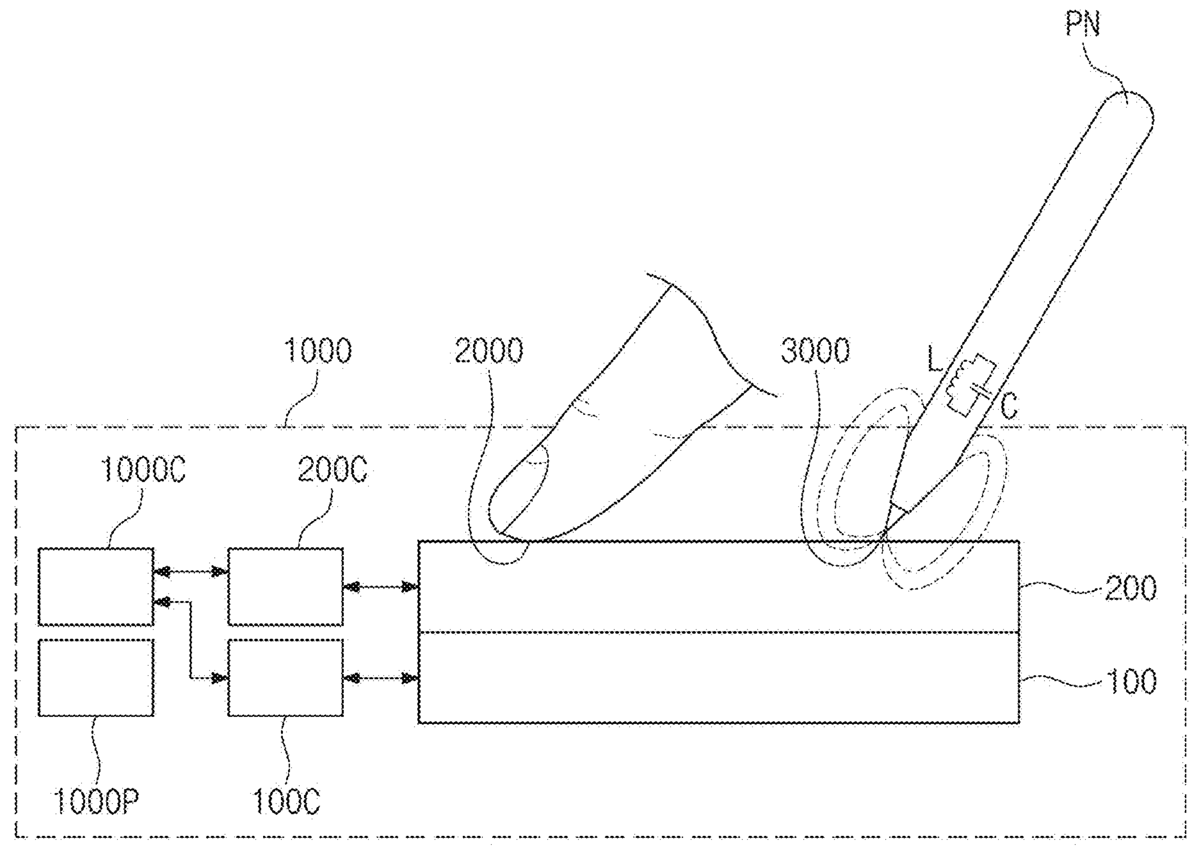
FIG. 5 is a block diagram illustrating an operation of an electronic device according to some embodiments of the present disclosure.

FIG. 5 is a block diagram illustrating an operation of the electronic device 1000 according to some embodiments of the present disclosure.

Referring to FIG. 5, the electronic device 1000 may include a display layer 100, a sensor layer 200, a display driver 100C, a sensor driver 2000, a main driver 1000C, and a power circuit 1000P.

The sensor layer 200 may sense a first input 2000 or a second input 3000 applied thereto from the outside. Each of the first input 2000 and the second input 3000 may be an input by an input member that causes a variation in capacitance of the sensor layer 200 or an input by an input member that causes an induced current in the sensor layer 200. As an example, the first input 2000 may be a passive-type input such as a part of a user's body. The second input 3000 may be an input generated by the pen PN or an input by an RFIC tag. As an example, the pen PN may be a passive-type pen or an active-type pen.

The pen PN may be a device that generates a magnetic field of a resonant frequency (e.g., a set or predetermined resonant frequency). The pen PN may be configured to transmit an output signal based on an electromagnetic resonance method. The pen PN may be referred to as an input device, an input pen, a magnetic pen, a stylus pen, or an electromagnetic resonance pen.

The pen PN may include an RLC resonant circuit, and the RLC resonant circuit may include an inductor L and a capacitor C. The RLC resonant circuit may be a variable resonant circuit that varies a resonant frequency. In this case, the inductor L may be a variable inductor and/or the capacitor C may be a variable capacitor, however, embodiments according to the present disclosure are not limited thereto or thereby.

The electronic device 1000 may form a magnetic field. For example, the magnetic field may be formed by the electronic device 1000, e.g., a coil or current loop included in the sensor layer 200. The magnetic field may cause the inductor L to generate a current. However, embodiments according to the present disclosure are not limited thereto or thereby. As an example, when the pen PN operates as an active type, the pen PN may generate a current even though the pen PN does not receive a magnetic field from the outside. The generated current may be transmitted to the capacitor C. The capacitor C may be charged with current from the inductor L and may discharge the charged current to the inductor L. Then, the inductor L may emit the magnetic field of the resonant frequency. The induced current may flow through the sensor layer 200 by the magnetic field emitted by the pen PN, and the induced current may be transmitted to the sensor driver 2000 as a reception signal (or a sensing signal, a signal).

The main driver 1000C may control an overall operation of the electronic device 1000. For example, the main driver 1000C may control an operation of the display driver 100C and the sensor driver 2000. The main driver 1000C may include at least one microprocessor and may further include a graphics controller. The main driver 1000C may be referred to as an application processor, a central processing unit, or a main processor.

The display driver 1000 may drive the display layer 100. The display driver 100C may receive image data and a control signal from the main driver 1000C. The control signal may include a variety of signals. As an example, the control signal may include an input vertical synchronization signal, an input horizontal synchronization signal, a main clock, a data enable signal, or the like.

The sensor driver 2000 may drive the sensor layer 200. The sensor driver 2000 may receive a control signal from the main driver 1000C. The control signal may include a clock signal of the sensor driver 2000. In addition, the control signal may further include a mode determination signal that determines a driving mode of the sensor driver 2000 and the sensor layer 200.

The sensor driver 2000 may be implemented by an integrated circuit (IC) and may be electrically connected to the sensor layer 200. As an example, the sensor driver 2000 may be directly mounted on an area (e.g., a set or predetermined area) of the display panel or may be electrically connected to the sensor layer 200 after being mounted on a separated printed circuit board in a chip-on-film (COF) manner.

The sensor driver 2000 and the sensor layer 200 may be selectively operated in a first mode or a second mode. As an example, the first mode may be a mode in which a touch input, e.g., the first input 2000, is sensed. The second mode may be a mode in which the input generated by the pen PN, e.g., the second input 3000, is sensed. The first mode may be referred to as a touch sensing mode, and the second mode may be referred to as a pen sensing mode.

The first mode and the second mode may be switched in a variety of ways. As an example, the sensor driver 2000 and the sensor layer 200 may operate as a time-sharing scheme in the first mode and the second mode and may sense the first input 2000 and the second input 3000. In addition, a transition between the first mode and the second mode may occur by a user's selection or a user's specific action (or input), or one of the first mode and the second mode may be activated or deactivated or one of the first mode and the second mode may be switched to the other by activating or deactivating a specific application. When the first input 2000 is sensed while the sensor driver 2000 and the sensor layer 200 are alternately operated in the first mode and the second mode, the first mode may be maintained, and when the second input 3000 is sensed while the sensor driver 2000 and the sensor layer 200 are alternately operated in the first mode and the second mode, the second mode may be maintained.

The sensor driver 2000 may calculate input coordinate information based on the signal applied thereto from the sensor layer 200 and may provide a coordinate signal with the input coordinate information to the main driver 1000C. The main driver 1000C may operate an operation corresponding to the user's input based on the coordinate signal. For instance, the main driver 1000C may drive the display driver 100C so that a new application image is displayed through the display layer 100.

The power circuit 1000P may include a power management integrated circuit (PMIC). The power circuit 1000P may generate a plurality of driving voltages to drive the display layer 100, the sensor layer 200, the display driver 100C, and the sensor driver 2000. As an example, the driving voltages may include a gate high voltage, a gate low voltage, a first driving voltage (e.g., an ELVSS voltage), a second driving voltage (e.g., an ELVDD voltage), an initialization voltage, etc., however, the present disclosure should not be particularly limited.

Figure 6A:
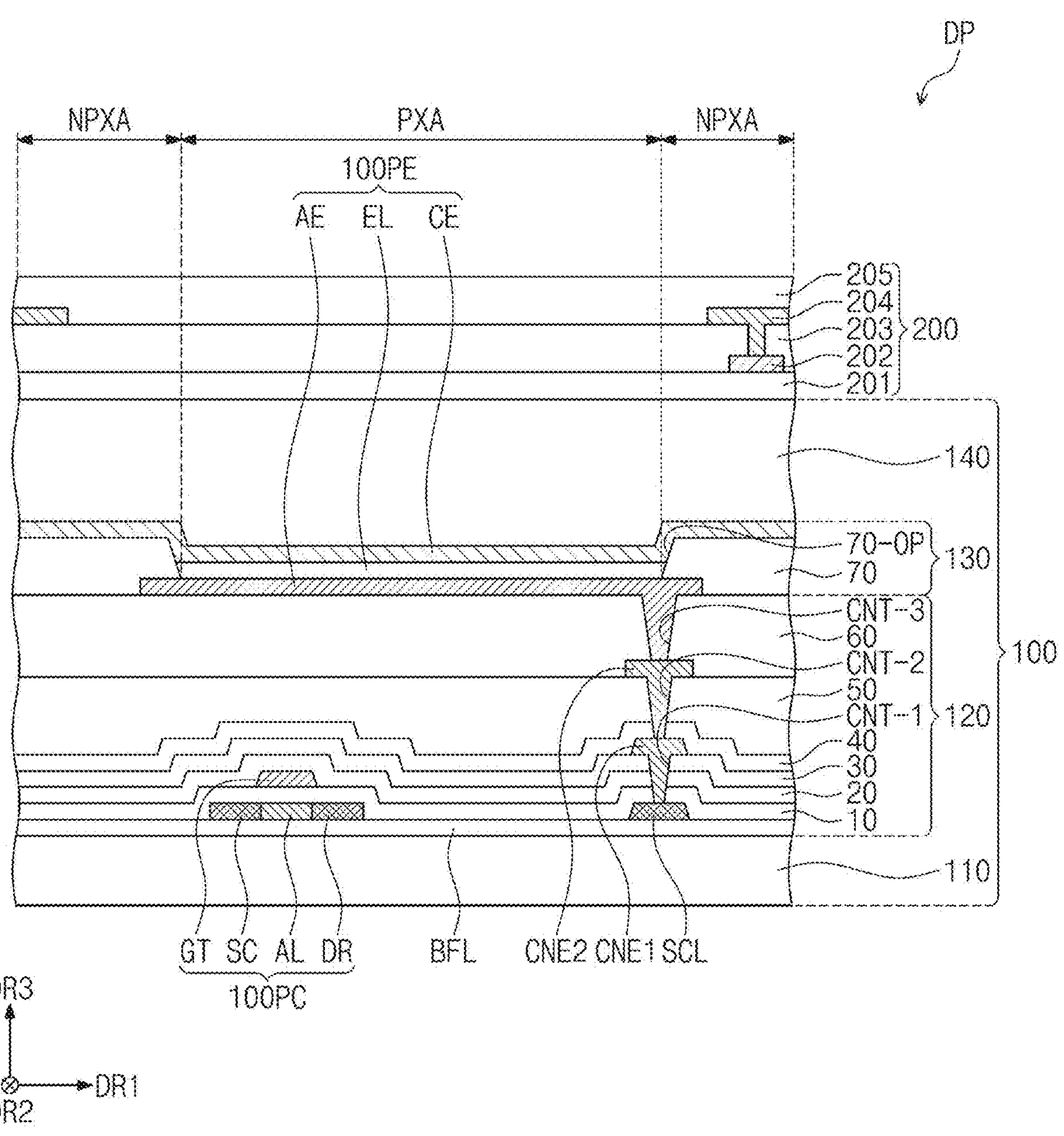
FIG. 6A is a cross-sectional view of a display panel according to some embodiments of the present disclosure.

FIG. 6A is a cross-sectional view of the display panel DP according to some embodiments of the present disclosure.

Referring to FIG. 6A, at least one buffer layer BFL may be formed on an upper surface of the base layer 110. The buffer layer BFL may increase an adhesive force between the base layer 110 and the semiconductor pattern. The buffer layer BFL may be formed in multiple layers. The display layer 100 may further include a barrier layer. The buffer layer BFL may include at least one of silicon oxide, silicon nitride, or silicon oxynitride. For example, the buffer layer BFL may have a stack structure in which a silicon oxide layer and a silicon nitride layer are alternately stacked with each other.

The semiconductor pattern SC, AL, DR, and SCL may be located on the buffer layer BFL. The semiconductor pattern SC, AL, DR, and SCL may include polysilicon, however, it should not be limited thereto or thereby. The semiconductor pattern SC, AL, DR, and SCL may include amorphous silicon, low temperature polycrystalline silicon, or oxide semiconductor.

FIG. 6A shows only a portion of the semiconductor pattern SC, AL, DR, and SCL, and the semiconductor pattern SC, AL, DR, and SCL may be further located in other areas. The semiconductor pattern SC, AL, DR, and SCL may be arranged with a specific rule over pixels. The semiconductor pattern SC, AL, DR, and SCL may have different electrical properties depending on whether it is doped or not. The semiconductor pattern SC, AL, DR, and SCL may include a first region SC, DR, and SCL having a relatively high conductivity and a second region AL having a relatively low conductivity. The first region SC, DR, and SCL may be doped with an N-type dopant or a P-type dopant. A P-type transistor may include a doped region doped with the P-type dopant, and an N-type transistor may include a doped region doped with the N-type dopant. The second region AL may be a non-doped region or a region doped at a concentration lower than that of the first region SC, DR, and SCL.

The first region SC, DR, and SCL may have a conductivity greater than that of the second region AL and may substantially serve as an electrode or signal line. The second region AL may substantially correspond to an active area AL (or a channel) of a transistor 100PC. In other words, a portion AL of the semiconductor pattern SC, AL, DR, and SCL may be the active area AL of the transistor 100PC, another portion SC or DR of the semiconductor pattern SC, AL, DR, and SCL may be a source area SC or a drain area DR of the transistor 100PC, and the other portion SCL of the semiconductor pattern SC, AL, DR, and SCL may be a connection electrode or a connection signal line SCL.

Each of the pixels may have an equivalent circuit that includes a plurality of transistors, at least one capacitor, and at least one light emitting element, and the equivalent circuit may be changed in various ways. FIG. 6A shows a structure in which one transistor 100PC and one light emitting element 100PE are included in the pixel as a representative example.

The source area SC, the active area AL, and the drain area DR of the transistor 100PC may be formed from the semiconductor pattern SC, AL, DR, and SCL. The source area SC and the drain area DR may extend in opposite directions to each other from the active area AL in a cross-section. FIG. 6A shows a portion of the connection signal line SCL formed from the semiconductor pattern SC, AL, DR, and SCL. According to some embodiments, the connection signal line SCL may be connected to the drain area DR of the transistor 100PC in a plane.

A first insulating layer 10 may be located on the buffer layer BFL. The first insulating layer 10 may commonly overlap the pixels and may cover the semiconductor pattern SC, AL, DR, and SCL. The first insulating layer 10 may be an inorganic layer and/or an organic layer and may have a single-layer or multi-layer structure. The first insulating layer 10 may include at least one of aluminum oxide, titanium oxide, silicon oxide, silicon nitride, silicon oxynitride, zirconium oxide, or hafnium oxide. According to some embodiments, the first insulating layer 10 may have a single-layer structure of a silicon oxide layer. Not only the first insulating layer 10, but also an insulating layer of the circuit layer 120 described later may be an inorganic layer and/or an organic layer and may have a single-layer or multi-layer structure. The inorganic layer may include at least one of the above-mentioned materials, however, embodiments according to the present disclosure are not limited thereto or thereby.

A gate GT of the transistor 100PC may be located on the first insulating layer 10. The gate GT may be a portion of a metal pattern. The gate GT may overlap the active area AL. The gate GT may be used as a mask in a process of doping the semiconductor pattern SC, AL, DR, and SCL.

A second insulating layer 20 may be located on the first insulating layer 10 and may cover the gate GT. The second insulating layer 20 may commonly overlap the pixels. The second insulating layer 20 may be an inorganic layer and/or an organic layer and may have a single-layer or multi-layer structure. The second insulating layer 20 may include at least one of silicon oxide, silicon nitride, or silicon oxynitride. According to some embodiments, the second insulating layer 20 may have a multi-layer structure of a silicon oxide layer and a silicon nitride layer.

A third insulating layer 30 may be located on the second insulating layer 20. The third insulating layer 30 may have a single-layer or multi-layer structure. As an example, the third insulating layer 30 may have a multi-layer structure of a silicon oxide layer and a silicon nitride layer.

A first connection electrode CNE1 may be located on the third insulating layer 30. The first connection electrode CNE1 may be connected to the connection signal line SCL through a contact hole CNT-1 defined through the first, second, and third insulating layers 10, 20, and 30.

A fourth insulating layer 40 may be located on the third insulating layer 30. The fourth insulating layer 40 may have a single-layer structure of a silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 defined through the fourth insulating layer 40 and the fifth insulating layer 50.

A sixth insulating layer 60 may be located on the fifth insulating layer 50 and may cover the second connection electrode CNE2. The sixth insulating layer 60 may be an organic layer.

The light emitting element layer 130 may be located on the circuit layer 120. The light emitting element layer 130 may include the light emitting element 100PE. As an example, the light emitting element layer 130 may include an organic light emitting material, an inorganic light emitting material, an organic-inorganic light emitting material, a quantum dot, a quantum rod, a micro-LED, or a nano-LED. Hereinafter, the organic light emitting element will be described as the light emitting element 100PE, however, it should not be particularly limited.

The light emitting element 100PE may include a first electrode AE, a light emitting layer EL, and a second electrode CE.

The first electrode AE may be located on the sixth insulating layer 60. The first electrode AE may be connected to the second connection electrode CNE2 through a contact hole CNT-3 defined through the sixth insulating layer 60.

A pixel definition layer 70 may be located on the sixth insulating layer 60 and may cover a portion of the first electrode AE. An opening 70-OP may be defined through the pixel definition layer 70. At least a portion of the first electrode AE may be exposed through the opening 70-OP of the pixel definition layer 70.

The first display part DA1-F (refer to FIG. 1A) may include a light emitting area PXA and a non-light-emitting area NPXA adjacent to the light emitting area PXA. The non-light-emitting area NPXA may surround the light emitting area PXA. According to some embodiments, the light emitting area PXA may be defined to correspond to the portion of the first electrode AE exposed through the opening 70-OP.

The light emitting layer EL may be located on the first electrode AE. The light emitting layer EL may be located in an area corresponding to the opening 70-OP. FIG. 6A shows a structure in which the light emitting layer EL is located in the opening 70-OP as a representative example, however, embodiments according to the present disclosure are not particularly limited thereto. As an example, the light emitting layer EL may extend to cover a side surface of the pixel definition layer 70, which defines the opening 70-OP, and a portion of an upper surface of the pixel definition layer 70.

The light emitting layer EL may be formed in each of the pixels after being divided into plural portions. When the light emitting layer EL is formed in each of the pixels after being divided into plural portions, each of the light emitting layers EL may emit a light having at least one of blue, red, or green colors, however, embodiments according to the present disclosure are not limited thereto or thereby. The light emitting layer EL may be integrally formed and may be commonly provided to the pixels. In this case, the light emitting layer EL may provide a blue light or a white light.

The second electrode CE may be located on the light emitting layer EL. The second electrode CE may have an integral shape and may be commonly arranged over the pixels.

According to some embodiments, a hole control layer may be located between the first electrode AE and the light emitting layer EL. The hole control layer may be commonly arranged in the light emitting area PXA and the non-light-emitting area NPXA. The hole control layer may include a hole transport layer and may further include a hole injection layer. An electron control layer may be located between the light emitting layer EL and the second electrode CE. The electron control layer may include an electron transport layer and may further include an electron injection layer. Each of the hole control layer and the electron control layer may be commonly formed in the plural pixels using an open mask or an inkjet process.

The encapsulation layer 140 may be located on the light emitting element layer 130. The encapsulation layer 140 may include an inorganic layer, an organic layer, and an inorganic layer, which are sequentially stacked one on another, however, the layers of the encapsulation layer 140 should not be limited thereto or thereby. The inorganic layers may protect the light emitting element layer 130 from moisture and oxygen, and the organic layer may protect the light emitting element layer 130 from a foreign substance such as dust particles. The inorganic layers may include a silicon nitride layer, a silicon oxynitride layer, a silicon oxide layer, a titanium oxide layer, or an aluminum oxide layer. The organic layer may include an acrylic-based organic layer, however, it should not be limited thereto or thereby.

The sensor layer 200 may include a base layer 201, a first conductive layer 202, an intermediate insulating layer 203, a second conductive layer 204, and a cover insulating layer 205.

The base layer 201 may be an inorganic layer including at least one of silicon nitride, silicon oxynitride, or silicon oxide. As another way, the base layer 201 may be an organic layer including an epoxy-based resin, an acrylic-based resin, or an imide-based resin. The base layer 201 may have a single-layer structure or a multi-layer structure of layers stacked in the third direction DR3. According to some embodiments, the sensor layer 200 may not include the base layer 201.

Each of the first conductive layer 202 and the second conductive layer 204 may have a single-layer structure or a multi-layer structure of layers stacked in the third direction DR3.

Each of the first and second conductive layers 202 and 204 having the single-layer structure may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), indium zinc tin oxide (ITZO), or the like. In addition, the transparent conductive layer may include conductive polymer such as poly(3,4-ethylenedioxythiophene) (PEDOT), metal nanowire, graphene, or the like.

Each of the first and second conductive layers 202 and 204 having the multi-layer structure may include metal layers. The metal layers may have a three-layer structure of titanium/aluminum/titanium. The conductive layer having the multi-layer structure may include at least one metal layer and at least one transparent conductive layer.

The first conductive layer 202 may have a thickness equal to or greater than a thickness of the second conductive layer 204. When the thickness of the first conductive layer 202 is greater than the thickness of the second conductive layer 204, a resistance of components, e.g., an electrode, a sensing pattern, or a bridge pattern, included in the first conductive layer 202 may be reduced. In addition, because the first conductive layer 202 is located at a position lower than the second conductive layer 204, a probability that the components included in the first conductive layer is recognized due to a reflection of external light may be lower than a probability that components included in the second conductive layer 204 is recognized even though the thickness of the first conductive layer 202 increases.

At least one of the intermediate insulating layer 203 or the cover insulating layer 205 may include an inorganic layer. The inorganic layer may include at least one of aluminum oxide, titanium oxide, silicon oxide, silicon nitride, silicon oxynitride, zirconium oxide, or hafnium oxide.

At least one of the intermediate insulating layer 203 or the cover insulating layer 205 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

In the above descriptions, it is explained that the sensor layer 200 includes the first conductive layer 202 and the second conductive layer 204, that is, a total of two conductive layers, however, the present disclosure should not be limited thereto or thereby. As an example, the sensor layer 200 may include three or more conductive layers.

Figure 6B:
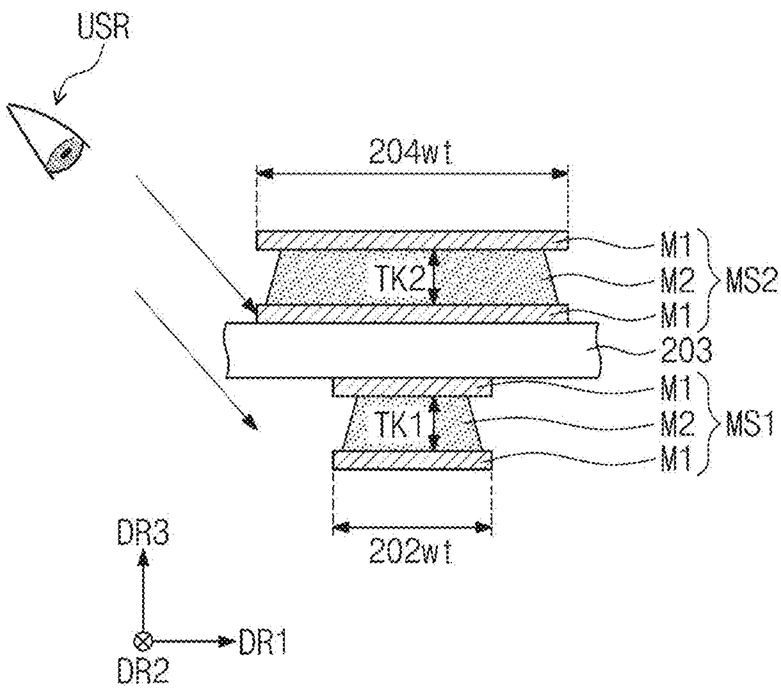
FIG. 6B is a cross-sectional view of a sensor layer according to some embodiments of the present disclosure.

FIG. 6B is a cross-sectional view of the sensor layer 200 according to some embodiments of the present disclosure.

Referring to FIGS. 6A and 6B, a second mesh line MS2 included in the second conductive layer 204 may have a second width 204*wt* that is equal to or greater than a first width 202*wt* of a first mesh line MS1 included in the first conductive layer 202. When a user USR is looking at the first mesh line MS1 and the second mesh line MS2 from a side of the sensor layer 200, a probability that the user USR recognizes the first mesh line MS1 may be reduced because the width of the first mesh line MS1 is smaller than that of the second mesh line MS2.

Each of the first mesh line MS1 and the second mesh line MS2 may include first metal layers M1 and a second metal layer M2 located between the first metal layers M1. As an example, the first metal layers M1 may include titanium (Ti), and the second metal layer M2 may include aluminum (Al), however, this is merely an example.

According to some embodiments, a first thickness TK1 of the second metal layer M2 of the first mesh line MS1 and a second thickness TK2 of the second metal layer M2 of the second mesh line MS2 may be substantially the same as each other, however, the present disclosure should not be particularly limited. As an example, the first thickness TK1 may be greater than the second thickness TK2, or the second thickness TK2 may be greater than the first thickness TK1. Because the first mesh line MS1 is located at a position lower than the second mesh line MS2, a probability that the first mesh line MS1 is recognized due to the reflection of external light may be lower than a probability that the second mesh line MS2 is recognized due to the reflection of external light even though the thickness of the first mesh line MS1 increases. According to some embodiments, each of the first thickness TK1 and the second thickness TK2 may be about 1000 angstroms or more, e.g., about 6000 angstroms.

Figure 7A:
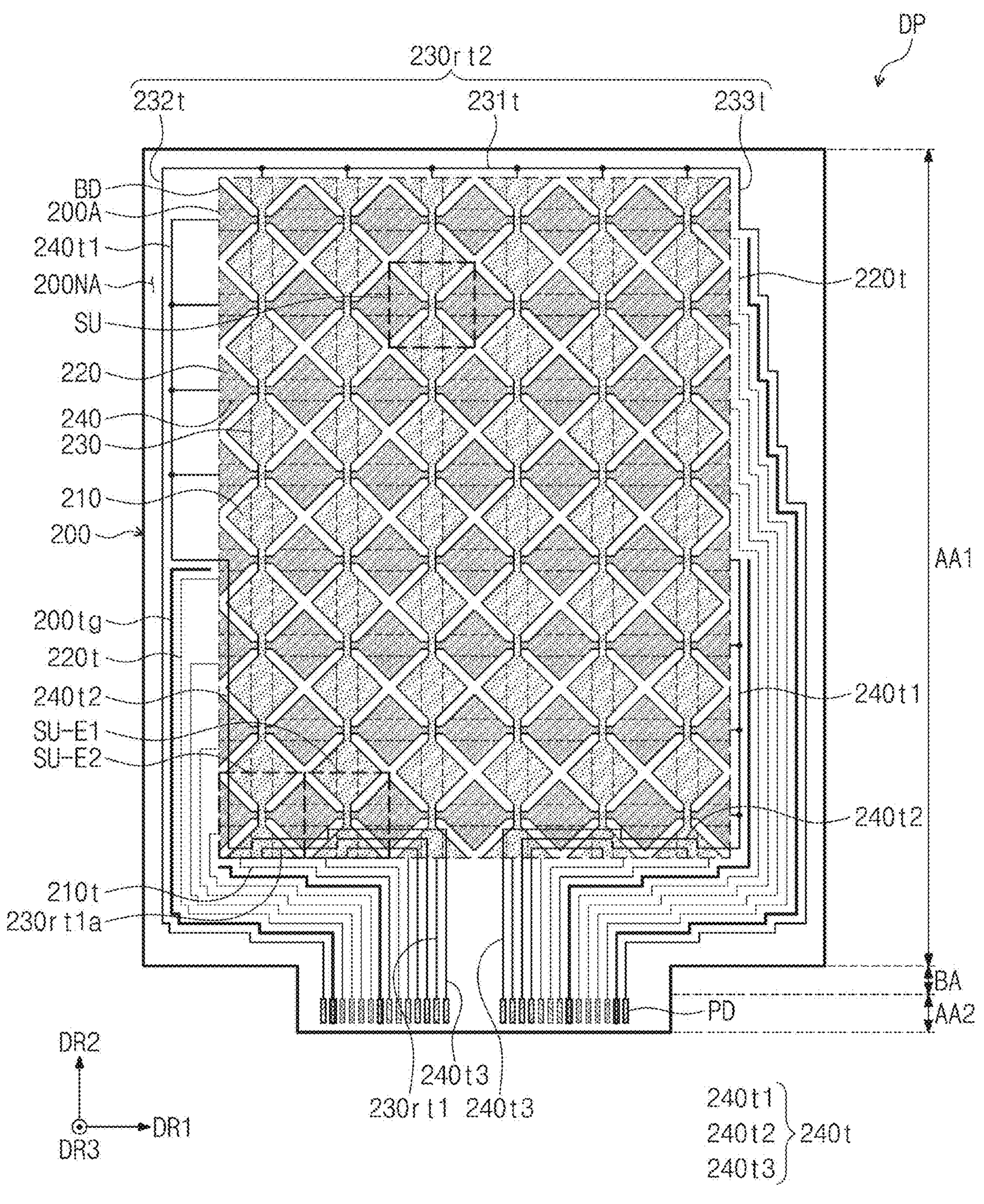
FIG. 7A is a plan view of a display panel according to some embodiments of the present disclosure.

FIG. 7A is a plan view of the display panel DP according to some embodiments of the present disclosure.

Referring to FIG. 7A, the display panel DP may include a first area AA1, a bending area BA, and a second area AA2. The bending area BA may be defined between the first area AA1 and the second area AA2 spaced apart from the first area AA1 in the second direction DR2. A width (or a length) in the first direction DR1 of the bending area BA and a width (or a length) in the first direction DR1 of the second area AA2 may be smaller than a width (or a length) in the first direction DR1 of the first area AA1. An area having a relatively short length in a bending axis direction may be relatively easily bent.

FIG. 7A is a plan view showing the unfolded state of the display panel DP before the display panel DP is assembled with other components, that is, before the display panel DP is modularized. A portion of the display panel DP may be bent to be modularized. As an example, the bending area BA may be bent to allow the second area AA2 to be located under the first area AA1.

The display panel DP may include the sensor layer 200. The sensor layer 200 may include the sensing area 200A and the peripheral area 200NA adjacent to the sensing area 200A, which are defined therein.

The first area AA1 may overlap the sensing area 200A and a portion of the peripheral area 200NA. The bending area BA and the second area AA2 may overlap the other portion of the peripheral area 200NA.

The sensor layer 200 may include a plurality of first electrodes 210, a plurality of second electrodes 220, a plurality of third electrodes 230, and a plurality of fourth electrodes 240, which are arranged in the first area AA1 and sensing area 200A.

Each of the first electrodes 210 may intersect the second electrodes 220. Each of the first electrodes 210 may extend in the second direction DR2, and the first electrodes 210 may be arranged spaced apart from each other in the first direction DR1. Each of the second electrodes 220 may extend in the first direction DR1, and the second electrodes 220 may be arranged spaced apart from each other in the second direction DR2. A sensing unit SU of the sensor layer 200 may be an area where one first electrode 210 intersect one second electrode 220.

FIG. 7A shows six first electrodes 210, eight second electrodes 220, and forty-eight sensing units SU as a representative example, however, the number of the first electrodes 210 and the number of the second electrodes 220 should not be limited thereto or thereby. According to some embodiments, a width in the first direction DR1 of the sensing area 200A may be equal to or smaller than a width in the second direction DR2 of the sensing area 200A. Accordingly, the number of the first electrodes 210 arranged in the first direction DR1 may be smaller than the number of the second electrodes 220 arranged in the second direction DR2.

The third electrodes 230 may extend in the second direction DR2, and the third electrodes 230 may be arranged spaced apart from each other in the first direction DR1. One third electrode 230 may overlap one first electrode 210. As an example, one third electrode 230 may overlap at least a portion of the first electrode 210. In the present disclosure, the expression "Component A overlaps component B." means that a portion of component A overlaps a portion of component B, an entire portion of component A overlaps a portion of component B, an entire portion of component B overlaps a portion of component A, or an entire portion of component A overlaps an entire portion of component B.

According to some embodiments, a capacitance (or a coupling capacitance) between one first electrode 210 and one third electrode 230 may be controlled by adjusting the overlap area between the one first electrode 210 and the one third electrode 230.

The fourth electrodes 240 may be arranged in the second direction DR2, and the fourth electrodes 240 may extend in the first direction DR1. One fourth electrode 240 may overlap at least a portion of one second electrode 220. According to some embodiments, a capacitance (or a coupling capacitance) between the one second electrode 220 and the one fourth electrode 240 may be controlled by adjusting the overlap area between the one second electrode 220 and the one fourth electrode 240. The fourth electrodes 240 may be referred to as sensing auxiliary electrodes or second auxiliary electrodes.

At least some electrodes of the fourth electrodes 240 may be electrically connected to each other to form one electrode group. As an example, FIG. 7A shows a structure in which four fourth electrodes 240 are connected to the same trace line, for example, an auxiliary trace line 240*t*, to form one electrode group as a representative example. Accordingly, FIG. 7A shows a structure in which two electrode groups are arranged in the second direction DR2. However, the number of the fourth electrodes 240 that form one electrode group should not be limited thereto or thereby. As an example, the number of the fourth electrodes 240 that form one electrode group may be eight, and in this case, the sensor layer 200 may include one electrode group.

The sensor layer 200 may further include a plurality of first trace lines 210*t* and a plurality of second trace lines 220*t*, which are arranged in the peripheral area 200NA. The first trace lines 210*t* and the second trace lines 220*t* may be arranged to overlap the non-display area 100NA of the display layer 100 (refer to FIG. 4). The first trace lines 210*t* may be electrically connected to the first electrodes 210 in a one-to-one correspondence. The second trace lines 220*t* may be electrically connected to the second electrodes 220 in a one-to-one correspondence.

The first trace lines 210*t* and the second trace lines 220*t* may serve as a portion of the sensing electrode, e.g., a portion of the first electrode 210 or a portion of the second electrode 220, during a mode in which the pen PN (refer to FIG. 5) is sensed. Accordingly, the first trace lines 210*t* and the second trace lines 220*t* may be arranged in the peripheral area 200NA. As a result, deformation of the first electrodes 210 and the second electrodes 220 may be reduced, and thus, a coordinate distortion when the pen PN is sensed may be reduced.

The sensor layer 200 may further include a plurality of first auxiliary trace lines 230*rt*1, a second auxiliary trace line 230*rt*2, and a plurality of auxiliary trace lines 240*t*.

At least one of the third electrodes 230, at least one of the first auxiliary trace lines 230*rt*1, or the second auxiliary trace line 230*rt*2 may form one loop. A magnetic field may be formed due to a current path defined by the one loop. An external input device, e.g., the pen, may be charged with the magnetic field. Accordingly, the first auxiliary trace lines 230*rt*1 may be referred to as first loop trace lines, and the second auxiliary trace line 230*rt*2 may be referred to as a second loop trace line. The third electrodes 230 may be referred to as charging electrodes, loop electrodes, or first auxiliary electrodes.

The first auxiliary trace lines 230*rt*1 may be connected to the third electrodes 230 in a one-to-one correspondence. That is, the number of the first auxiliary trace lines 230*rt*1 may correspond to the number of the third electrodes 230. FIG. 7A shows six first auxiliary trace lines 230*rt*1 and six third electrodes 230 as a representative example.

According to some embodiments, one first auxiliary trace line may be electrically connected to plural third electrodes. The plural third electrodes connected to the one first auxiliary trace line may be referred to as one electrode group. As the number of the third electrodes included in one electrode group and connected to each other in parallel increases, a resistance of the one electrode group may decrease. Accordingly, a power efficiency may be relatively improved, and a sensing sensitivity may be relatively improved. On the contrary, as the number of the third electrodes included in one electrode group decreases, a coil pattern formed using one electrode group may be implemented in more diverse forms.

The second auxiliary trace line 230*rt*2 may be electrically connected to the third electrodes 230. The second auxiliary trace line 230*rt*2 may be electrically connected to all the third electrodes 230.

The second auxiliary trace line 230*rt*2 may include a first line portion 231*t* extending in the first direction DR1 and electrically connected to the third electrodes 230, a second line portion 232*t* extending from a first end of the first line portion 231*t* in a direction parallel to the second direction DR2, and a third line portion 233*t* extending from a second end of the first line portion 231*t* to the direction parallel to the second direction DR2.

According to the present disclosure, each of a resistance of the second line portion 232*t* and a resistance of the third line portion 233*t* may be substantially the same as a resistance of one third electrode among the third electrodes 230. A width in the first direction DR1 of each of the second line portion 232*t* and the third line portion 233*t* may be adjusted to relatively improve the resistance of the second line portion 232*t* and the resistance of the third line portion 233*t*. However, this is merely an example, and the first, second, and third line portions 231*t*, 232*t*, and 233*t* may have substantially the same width as each other.

The second auxiliary trace line 230*rt*2 may be provided in a shape surrounding areas in which the first trace lines 210*t*, the second trace lines 220*t*, the auxiliary trace line 240*t*, and the first auxiliary trace lines 230*rt*1 are arranged. The second line portion 232*t* and the third line portion 233*t* may act as the third electrodes 230, and thus, the same effect as if the third electrodes 230 are located in the peripheral area 200NA may be achieved with the second line portion 232*t* and the third line portion 233*t*. As an example, one of the second line portion 232*t* and the third line portion 233*t* and one of the third electrodes 230 may form a coil. Therefore, the pen placed at an area adjacent to the peripheral area 200NA may be sufficiently charged by a current loop that includes the second line portion 232*t* or the third line portion 233*t*.

The auxiliary trace lines 240*t* may be spaced apart from each other with the sensing area 200A interposed therebetween. FIG. 7A shows the structure in which two electrode groups are arranged as a representative example. The auxiliary trace line 240*t* connected to four fourth electrodes 240 located at an upper side and the auxiliary trace line 240*t* connected to four fourth electrodes 240 located at a lower side may be spaced apart from each other with the sensing area 200A interposed therebetween, however, the present disclosure should not be particularly limited.

Each of the auxiliary trace lines 240*t* may include a first portion 240*t*1, a second portion 240*t*2, and a third portion 240*t*3. The first portion 240*t*1 may extend from at least one of the fourth electrodes 240 and may be located in the peripheral area 200NA. The second portion 240*t*2 may extend from the first portion 240*t*1 and may be located in the sensing area 200A. The third portion 240*t*3 may extend from the second portion 240*t*2 and may be located in the peripheral area 200NA. Referring to FIG. 4, the second portion 240*t*2 may overlap the display area 100A, and the first portion 240*t*1 and the third portion 240*t*3 may overlap the non-display area 100NA.

At least a portion of a first auxiliary trace line 230*rt*1*a* (hereinafter, referred to as a first-first auxiliary trace line) among the first auxiliary trace lines 230*rt*1 may be located in the sensing area 200A. That is, the portion of the first-first auxiliary trace line 230*rt*1*a* may overlap the display area 100A.

The third electrodes 230 and the fourth electrodes 240 may be floated when the pen PN is sensed. Accordingly, even though a portion of the first-first auxiliary trace line 230*rt*1*a* connected to the third electrodes 230 and a portion of each of the auxiliary trace lines 240*t* connected to the fourth electrodes 240 are located in the sensing area 200A, changes in shape, resistance, or routing location of the first-first auxiliary trace line 230*rt*1*a* and the auxiliary trace lines 240*t* may have little to no effect on the sensing operation for the pen.

Among the trace lines located in an area, e.g., an area between the sensing area 200A and the bending area BA, where the trace lines are intensively arranged in the peripheral area 200NA, at least a portion of some trace lines may be located in the sensing area 200A. Therefore, a size of the area where the trace lines are arranged in the peripheral area 200NA may be reduced, and a size of an area where the trace lines are not arranged (hereinafter referred to as an unused area) in the peripheral area 200NA may increase.

According to some embodiments, the area occupied by the peripheral area 200NA in a total area of the display panel DP may be reduced by removing (for example, by cutting) the unused area, and thus, a narrow bezel may be implemented. According to some embodiments, a line width may be adjusted to relatively improve the resistance of each of the first trace lines 210*t* or the second trace lines 220*t* by utilizing the unused area. As an example, the resistance may be reduced by increasing the line width of the first trace lines 210*t* or the second trace lines 220*t*. In this case, the sensing sensitivity of the sensor layer 200 may be relatively improved.

The sensor layer 200 may further include a plurality of guard lines 200*tg* located in the peripheral area 200NA. Each of the guard lines 200*tg* may be grounded, may be floated, or may receive a signal (e.g., a set or predetermined signal) depending on the operation mode of the sensor layer 200. As an example, when the sensor layer 200 operates in a mutual capacitance detection mode or a pen sensing driving mode, the guard lines 200*tg* may be grounded. When the sensor layer 200 operates in a self-capacitance detection mode, the guard lines 200*tg* may receive the same signal as a signal applied to the trace lines adjacent thereto. Accordingly, a parasitic capacitance formed between the trace lines may be reduced or prevented by the guard lines 200*tg*. When the sensor layer 200 operates in a pen charging driving mode, the guard lines 200*tg* may be floated.

The sensor layer 200 may further include a plurality of pads PD located in the second area AA2. FIG. 7A shows a structure in which the pads PD are arranged in one row along the first direction DR1 as a representative example, however, the present disclosure should not be limited thereto or thereby. As an example, the pads PD may be arranged in multiple rows. The pads PD may be electrically connected to both ends of the first trace lines 210*t*, the second trace lines 220*t*, the first auxiliary trace lines 230*rt*1, and the second auxiliary trace line 230*rt*2, the auxiliary trace lines 240*t*, and the guard lines 200*tg* in a one-to-one correspondence.

Figure 7B:
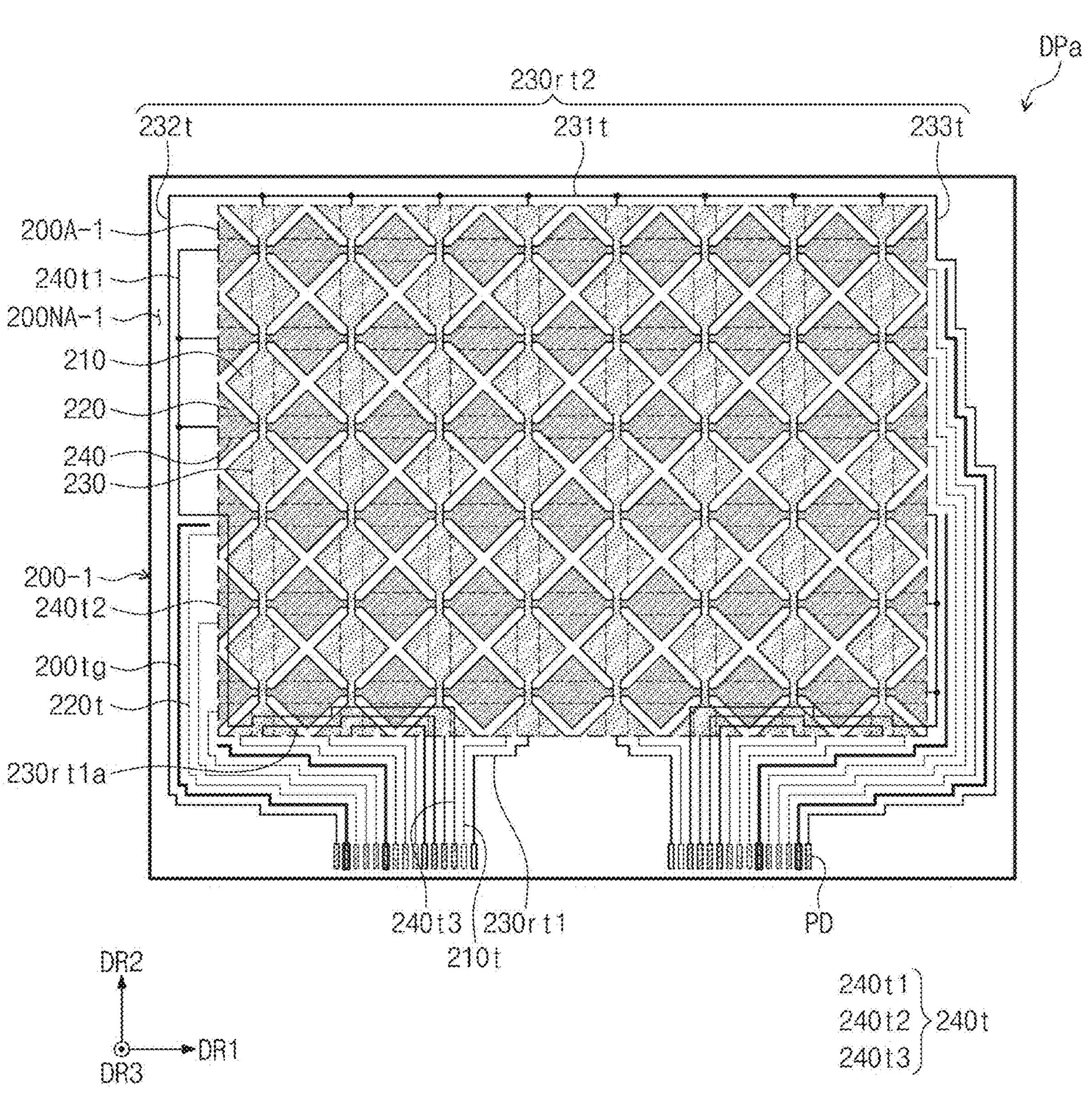
FIG. 7B is a plan view of a display panel according to some embodiments of the present disclosure.

FIG. 7B is a plan view of a display panel DPa according to some embodiments of the present disclosure. In FIG. 7B, the same reference numerals denote the same elements in FIG. 7A, and thus, detailed descriptions of the same elements will be omitted.

Referring to FIGS. 4 and 7B, the display panel DPa may include a sensor layer 200-1. The sensor layer 200-1 may include a sensing area 200A-1 and a peripheral area 200NA-1 adjacent to the sensing area 200A-1. A width in the first direction DR1 of the sensing area 200A-1 may be greater than a width in the second direction DR2 of the sensing area 200A-1. Accordingly, the number of first electrodes 210 arranged in the first direction DR1 may be greater than the number of second electrodes 220 arranged in the second direction DR2.

A base layer 110 of the display panel DPa may be a rigid glass substrate. Therefore, different from the display panel DP described with reference to FIG. 7A, the display panel DPa may not include a bending area, however, this is merely an example.

According to some embodiments, among trace lines located in an area where the trace lines are intensively arranged in the peripheral area 200NA-1, e.g., an area between the sensing area 200A-1 and an area in which pads PD are located, at least a portion of some trace lines may be located in the sensing area 200A-1. Therefore, a size of the area where the trace lines are arranged in the peripheral area 200NA-1 may be reduced, and a size of an area where the trace lines are not arranged (hereinafter referred to as an unused area) in the peripheral area 200NA-1 may increase.

According to some embodiments, the area occupied by the peripheral area 200NA-1 in a total area of the display panel DPa may be reduced by removing (for example, by cutting) the unused area, and thus, a narrow bezel may be implemented. According to some embodiments, a line width may be adjusted to relatively improve the resistance of each of first trace lines 210*t* or second trace lines 220*t* by utilizing the unused area. In this case, the sensing sensitivity of the sensor layer 200-1 may be relatively improved.

Figure 8A:
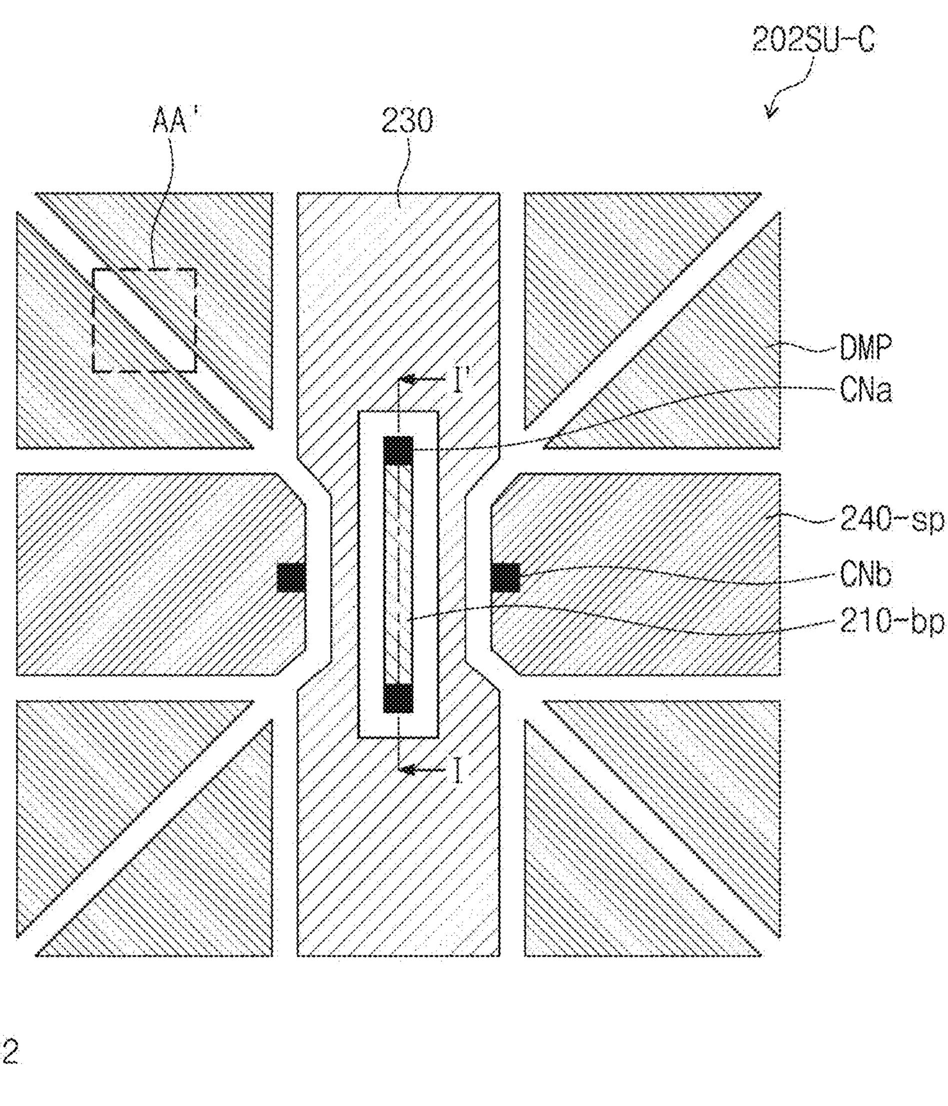
FIG. 8A is a plan view of a first conductive layer of a sensing unit according to some embodiments of the present disclosure.
Figure 8B:
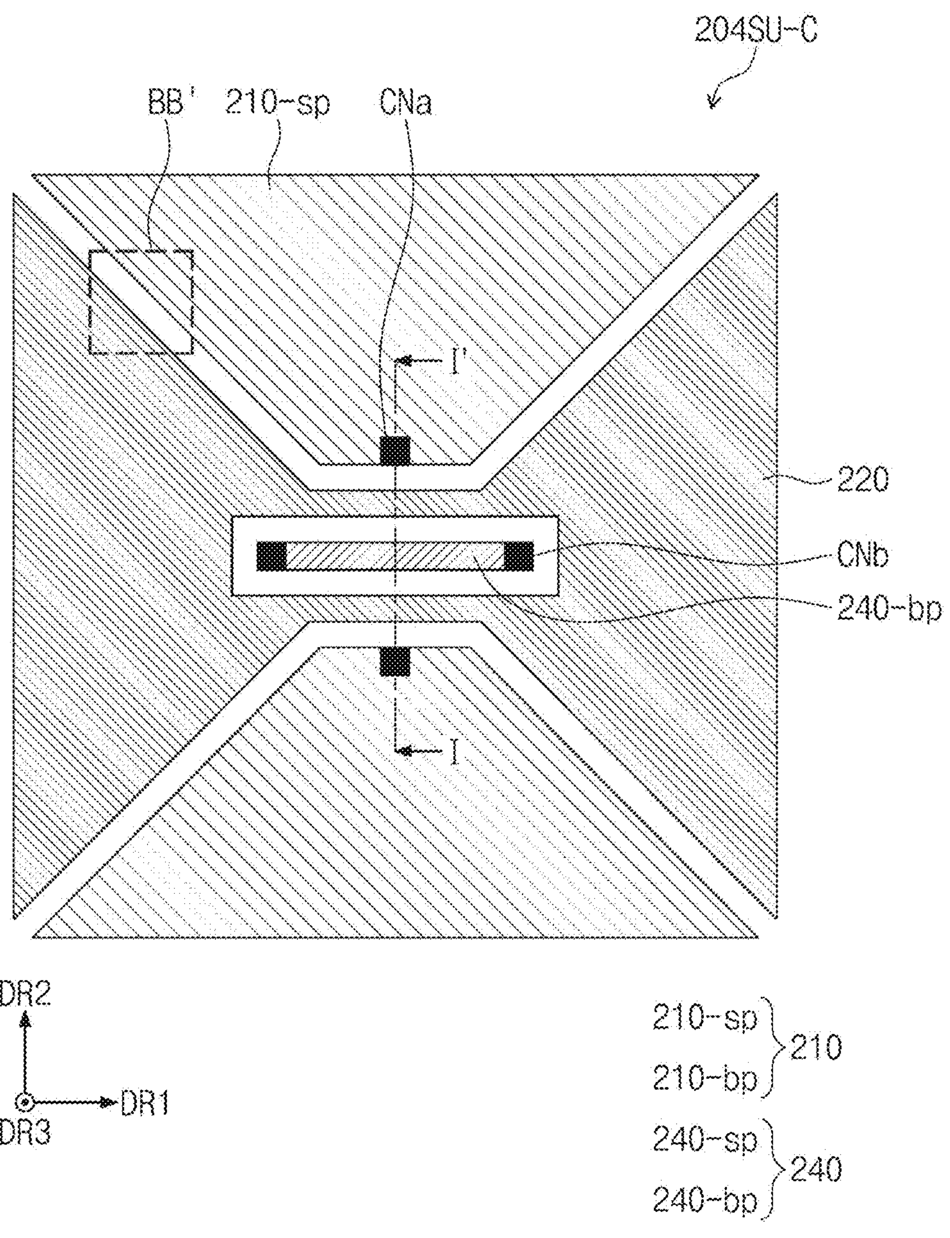
FIG. 8B is a plan view of a second conductive layer of a sensing unit according to some embodiments of the present disclosure.
Figure 9:
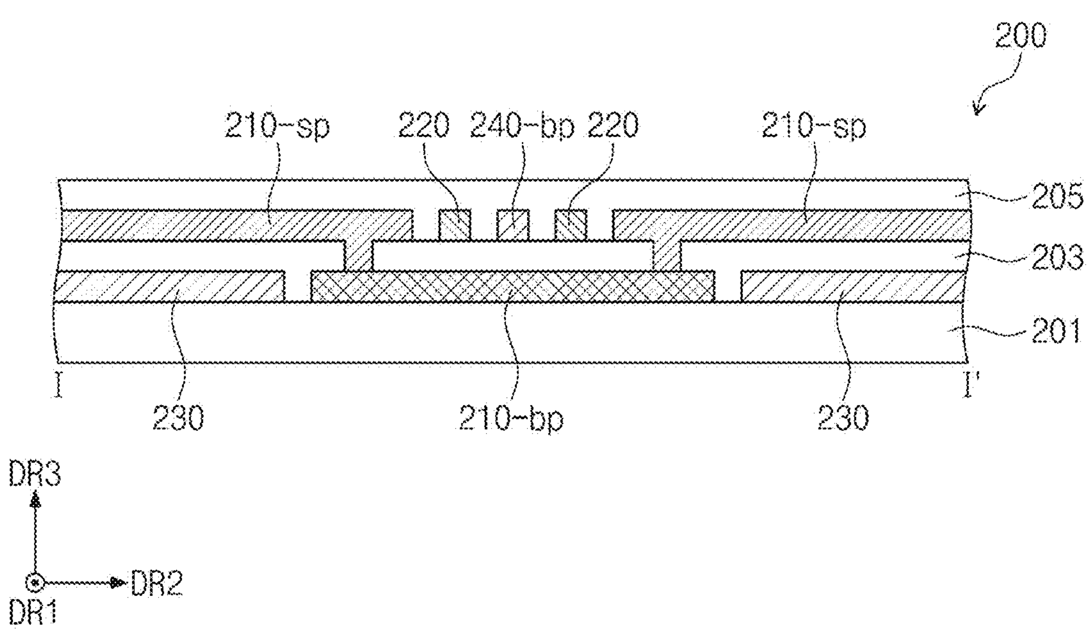
FIG. 9 is a cross-sectional view of a sensor layer taken along a line I-I' of FIGS. 8A and 8B according to some embodiments of the present disclosure.

FIG. 8A is a plan view of a first conductive layer 202SU-C of a sensing unit (refer to SU of FIG. 7A) according to some embodiments of the present disclosure. FIG. 8B is a plan view of a second conductive layer 204SU-C of the sensing unit (refer to SU of FIG. 7A) according to some embodiments of the present disclosure. FIG. 9 is a cross-sectional view of the sensor layer 200 taken along a line I-I' of FIG. 8A and a line I-I' of FIG. 8B according to some embodiments of the present disclosure.

FIGS. 8A and 8B show a shape of the first conductive layer 202SU-C and a shape of the second conductive layer 204SU-C of one sensing unit SU that is not adjacent to the boundary BD (refer to FIG. 7A) and is spaced apart from the boundary BD as a representative example. However, this is merely an example, and the shapes of the first conductive layer 202SU-C and the second conductive layer 204SU-C should not be limited thereto or thereby.

Referring to FIGS. 8A, 8B, and 9, the first electrode 210 may include first sensing patterns 210-*sp* and a first bridge pattern 210-*bp*. The first sensing patterns 210-*sp* and the first bridge pattern 210-*bp* may be electrically connected to each other through a first contact CNa. The second electrode 220 may be located on the same layer as the first sensing patterns 210-*sp*. As an example, the first sensing patterns 210-*sp* may be spaced apart from each other with the second electrode 220 interposed therebetween. The first bridge pattern 210-*bp* may be located on a different layer from the second electrode 220 and may be insulated from the second electrode 220 while intersecting the second electrode 220.

The third electrode 230 may be located on the same layer as the first bridge pattern 210-*bp*. The third electrode 230 may be provided with an opening defined therethrough to surround the first bridge pattern 210-*bp*. The third electrode 230 may overlap the first sensing patterns 210-*sp*. Accordingly, a coupling capacitor may be defined between the first electrode 210 and the third electrode 230.

The fourth electrode 240 may include second sensing patterns 240-*sp* and a second bridge pattern 240-*bp*. The second sensing patterns 240-*sp* and the second bridge pattern 240-*bp* may be electrically connected to each other through a second contact CNb. The third electrode 230 may be located on the same layer as the second sensing patterns 240-*sp*. As an example, the second sensing patterns 240-*sp* may be spaced apart from each other with the third electrode 230 interposed therebetween. The second bridge pattern 240-*bp* may be located on a different layer from the third electrode 230 and may be insulated from the third electrode 230 while intersecting the third electrode 230.

The first conductive layer 202SU-C may include the first bridge pattern 210-*bp*, the third electrode 230, and the second sensing patterns 240-*sp*. The second conductive layer 204SU-C may include the first sensing patterns 210-*sp*, the second electrode 220, and the second bridge pattern 240-*bp*.

The first conductive layer 202SU-C may further include dummy patterns DMP. Because the dummy patterns DMP are arranged in a vacant space, the probability of certain patterns being recognized due to the reflection of the external light may be reduced. That is, a visibility of the electronic device 1000 (refer to FIG. 1A) may be relatively improved. Each of the dummy patterns DMP may be electrically floated or electrically grounded. According to some embodiments, the dummy patterns DMP may be omitted.

Referring to FIGS. 8A and 8B, in the second conductive layer 204SU-C within one sensing unit SU, an area occupied by the components included in the first electrode 210 and the second electrode 220 may be larger than an area occupied by the components included in the third electrode 230 and the fourth electrode 240. The variation in capacitance due to the first input 2000 (refer to FIG. 5) may become larger as a distance decreases. Accordingly, components to detect the first input 2000 (refer to FIG. 5) may be arranged in a layer closer to a surface of the electronic device 1000 (refer to FIG. 1A) while occupying a relatively larger area. As a result, a touch sensing performance may be relatively improved.

FIGS. 6A to 9 show the structure in which the first, second, third, and fourth electrodes 210, 220, 230, and 240 is arranged in two conductive layers 202SU-C and 204SU-C as a representative example, however, the present disclosure should not be limited thereto or thereby. As an example, the first, second, third, and fourth electrodes 210, 220, 230, and 240 may be arranged in three conductive layers or four conductive layers.

According to some embodiments, the third electrode 230 to which a signal is applied in a charging driving mode may be included in a third conductive layer located under the first and second conductive layers 202SU-C and 204SU-C. As an example, the third conductive layer may be located under the base layer 201. The third conductive layer may be located between the base layer 201 and the display layer 100, may be located under the display layer 100, or may be included in the display layer 100.

The first, second, and fourth electrodes 210, 220, and 240 may be included in the first and second conductive layers 202SU-C and 204SU-C. As an example, when the third electrode 230 is implemented as a separate conductive layer as the third conductive layer, the shape of the third electrode 230 may be designed in various ways. As an example, the third electrode 230 may be provided to include a plurality of coils. In addition, the third electrode 230 may be provided more densely by using the third conductive layer, and in this case, a sensitivity to sense the pen may be relatively improved. According to some embodiments, the third conductive layer may include the fourth electrode 240 instead of the third electrode 230.

Figure 10A:
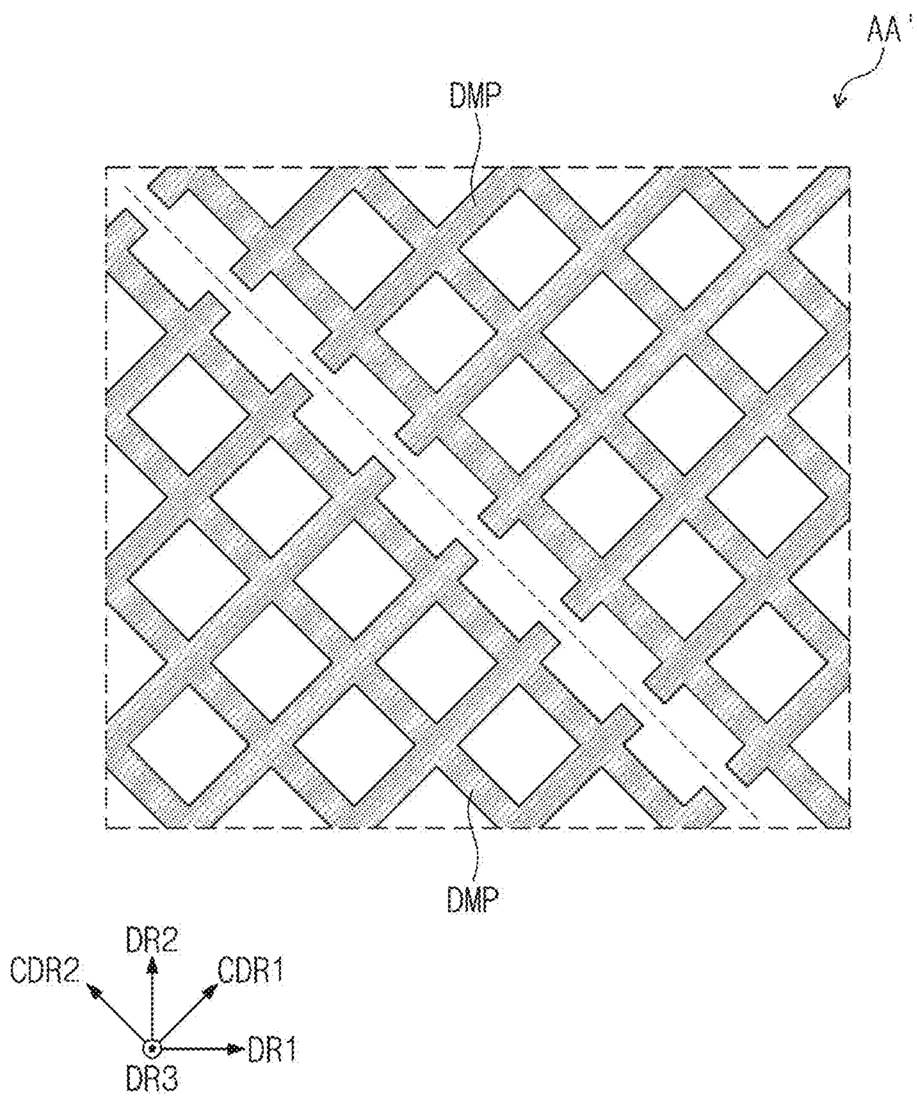
FIG. 10A is an enlarged plan view of an area AA' of FIG. 8A.
Figure 10B:
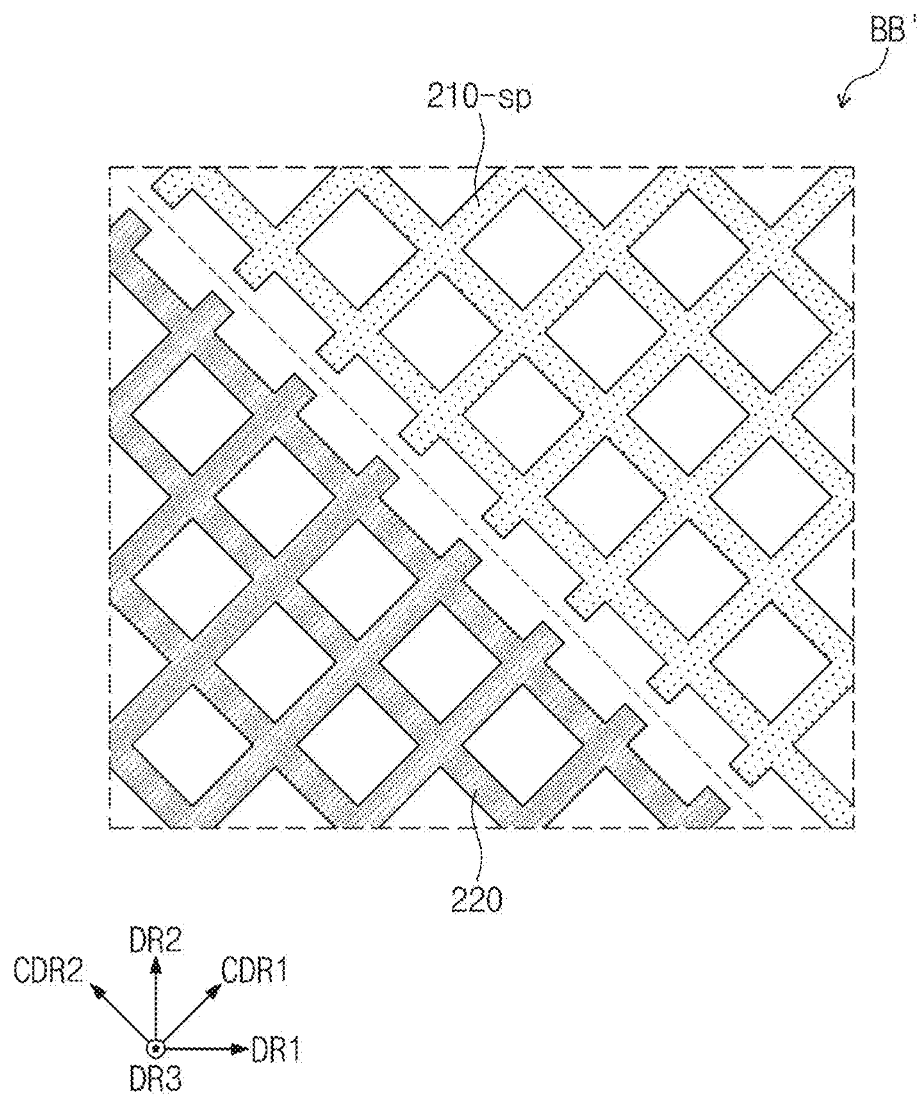
FIG. 10B is an enlarged plan view of an area BB' of FIG. 8B.

FIG. 10A is an enlarged plan view of an area AA' of FIG. 8A, and FIG. 10B is an enlarged plan view of an area BB' of FIG. 8B.

Referring to FIGS. 8A, 8B, 10A, and 101B, each of the first electrodes 210, the second electrodes 220, the third electrodes 230, the fourth electrodes 240, and the dummy patterns DMP may have a mesh structure. The mesh structure may include a plurality of mesh lines. The mesh lines may have a shape extending in a direction (e.g., a set or predetermined direction) and may be connected to each other. The shape of the mesh lines may have various shapes, such as a straight line, a line with protrusions, and an uneven line. Openings in which the mesh structure is not located may be defined (provided or formed) in each of the first electrodes 210, the second electrodes 220, the third electrodes 230, the fourth electrodes 240, and the dummy patterns DMP.

FIGS. 10A and 10B show the mesh structure that includes mesh lines extending in a first intersecting direction CDR1 intersecting the first direction DR1 and the second direction DR2 and mesh lines extending in a second intersecting direction CDR2 intersecting the first intersecting direction CDR1 as a representative example. However, the extension directions of the mesh lines forming the mesh structure should not be limited to those of FIGS. 10A and 10B. As an example, the mesh structure may include only mesh lines extending in the first direction DR1 and the second direction DR2 or may include the mesh lines extending in the first direction DR1, the second direction DR2, the first intersecting direction CDR1, and the second intersecting direction CDR2. That is, the mesh structure may be changed in various ways.

Figure 11A:
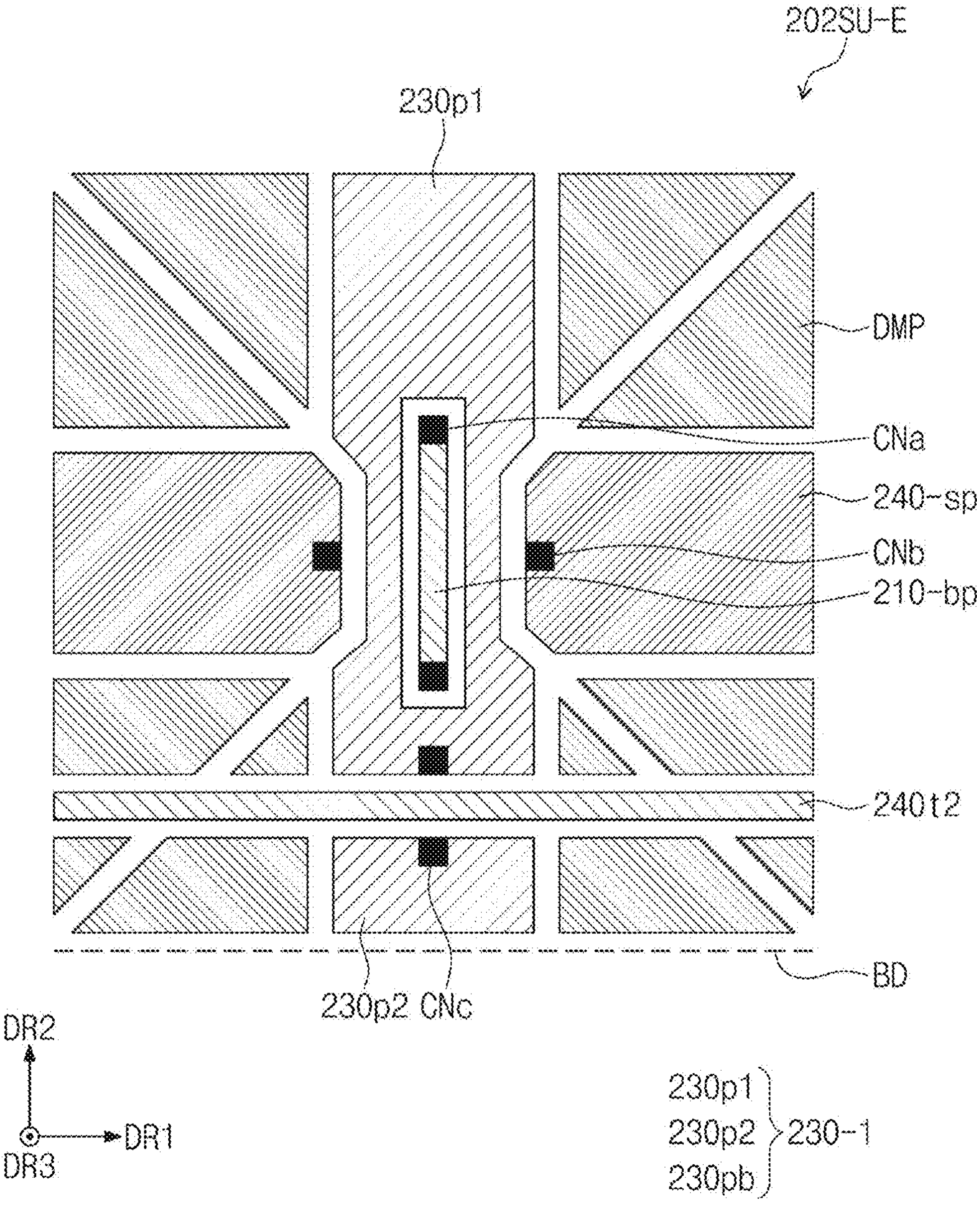
FIG. 11A is a plan view of a first conductive layer of a sensing unit according to some embodiments of the present disclosure.
Figure 11B:
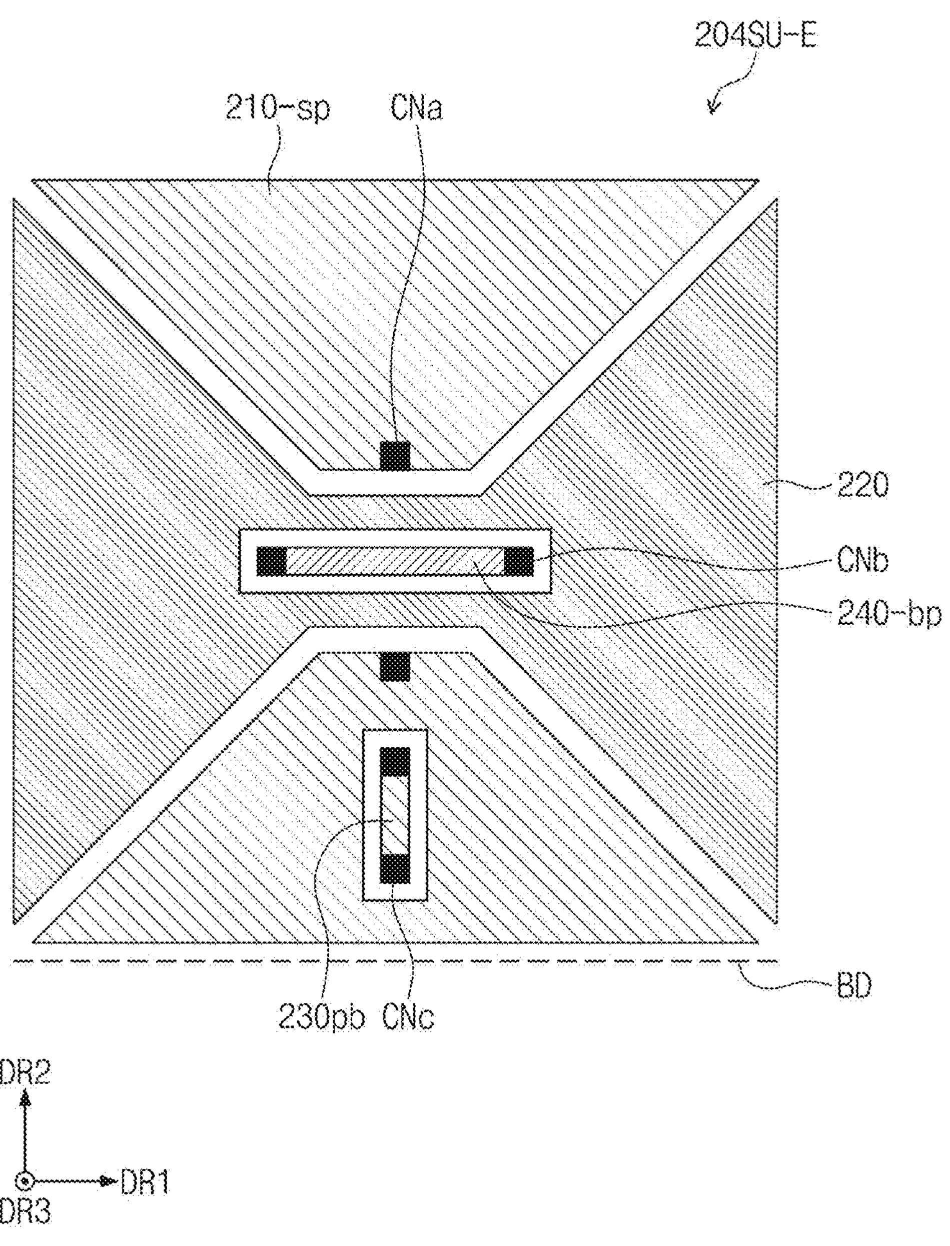
FIG. 11B is a plan view of a second conductive layer of a sensing unit according to some embodiments of the present disclosure.

FIG. 11A is a plan view of a first conductive layer 202SU-E of a sensing unit (refer to SU-E1 of FIG. 7A) according to some embodiments of the present disclosure. FIG. 11B is a plan view of a second conductive layer 204SU-E of the sensing unit (refer to SU-E1 of FIG. 7A) according to some embodiments of the present disclosure.

Referring to FIGS. 7A, 11A, and 11B, one sensing unit SU-E1 may be adjacent to the boundary BD between the sensing area 200A and the peripheral area 200NA. FIG. 11A shows the first conductive layer 202SU-E of the one sensing unit SU-E1, and FIG. 11B shows the second conductive layer 204SU-E of the sensing unit SU-E1.

Among the third electrodes 230, at least one third electrode 230-1 may include a first electrode portion 230*p*1, a second electrode portion 230*p*2, and an auxiliary bridge 230*pb* electrically connected to the first electrode portion 230*p*1 and the second electrode portion 230*p*2. The auxiliary bridge 230*pb* may be electrically connected to the first electrode portion 230*p*1 and the second electrode portion 230*p*2 through third contacts CNc.

The first electrode portion 230*p*1 and the second electrode portion 230*p*2 may be spaced apart from each other with the auxiliary trace line 240*t* interposed therebetween. As an example, because the second portion 240*t*2 of the auxiliary trace line 240*t* overlaps the sensing area 200A, the first electrode portion 230*p*1 and the second electrode portion 230*p*2 may be spaced apart from each other with the second portion 240*t*2 of the auxiliary trace line 240*t* interposed therebetween. The second portion 240*t*2 of the auxiliary trace line 240*t* may be insulated from the auxiliary bridge 230*pb* while intersecting the auxiliary bridge 230*pb*.

The auxiliary trace line 240*t* may be included in the first conductive layer 202SU-E and may be covered by the first sensing pattern 210-*sp* included in the second conductive layer 204SU-E and the second electrode 220. Accordingly, even though the auxiliary trace line 240*t* overlaps the sensing area 200A, it may have little to no effect on the sensing sensitivity of the sensor layer 200.

Figure 12A:
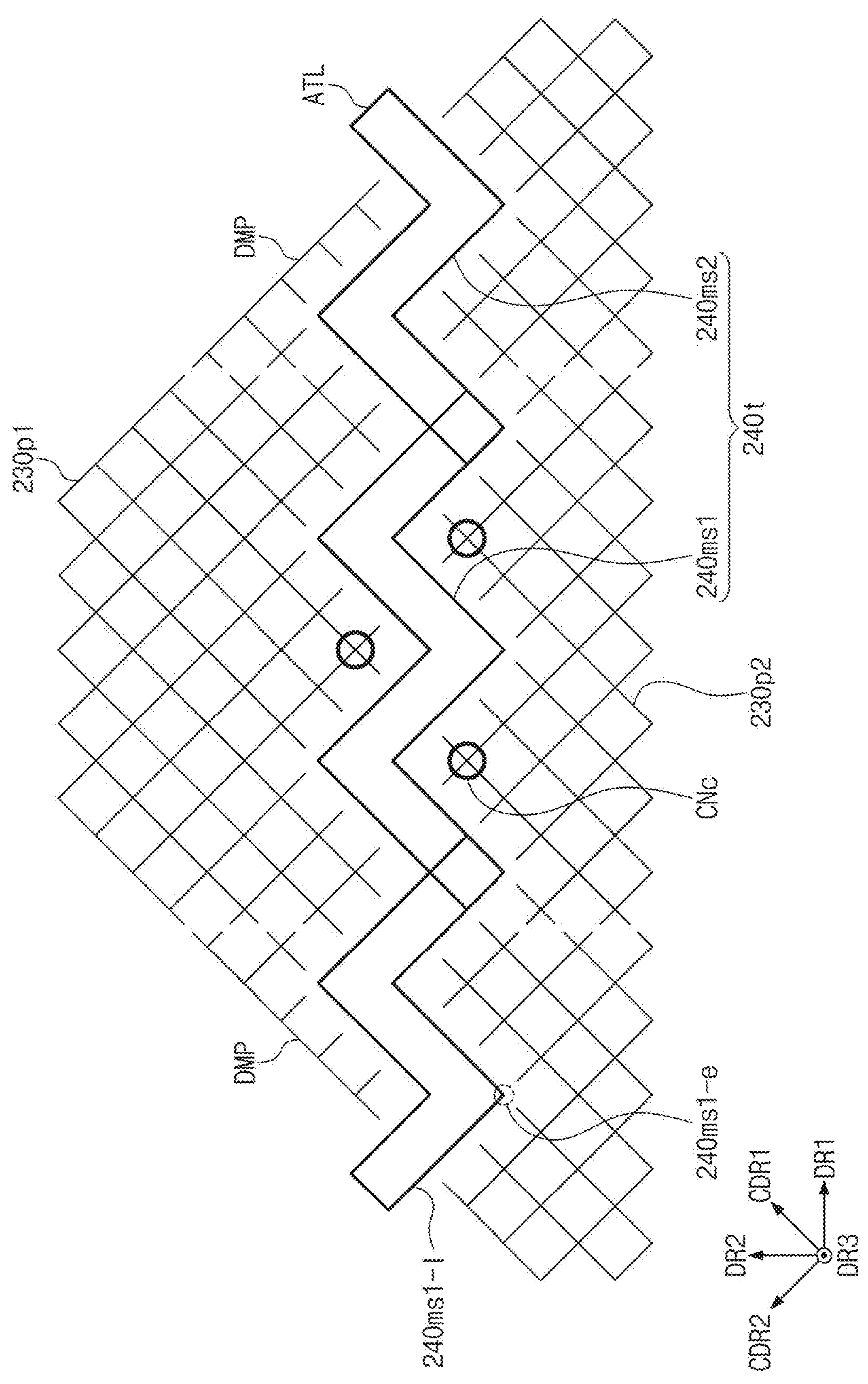
FIG. 12A is an enlarged plan view of a portion of a first conductive layer of a sensing unit according to some embodiments of the present disclosure.
Figure 12B:
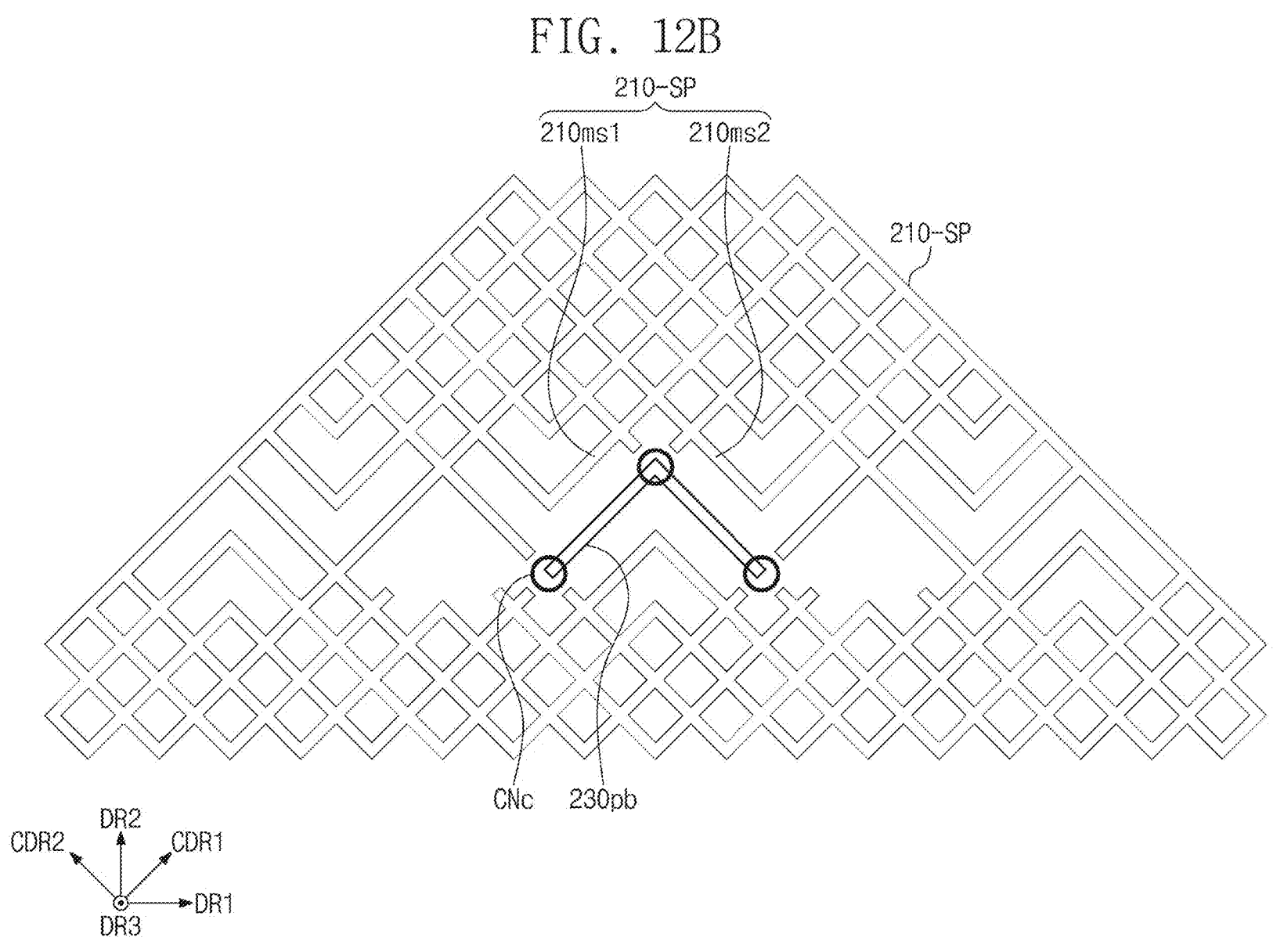
Figure 12C:
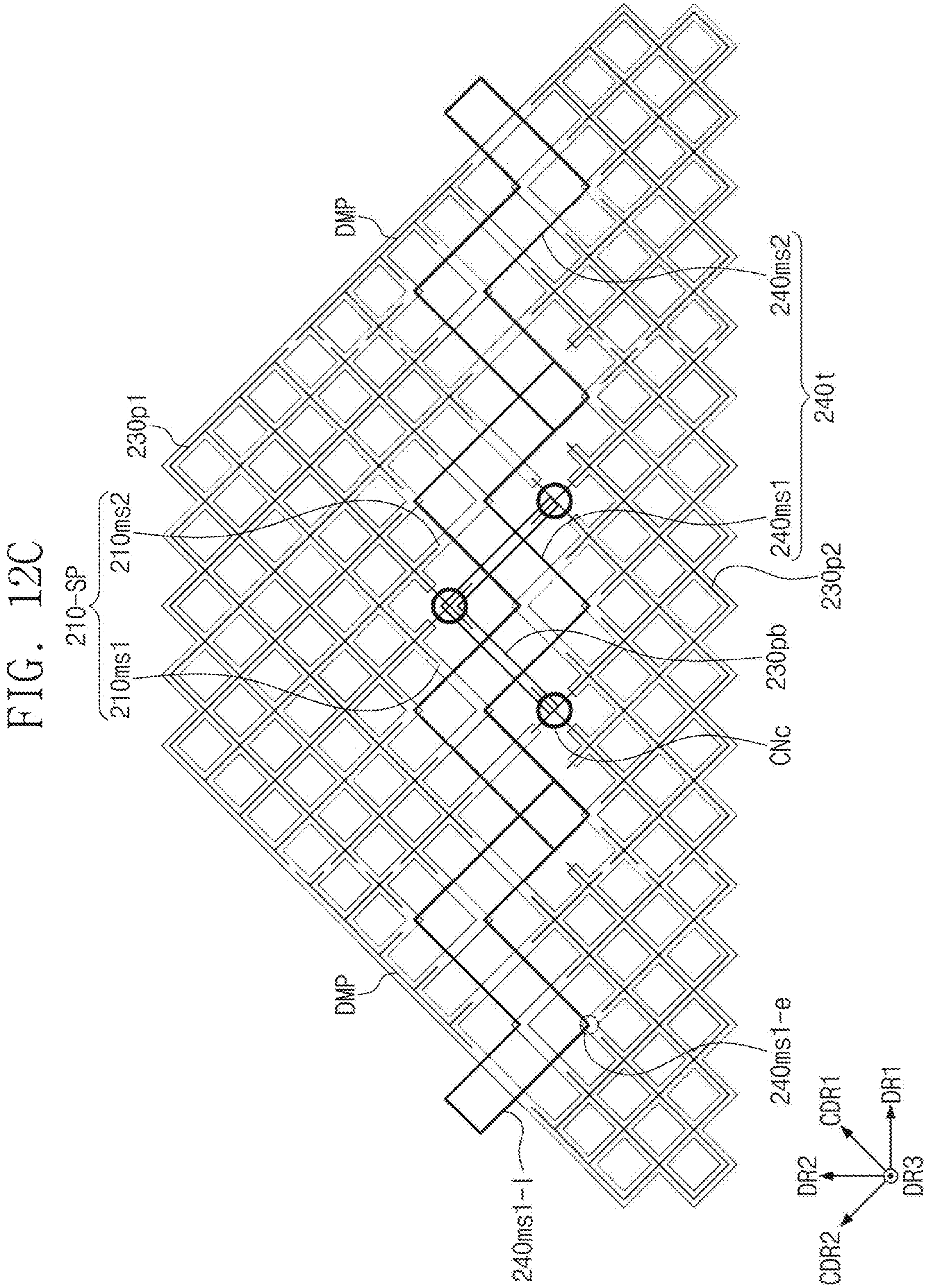
FIG. 12C is a plan view of the portion of the first conductive layer shown in FIG. 12A and the portion of the second conductive layer shown in FIG. 12B.

FIG. 12A is an enlarged plan view of a portion of the first conductive layer (refer to 202SU-E of FIG. 11A) of the sensing unit (refer to SU-E1 of FIG. 7A) according to some embodiments of the present disclosure. FIG. 12B is an enlarged plan view of a portion of the second conductive layer (refer to 204SU-E of FIG. 11A) of the sensing unit (refer to SU-E1 of FIG. 7A) according to some embodiments of the present disclosure. FIG. 12C is a plan view of the portion of the first conductive layer (refer to 202SU-E of FIG. 11A) shown in FIG. 12A and the portion of the second conductive layer (refer to 204SU-E of FIG. 11A).

FIG. 12A shows the first electrode portion 230*p*1, the second electrode portion 230*p*2, the dummy patterns DMP, and the auxiliary trace line 240*t* shown in FIG. 11A, and FIG. 12B shows the first sensing pattern 210-*sp* of one first electrode 210 and the auxiliary bridge 230*pb* shown in FIG. 11B.

The first sensing pattern 210-*sp* may include a first mesh line 210*ms*1 extending in the first intersecting direction CDR1 and a second mesh line 210*ms*2 extending in the second intersecting direction CDR2 intersecting the first intersecting direction CDR1. The auxiliary trace line 240*t* may include a third mesh line 240*ms*1 extending in the first intersecting direction CDR1 and a fourth mesh line 240*ms*2 extending in the second intersecting direction CDR2.

When viewed in the plane, e.g., when viewed in the third direction DR3, the first mesh line 210*ms*1 may overlap and intersect the fourth mesh line 240*ms*2, and the second mesh line 210*ms*2 may overlap and intersect the third mesh line 240*ms*1.

The third mesh line 240*ms*1 may include an end portion 240*ms*1-*e* connected to the fourth mesh line 240*ms*2 and an extension portion 240*ms*1-1 extending from the end portion 240*ms*1-*e* to the first intersecting direction CDR1, and the extension portion 240*ms*1-1 may not overlap the first mesh line 210*ms*1. That is, the mesh lines extending in the same direction may be designed not to overlap with each other to reduce a coupling capacitance between the auxiliary trace line 240*t* and one first electrode 210.

The auxiliary bridge 230*pb* may be electrically connected to the second electrode portion 230*p*2 through two third contacts CNc and may be electrically connected to the first electrode portion 230*p*1 through one third contact CNc.

Figure 13A:
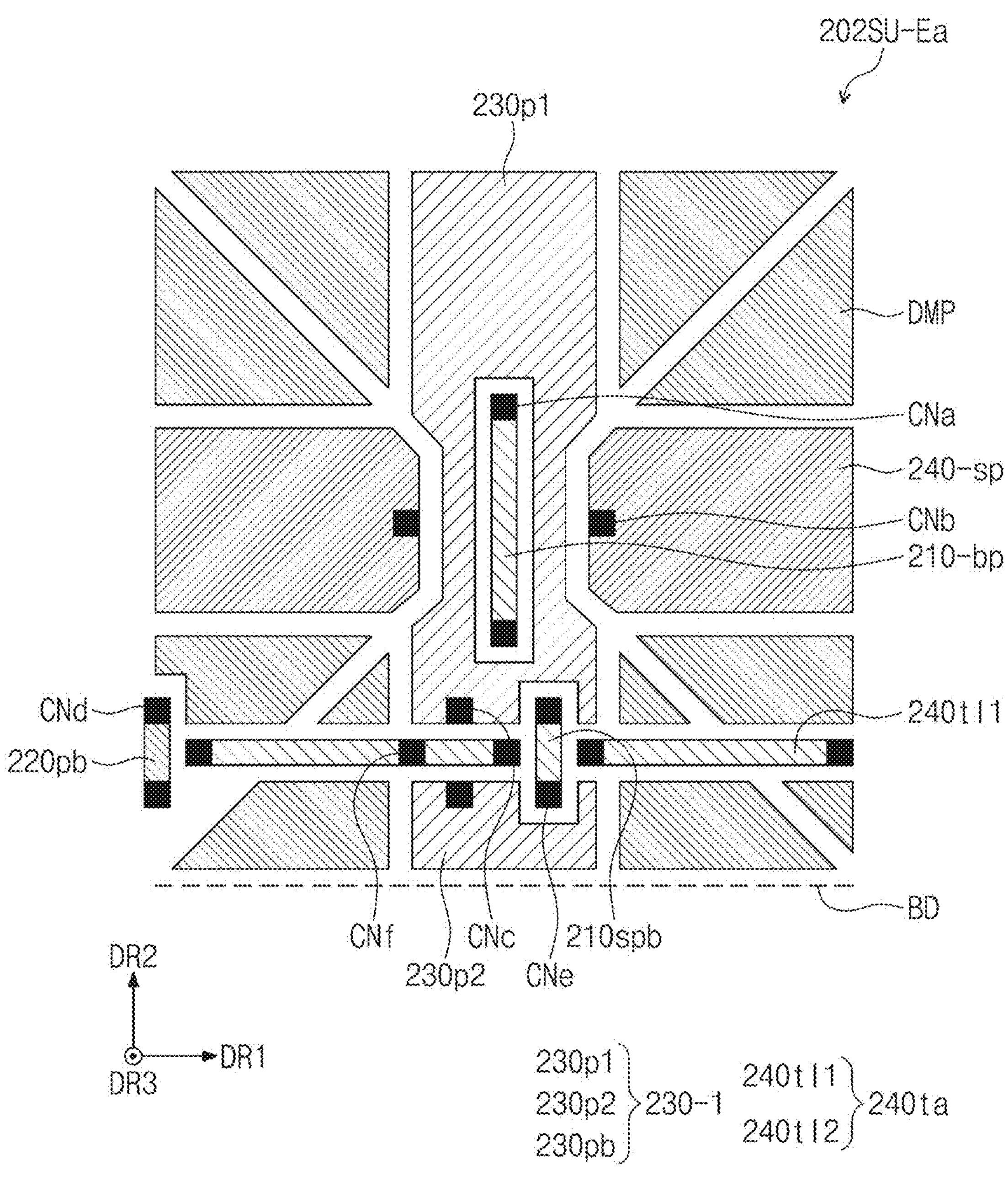
FIG. 13A is an enlarged plan view of a first conductive layer of a sensing unit according to some embodiments of the present disclosure.
Figure 13B:
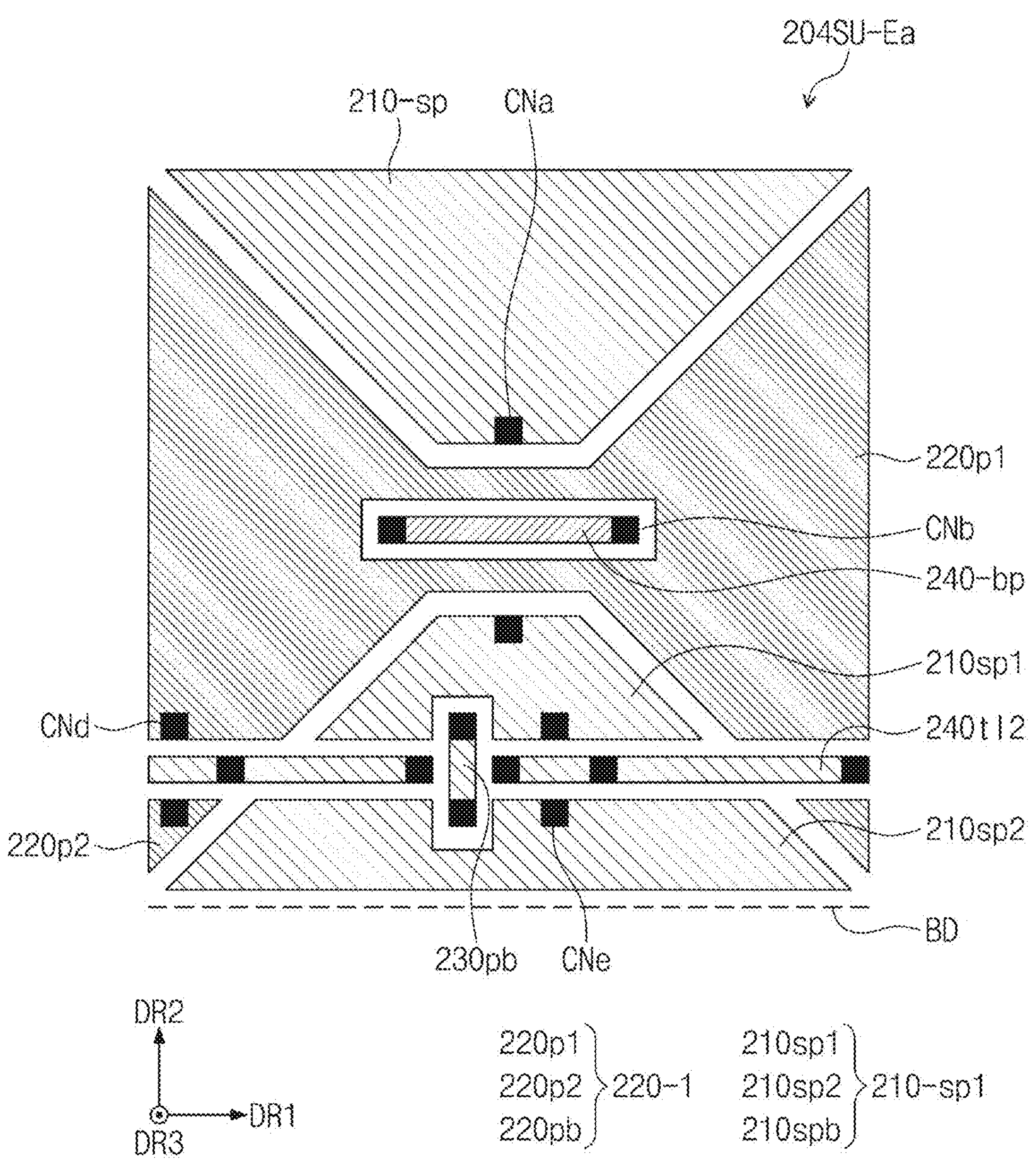
FIG. 13B is an enlarged plan view of a second conductive layer of a sensing unit according to some embodiments of the present disclosure.

FIG. 13A is an enlarged plan view of a first conductive layer 202SU-Ea of a sensing unit (refer to SU-E1 of FIG. 7A) according to some embodiments of the present disclosure. FIG. 13B is an enlarged plan view of a second conductive layer 204SU-Ea of a sensing unit (refer to SU-E1 of FIG. 7A) according to some embodiments of the present disclosure.

Referring to FIGS. 7A, 13A, and 13B, an auxiliary trace line 240*ta* may include a first layer line 240*tl*1 and a second layer line 240*tl*2 located on the first layer line 240*tl*1 and electrically connected to the first layer line 240*tl*1. The second layer line 240*tl*2 may be electrically connected to the first layer line 240*tl*1 through sixth contacts CNf.

Among third electrodes 230, at least one third electrode 230-1 may include a first electrode portion 230*p*1, a second electrode portion 230*p*2, and an auxiliary bridge 230*pb* electrically connected to the first electrode portion 230*p*1 and the second electrode portion 230*p*2. The auxiliary bridge 230*pb* may be electrically connected to the first electrode portion 230*p*1 and the second electrode portion 230*p*2 through third contacts CNc.

The first electrode portion 230*p*1 and the second electrode portion 230*p*2 may be spaced apart from each other with the first layer line 240*tl*1 interposed therebetween. The first layer line 240*tl*1 of the auxiliary trace line 240*t* and the auxiliary bridge 230*pb* may be insulated from each other while intersecting with each other.

A first sensing pattern 210-*sp*1 of at least one first electrode 210 among first electrodes 210 may include a first electrode pattern portion 210*sp*1, a second electrode pattern portion 210*sp*2, and a first auxiliary bridge pattern 210*spb*. The first auxiliary bridge pattern 210*spb* may be electrically connected to the first electrode pattern portion 210*sp*1 and the second electrode pattern portion 210*sp*2 through fifth contacts CNe. The first electrode pattern portion 210*sp*1 and the second electrode pattern portion 210*sp*2 may be spaced apart from each other with the second layer line 240*tl*2 interposed therebetween. The second layer line 240*tl*2 may be insulated from the first auxiliary bridge pattern 210*spb* while intersecting the first auxiliary bridge pattern 210*spb*.

At least one second electrode 220-1 among second electrodes 220 may include a third electrode pattern portion 220*p*1, a fourth electrode pattern portion 220*p*2, and a second auxiliary bridge pattern 220*pb*. The second auxiliary bridge pattern 220*pb* may be electrically connected to the third electrode pattern portion 220*p*1 and the fourth electrode pattern portion 220*p*2 through fourth contacts CNd. The third electrode pattern portion 220*p*1 and the fourth electrode pattern portion 220*p*2 may be spaced apart from each other with the second layer line 240*tl*2 interposed therebetween. The second layer line 240*tl*2 may be insulated from the second auxiliary bridge pattern 220*pb* while intersecting the second auxiliary bridge pattern 220*pb*.

Figure 14A:
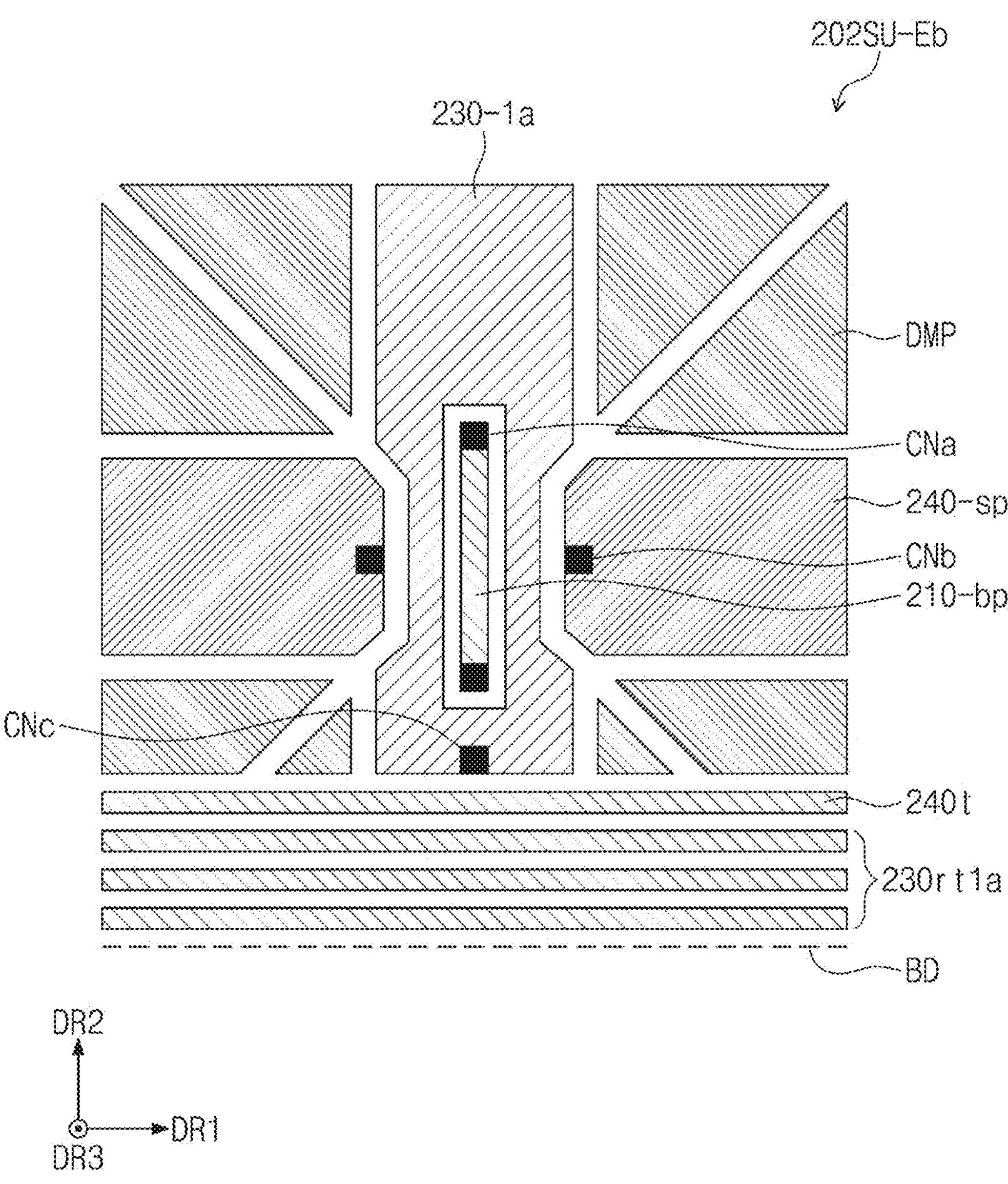
FIG. 14A is an enlarged plan view of a first conductive layer of a sensing unit according to some embodiments of the present disclosure.
Figure 14B:
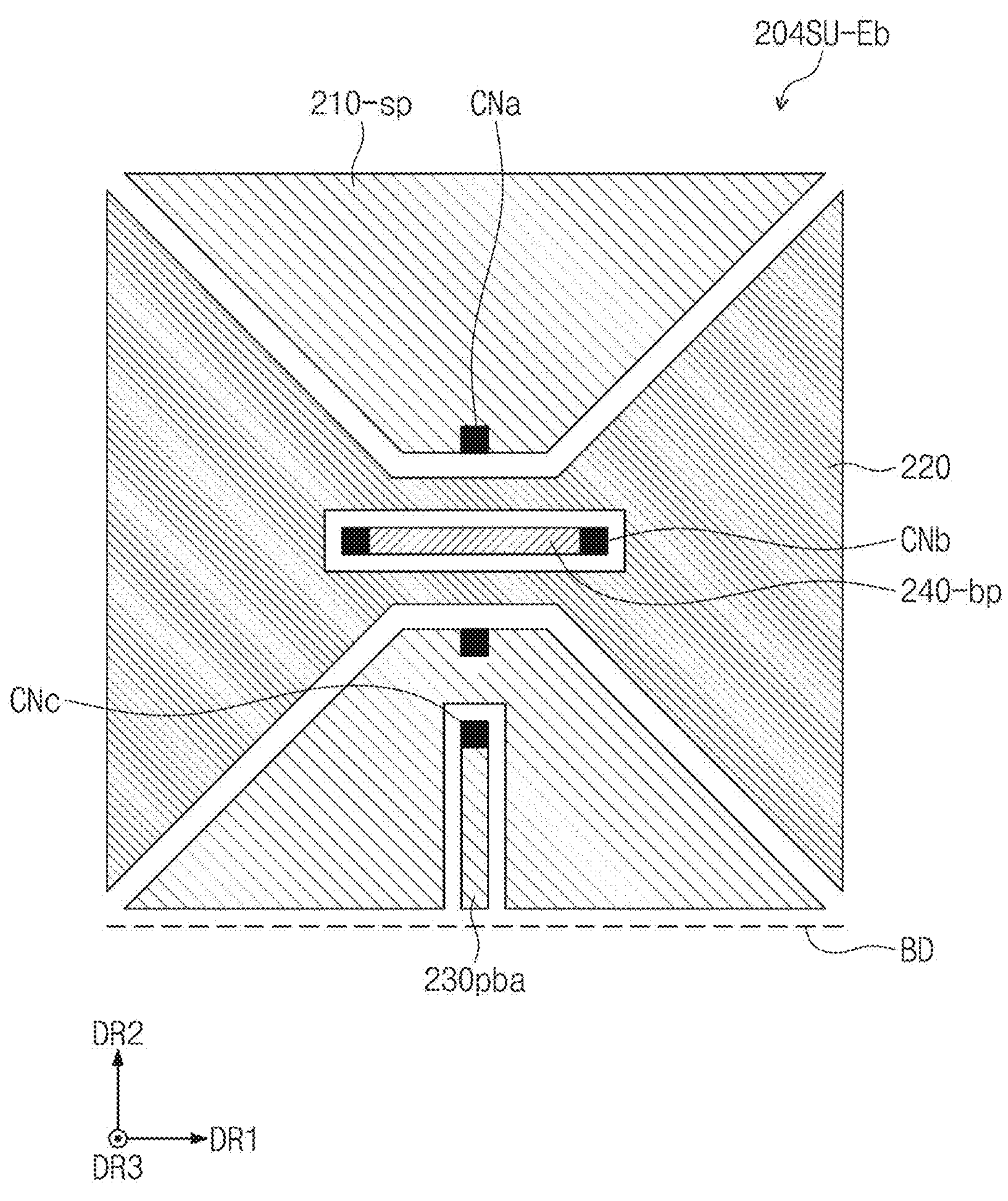
FIG. 14B is an enlarged plan view of a second conductive layer of a sensing unit according to some embodiments of the present disclosure.

FIG. 14A is an enlarged plan view of a first conductive layer 202SU-Eb of a sensing unit (refer to SU-E1 of FIG. 7A) according to some embodiments of the present disclosure. FIG. 14B is an enlarged plan view of a second conductive layer 204SU-Eb of a sensing unit (refer to SU-E1 of FIG. 7A) according to some embodiments of the present disclosure.

Referring to FIGS. 7A, 14A, and 14B, the first conductive layer 202SU-Eb may include first auxiliary trace lines 230*rt*1*a* and an auxiliary trace line 240*t*, which are adjacent to a boundary BD. The first auxiliary trace lines 230*rt*1*a* and the auxiliary trace line 240*t* may be arranged as close to the boundary BD as possible. That is, the first auxiliary trace lines 230*rt*1*a* and the auxiliary trace line 240*t* may be sequentially arranged from an edge of a sensing area 200A in the first conductive layer 202SU-Eb.

Among third electrodes 230, at least a third electrode 230-1*a* (hereinafter, referred to as a third electrode) may be spaced apart from a peripheral area 200NA with the first auxiliary trace lines 230*rt*1*a* and the auxiliary trace line 240*t* interposed therebetween. Accordingly, the second conductive layer 204SU-Eb may further include an auxiliary electrode bridge 230*pba* electrically connected to the third electrode 230-1*a* and insulated from the first auxiliary trace lines 230*rt*1*a* and the auxiliary trace line 240*t* while intersecting the first auxiliary trace lines 230*rt*1*a* and the auxiliary trace line 240*t*.

When compared to other third electrodes 230, which do not face the first auxiliary trace lines 230*rt*1*a* or the auxiliary trace line 240*t*, among the third electrodes 230, the third electrode 230-1*a* may have a shape of which a portion is removed. That is, a length in the second direction DR2 of the third electrode 230-1*a* may be shorter than a length in the second direction DR2 of other third electrodes 230. Because the portion of the third electrode 230-1*a*, which is closest to the boundary BD, is removed, degradation of the performance of a sensor layer 200 may be prevented or reduced.

Figure 15A:
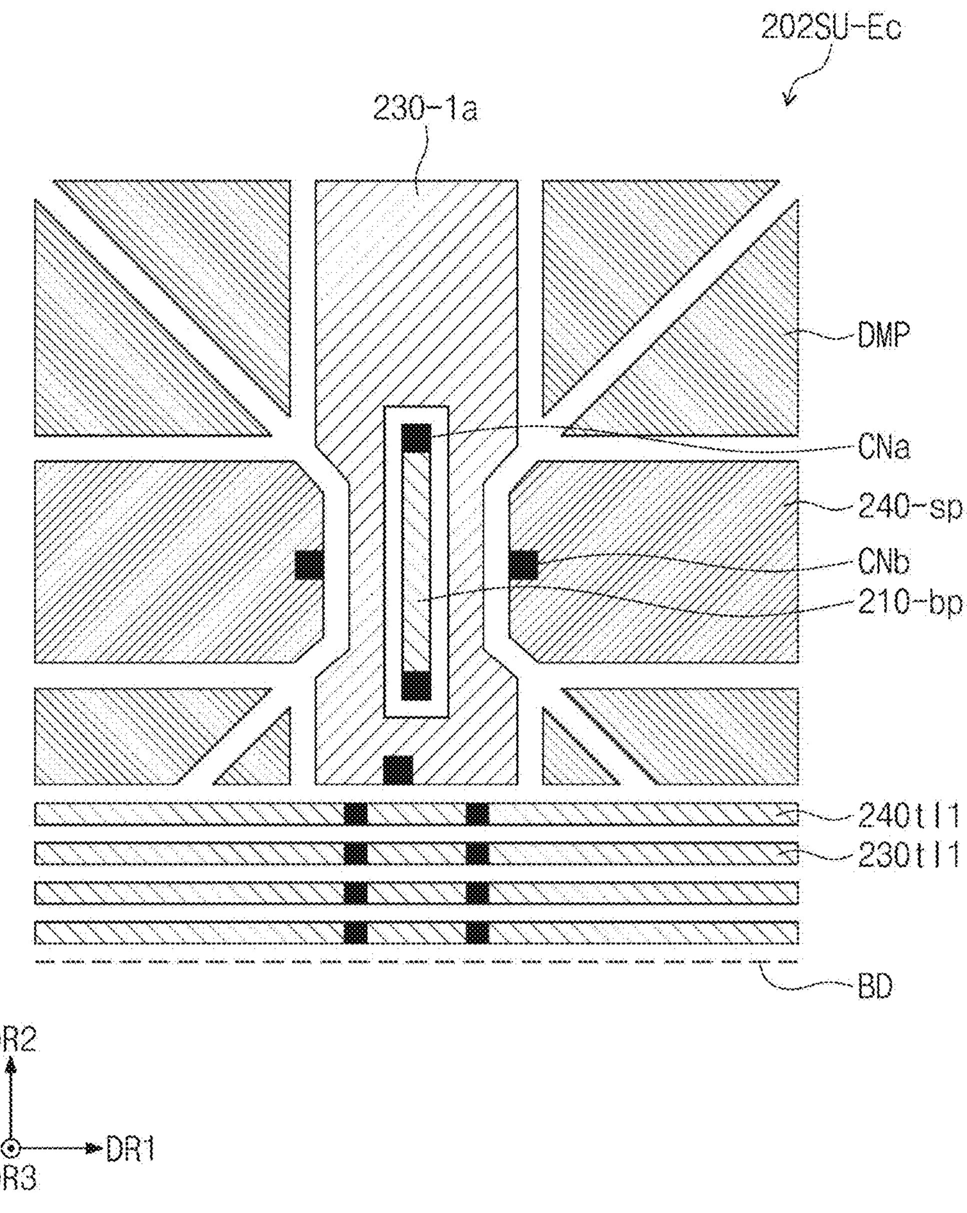
FIG. 15A is an enlarged plan view of a first conductive layer of a sensing unit according to some embodiments of the present disclosure.
Figure 15B:
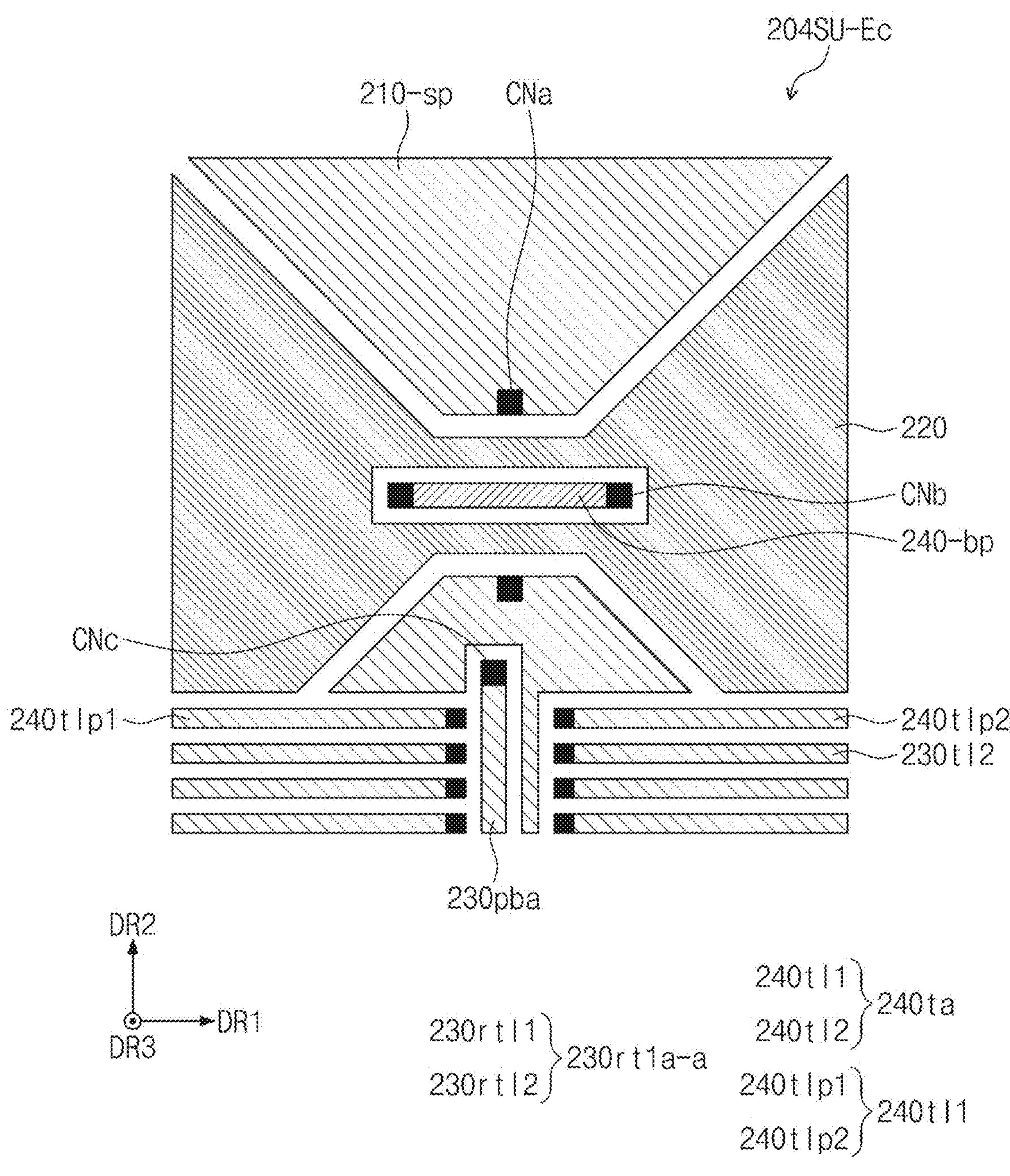
FIG. 15B is an enlarged plan view of a second conductive layer of a sensing unit according to some embodiments of the present disclosure.

FIG. 15A is an enlarged plan view of a first conductive layer 202SU-Ec of a sensing unit (refer to SU-E1 of FIG. 7A) according to some embodiments of the present disclosure. FIG. 15B is an enlarged plan view of a second conductive layer 204SU-Ec of a sensing unit (refer to SU-E1 of FIG. 7A) according to some embodiments of the present disclosure.

Referring to FIGS. 7A, 15A, and 15B, first auxiliary trace lines 230*rt*1*a-a* and an auxiliary trace line 240*ta* may be located in a sensing area 200A.

Each of the first auxiliary trace lines 230*rt*1*a-a* may include a first-first layer line 230*rtl*1 and a first-second layer line 230*rtl*2 located on the first-first layer line 230*rtl*1 and electrically connected to the first-first layer line 230*rtl*1. The auxiliary trace line 240*ta* may include a first layer line 240*tl*1 and a second layer line 240*tl*2 located on the first layer line 240*tl*1 and electrically connected to the first layer line 240*tl*1.

A third electrode 230-1*a* may be spaced apart from a peripheral area 200NA with the first auxiliary trace lines 230*rt*1*a-a* and the auxiliary trace line 240*ta* interposed therebetween. Accordingly, the second conductive layer 204SU-Ec may further include an auxiliary electrode bridge 230*pba* that is electrically connected to the third electrode 230-1*a* and insulated from the first-first layer line 230*rtl*1 and the first layer line 240*tl*1 while intersecting the first-first layer line 230*rtl*1 and the first layer line 240*tl*1.

The second layer line 240*tl*2 may include a first line portion 240*tlp*1 and a second line portion 240*tlp*2 spaced apart from the first line portion 240*tlp*1 with the auxiliary electrode bridge 230*pba* interposed therebetween. A first sensing pattern 210-*spa* adjacent to the second layer line 240*tl*2 may include a protrusion that extends from between the first line portion 240*tlp*1 and the second line portion 240*tlp*2 to a boundary BD.

Figure 16A:
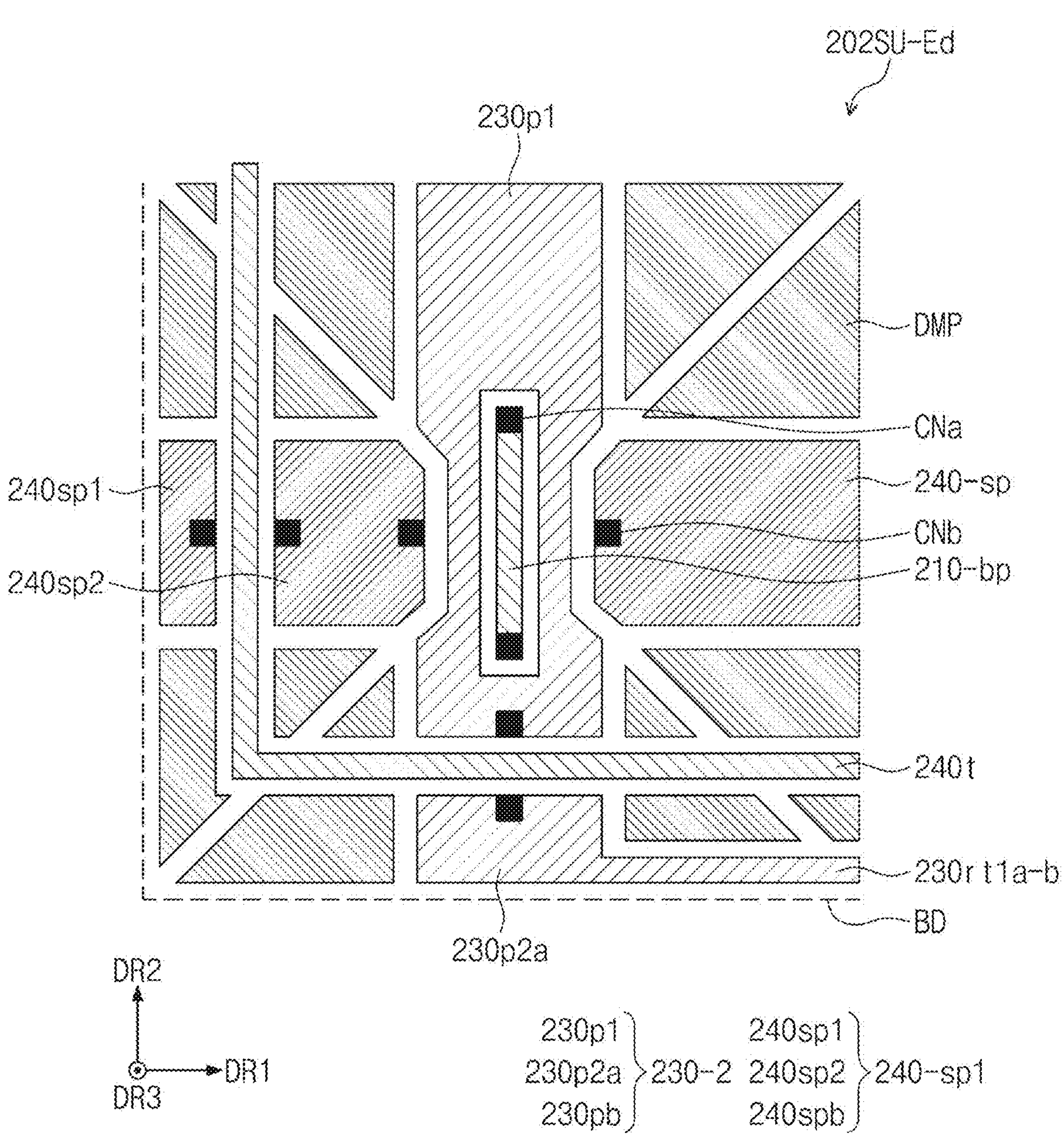
FIG. 16A is an enlarged plan view of a first conductive layer of a sensing unit according to some embodiments of the present disclosure.
Figure 16B:
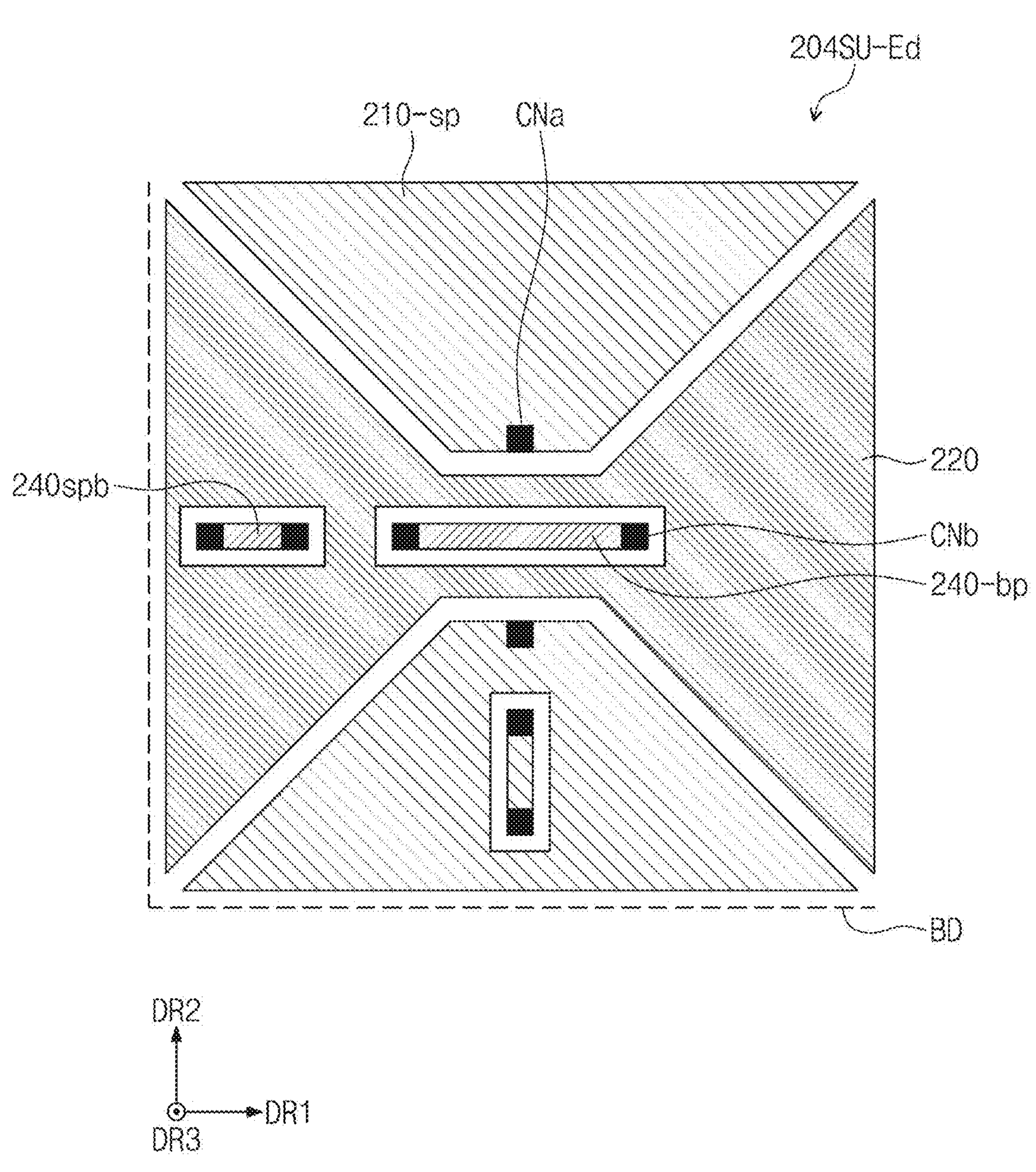
FIG. 16B is an enlarged plan view of a second conductive layer of a sensing unit according to some embodiments of the present disclosure.

FIG. 16A is an enlarged plan view of a first conductive layer 202SU-Ed of a sensing unit (refer to SU-E2 of FIG. 7A) according to some embodiments of the present disclosure. FIG. 16B is an enlarged plan view of a second conductive layer 204SU-Ed of a sensing unit (refer to SU-E2 of FIG. 7A) according to some embodiments of the present disclosure.

Referring to FIGS. 7A, 16A, and 16B, the sensing unit SU-E2 may be located adjacent to a corner of a sensing area 200A. As an example, the sensing unit SU-E2 may be located adjacent to portions of a boundary BD, which extend in different directions from each other. An auxiliary trace line 240*t* that overlaps the sensing area 200A may be spaced apart from the boundary BD by a distance (e.g., a set or predetermined distance).

One third electrode 230-2 located at an outermost position among third electrodes 230 is shown in FIGS. 16A and 16B. The third electrode 230-2 may include a first electrode portion 230*p*1, a second electrode portion 230*p*2*a*, and an auxiliary bridge 230*pb* electrically connected to the first electrode portion 230*p*1 and the second electrode portion 230*p*2*a*. The first electrode portion 230*p*1 and the second electrode portion 230*p*2*a* may be spaced apart from each other with the auxiliary trace line 240*t* interposed therebetween. The auxiliary trace line 240*t* may be insulated from the auxiliary bridge 230*pb* while intersecting the auxiliary bridge 230*pb*.

Among first auxiliary trace lines 230*rt*1, a portion of a first auxiliary trace line 230*rt*1*a-b* electrically connected to the third electrode 230-2 may be located in the sensing area 200A. In addition, a portion of the first auxiliary trace line 230*rt*1*a-b* may overlap a display area (refer to 100A of FIG. 4). The portion of the first auxiliary trace line 230*rt*1*a-b* may be located between the auxiliary trace line 240*t* and a peripheral area 200NA.

A second sensing pattern 240-*sp*1 of one fourth electrode 240 among fourth electrodes 240 may include a first electrode portion 240*sp*1, a second electrode portion 240*sp*2, and an auxiliary bridge 240*spb* electrically connected to the first electrode portion 240*sp*1 and the second electrode portion 240*sp*2. The first electrode portion 240*sp*1 and the second electrode portion 240*sp*2 may be spaced apart from each other in the first direction DR1 with the auxiliary trace line 240*t* interposed therebetween. The auxiliary bridge 240*spb* may be insulated from the auxiliary trace line 240*t* while intersecting the auxiliary trace line 240*t*.

Figure 17A:
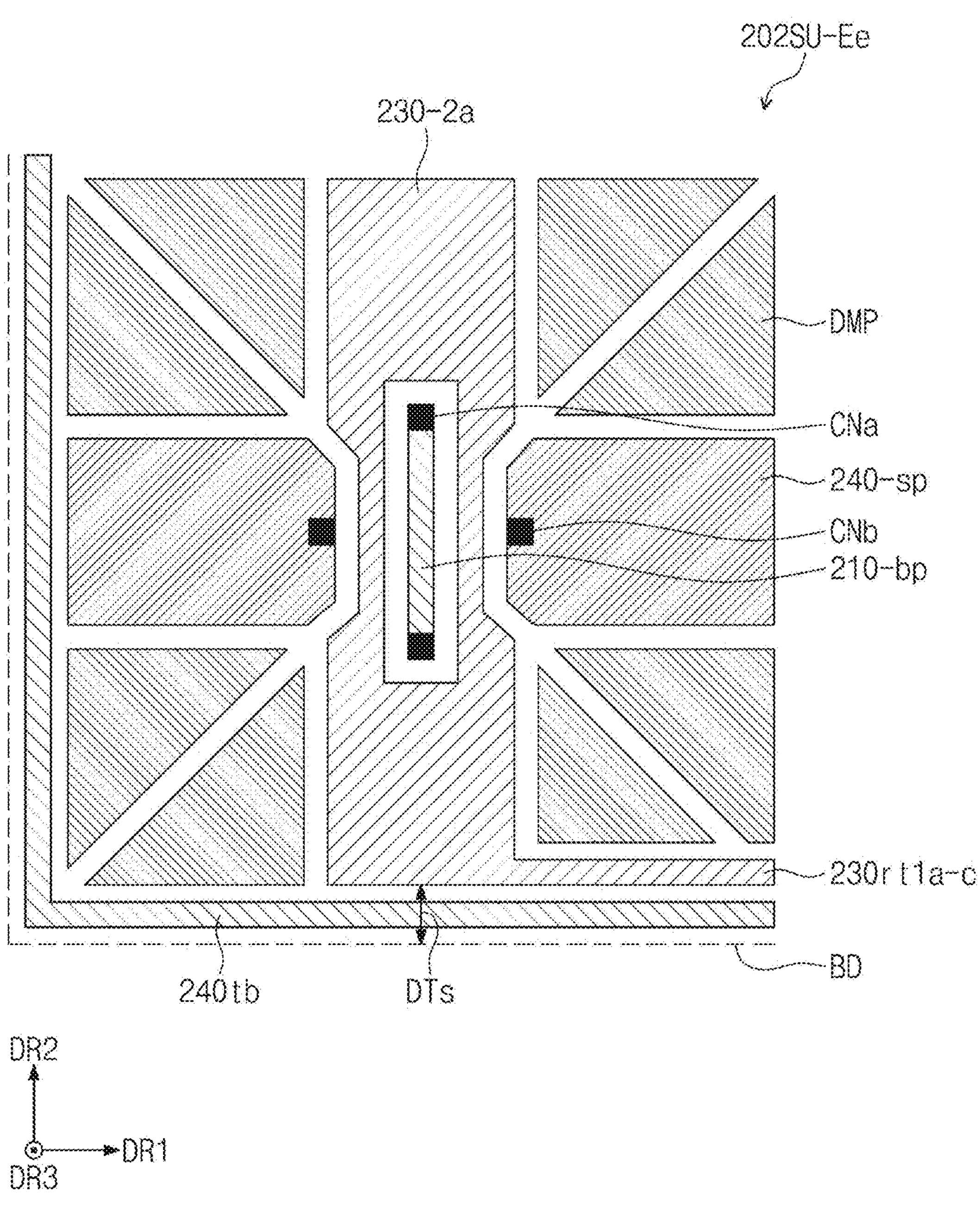
FIG. 17A is an enlarged plan view of a first conductive layer of a sensing unit according to some embodiments of the present disclosure.
Figure 17B:
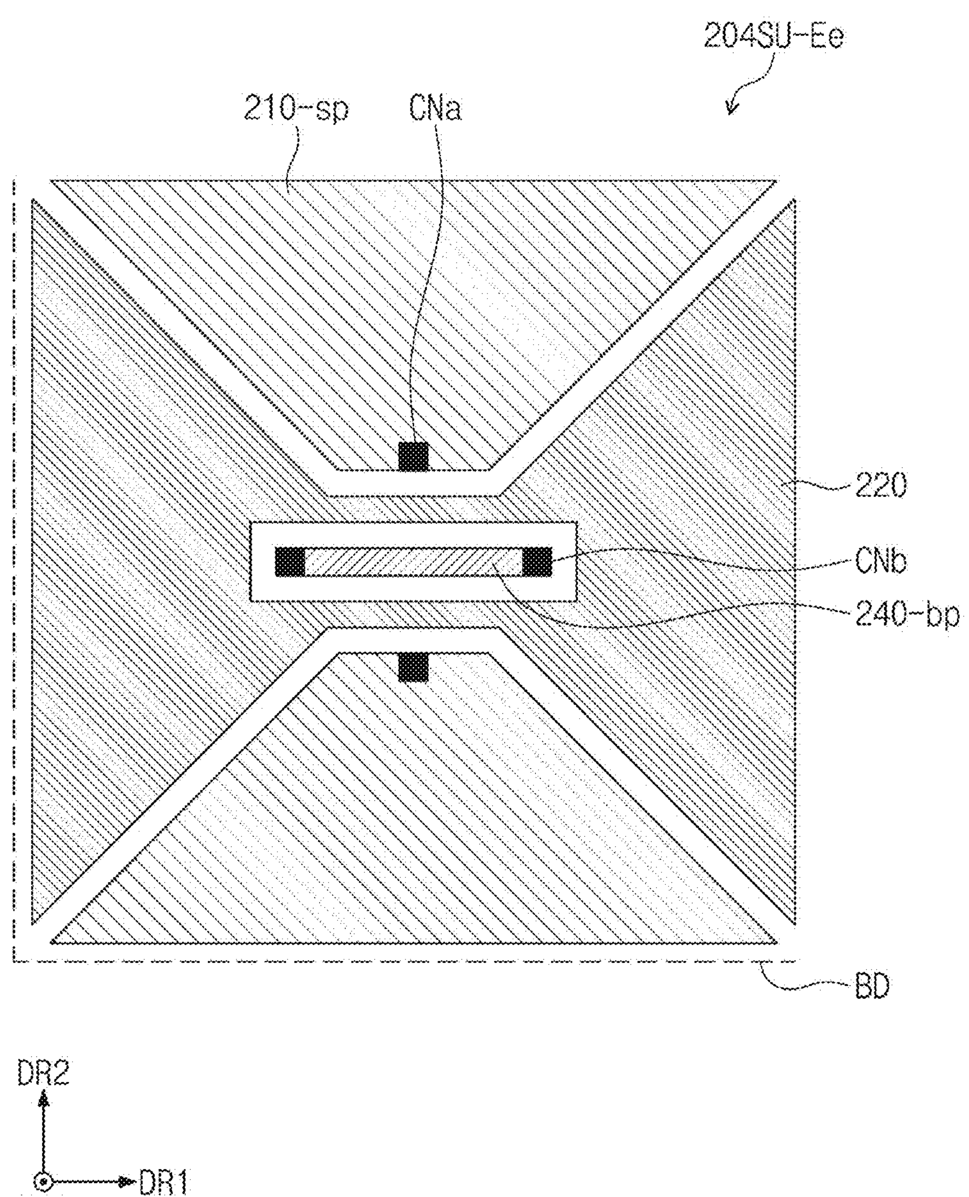
FIG. 17B is an enlarged plan view of a second conductive layer of a sensing unit according to some embodiments of the present disclosure.

FIG. 17A is an enlarged plan view of a first conductive layer 202SU-Ee of a sensing unit (refer to SU-E2 of FIG. 7A) according to some embodiments of the present disclosure. FIG. 17B is an enlarged plan view of a second conductive layer 204SU-Ee of a sensing unit (refer to SU-E2 of FIG. 7A) according to some embodiments of the present disclosure.

Referring to FIGS. 7A, 17A, and 17B, the sensing unit SU-E2 may be located adjacent to a corner of a sensing area 200A. As an example, the sensing unit SU-E2 may be located adjacent to portions of a boundary BD, which extend in different directions from each other. An auxiliary trace line 240*tb* that overlaps the sensing area 200A may be located adjacent to the boundary BD.

An end of one third electrode 230-2*a* located at an outermost position among third electrodes 230 may be spaced apart from the boundary BD by a distance (e.g., a set or predetermined distance) DTs. Therefore, a length in the second direction DR2 of the third electrode 230-2*a* may be equal to or smaller than a length in the second direction DR2 of another third electrode that does not face the auxiliary trace line 240*tb*.

A portion of a first auxiliary trace line 230*rt*1*a-c*, which is electrically connected to the third electrode 230-2*a*, among first auxiliary trace lines 230*rt*1 may be located in the sensing area 200A. In addition, the portion of the first auxiliary trace line 230*rt*1*a-c* may overlap a display area 100A (refer to FIG. 4). The portion of the first auxiliary trace line 230_rt_1_a-c_ may be spaced apart from a peripheral area 200NA with the auxiliary trace line 240_tb_ interposed therebetween. That is, the auxiliary trace line 240_tb_ may be located between the first auxiliary trace line 230_rt_1_a-c_ and the peripheral area 200NA.

Figure 18:
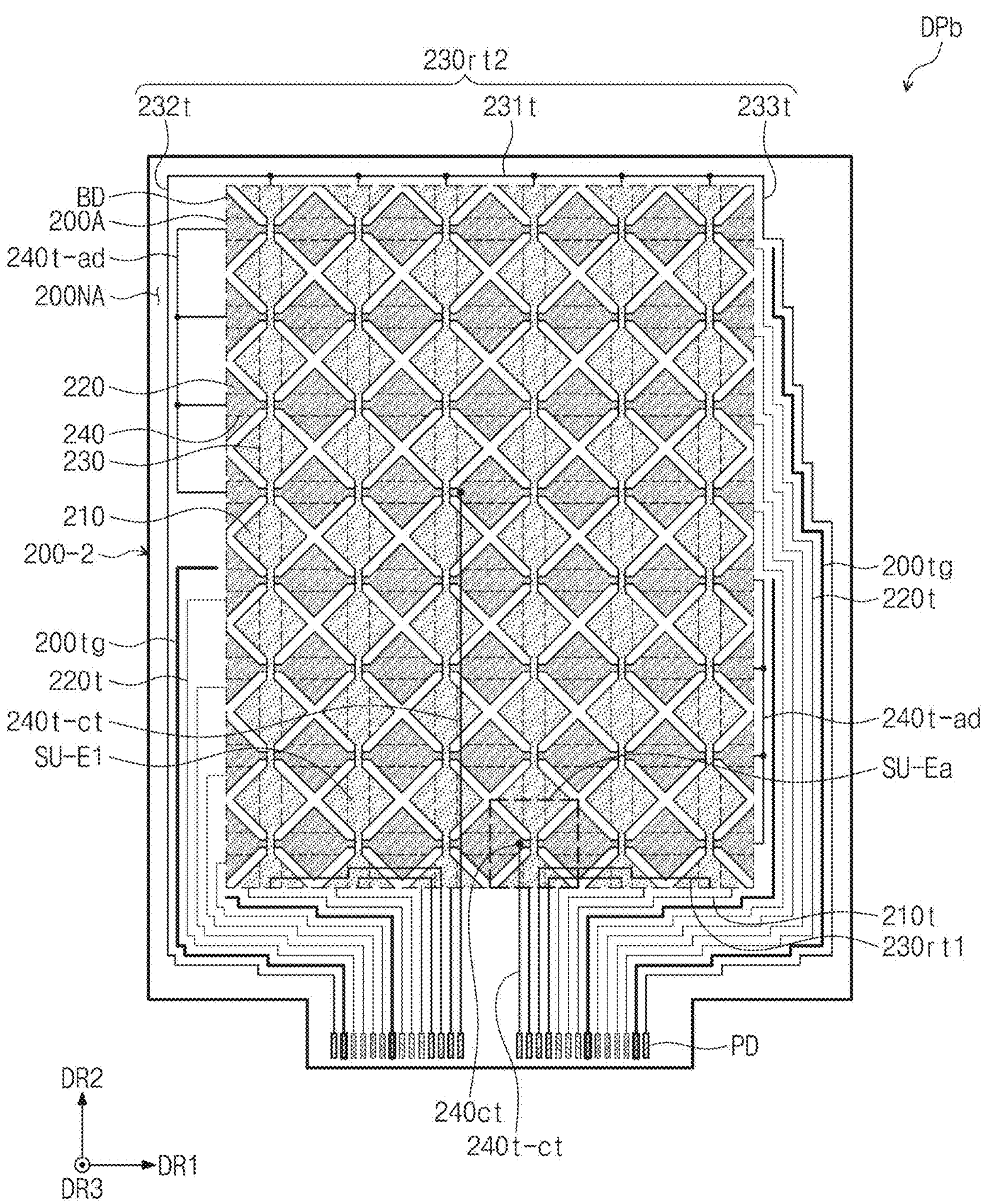
FIG. 18 is a plan view of a display panel according to some embodiments of the present disclosure.
Figure 19A:
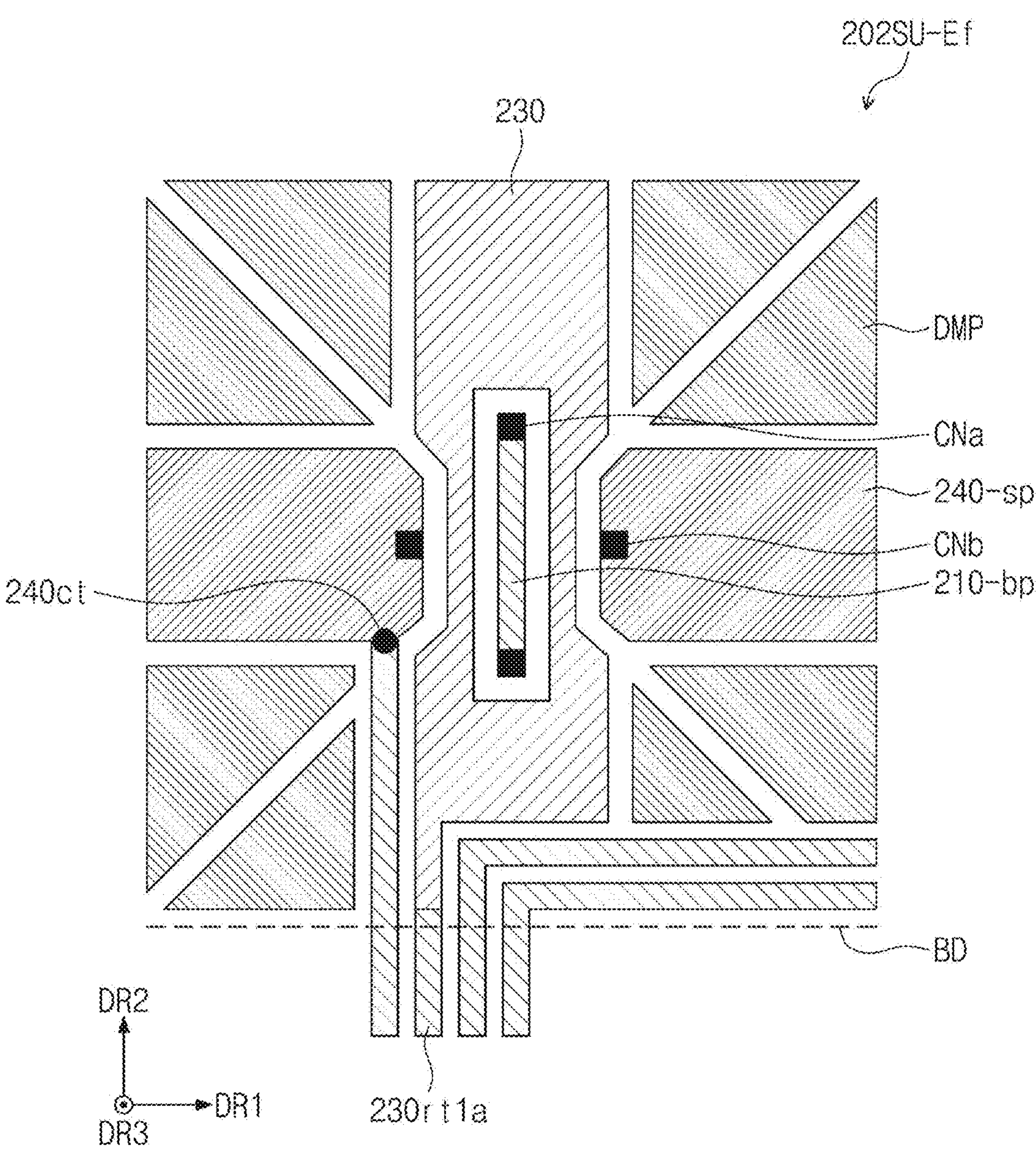
FIG. 19A is an enlarged plan view of a first conductive layer of a sensing unit according to some embodiments of the present disclosure.
Figure 19B:
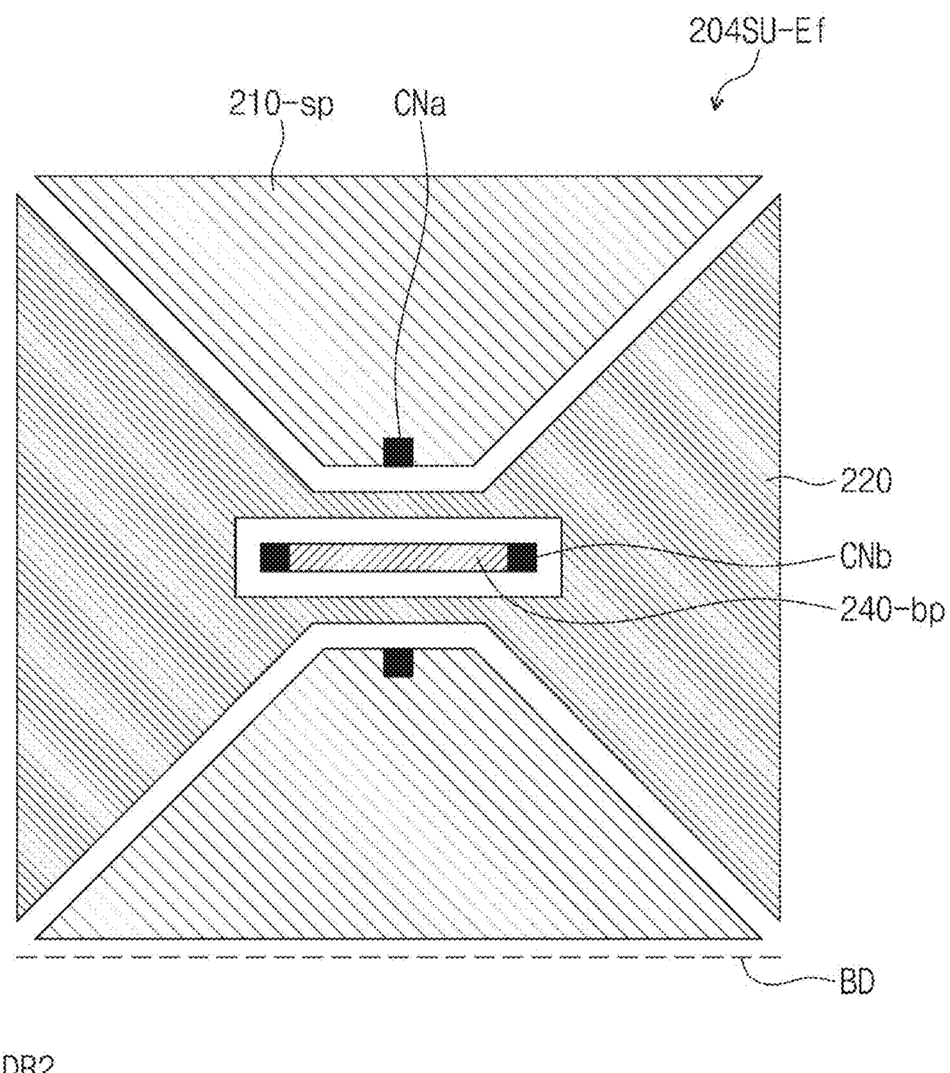
FIG. 19B is an enlarged plan view of a second conductive layer of a sensing unit according to some embodiments of the present disclosure.
Figure 19B:
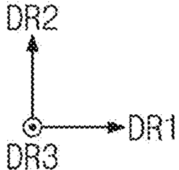

FIG. 18 is a plan view of a display panel DPb according to some embodiments of the present disclosure. FIG. 19A is an enlarged plan view of a first conductive layer 202SU-Ef of a sensing unit (refer to SU-Ea of FIG. 18) according to some embodiments of the present disclosure. FIG. 19B is an enlarged plan view of a second conductive layer 204SU-Ef of a sensing unit (refer to SU-Ea of FIG. 18) according to some embodiments of the present disclosure.

Referring to FIGS. 18, 19A, and 19B, the display panel DPb may include a sensor layer 200-2. The sensor layer 200-2 may include first, second, third, and fourth electrodes 210, 220, 230, and 240 arranged in a sensing area 200A.

The sensor layer 200-2 may further include first trace lines 210_t_ electrically connected to the first electrodes 210 in a one-to-one correspondence and arranged in a peripheral area 200NA and second trace lines 220_t_ electrically connected to the second electrodes 220 in a one-to-one correspondence and arranged in the peripheral area 200NA.

The sensor layer 200-2 may further include first auxiliary trace lines 230_rt_1 electrically connected to the third electrodes 230 in a one-to-one correspondence, a second auxiliary trace line 230_rt_2 electrically connected to the third electrodes 230, and auxiliary trace lines 240_t-ct_ electrically connected to the fourth electrodes 240.

One auxiliary trace line 240_t-ct_ may be electrically connected to four fourth electrodes 240. As an example, the auxiliary trace line 240_t-ct_ may be connected to a portion 240_ct_ of one fourth electrode 240 in an area overlapping a display area (refer to 100A of FIG. 4). The auxiliary trace line 240_t-ct_ may be connected to the one fourth electrode 240 in the sensing area 200A, and a portion of the auxiliary trace line 240_t-ct_ may be arranged in the sensing area 200A.

The sensor layer 200-2 may further include an additional auxiliary trace line 240_t-ad_. The additional auxiliary trace line 240_t-ad_ may be provided to electrically connect four fourth electrodes 240 to each other. The additional auxiliary trace line 240_t-ad_ may be located in the peripheral area 200NA.

According to some embodiments, a portion of at least one first auxiliary trace line 230_rt_1_a_ (hereinafter, referred to as a first-first auxiliary trace line) of the first auxiliary trace lines 230_rt_1 may be located in the sensing area 200A. That is, the portion of the first-first auxiliary trace line 230_rt_1_a_ may overlap the display area 100A.

Figure 20:
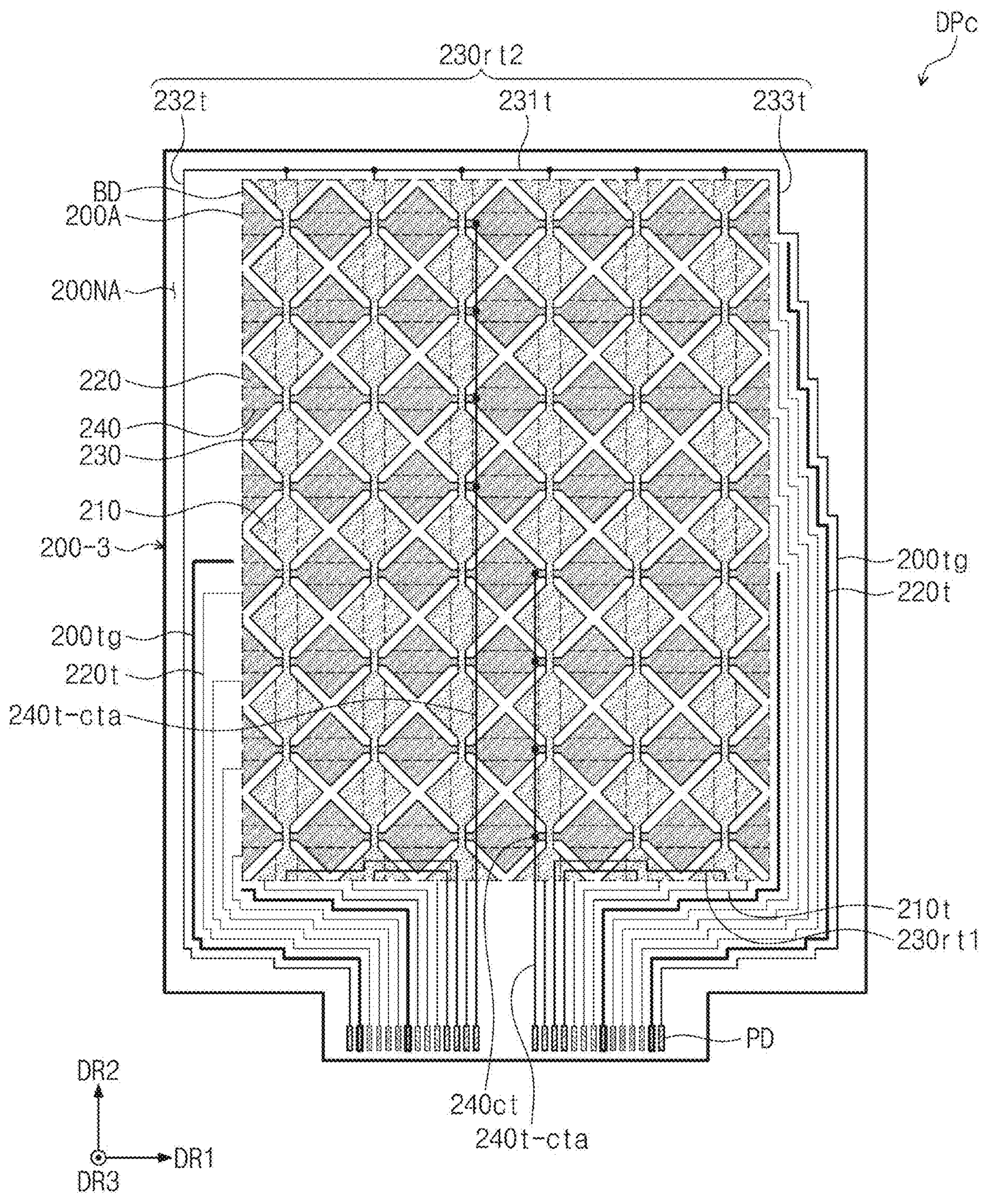
FIG. 20 is a plan view of a display panel according to some embodiments of the present disclosure.

FIG. 20 is a plan view of a display panel DPc according to some embodiments of the present disclosure.

Referring to FIG. 20, the display panel DPc may include a sensor layer 200-3. The sensor layer 200-3 may include first, second, third, and fourth electrodes 210, 220, 230, and 240 arranged in a sensing area 200A.

The sensor layer 200-3 may further include first trace lines 210_t_ electrically connected to the first electrodes 210 in a one-to-one correspondence and arranged in a peripheral area 200NA and second trace lines 220_t_ electrically connected to the second electrodes 220 in a one-to-one correspondence and arranged in the peripheral area 200NA.

The sensor layer 200-3 may include first auxiliary trace lines 230_rt_1 electrically connected to the third electrodes 230 in a one-to-one correspondence, a second auxiliary trace line 230_rt_2 electrically connected to the third electrodes 230, and auxiliary trace lines 240_t-cta_ electrically connected to the fourth electrodes 240.

According to some embodiments, one auxiliary trace line 240_t-cta_ may be electrically connected to four fourth electrodes 240. As an example, the auxiliary trace line 240_t-ct_ may be connected to portions 240_ct_ of the four fourth electrodes 240 in an area overlapping a display area (refer to 100A of FIG. 4).

Referring to FIGS. 18 and 20, the third electrodes 230 and the fourth electrodes 240 may be floated when a pen PN (refer to FIG. 5) is sensed. Accordingly, even though the portion of the first-first auxiliary trace line 230_rt_1_a_ connected to the third electrodes 230 and the fourth electrodes 240 and the portion of each of the auxiliary trace lines 240_t-ct_ or 240_t-cta_ are arranged in the sensing area 200A, changes in shape, resistance, or routing location of the first-first auxiliary trace line 230_rt_1_a_ and the auxiliary trace lines 240_t-ct_ or 240_t-cta_ may have little to no effect on the sensing operation for the pen.

Among the trace lines located in an area, e.g., an area adjacent to pads PD, where the trace lines are intensively arranged in the peripheral area 200NA, at least a portion of some trace lines may be located in the sensing area 200A. Therefore, a size of the area where the trace lines are arranged in the peripheral area 200NA may be reduced, and a size of an area where the trace lines are not arranged (hereinafter referred to as an unused area) in the peripheral area 200NA may increase.

According to some embodiments, the area occupied by the peripheral area 200NA in a total area of the display panel DPb or DPc may be reduced by removing (for example, by cutting) the unused area, and thus, a narrow bezel may be implemented. According to some embodiments, a line width may be adjusted to relatively improve the resistance of each of the first trace lines 210_t_ or the second trace lines 220_t_ by utilizing the unused area. In this case, the sensing sensitivity of the sensor layer 200-2 or 200-3 may be relatively improved.

Figure 21:
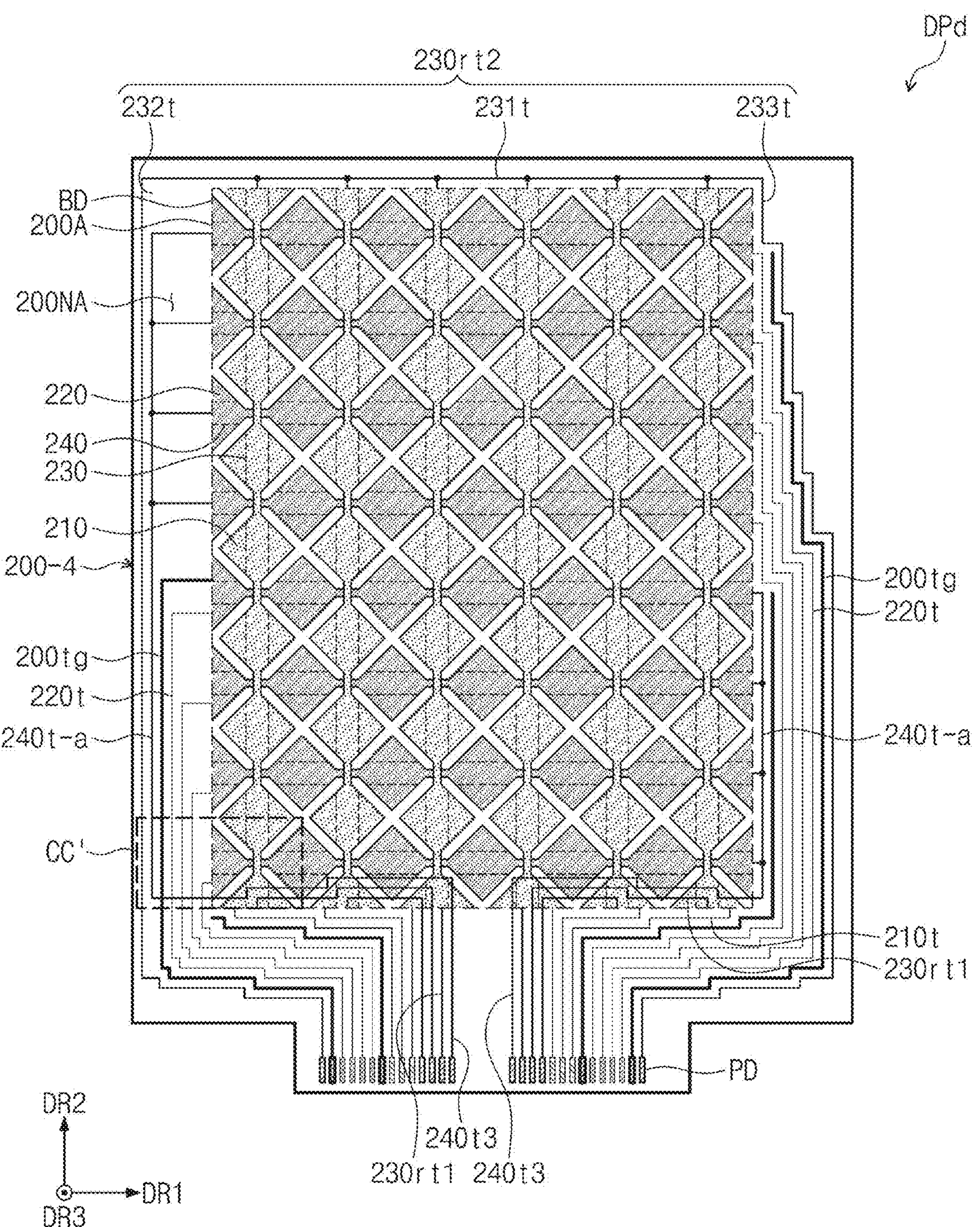
FIG. 21 is a plan view of a display panel according to some embodiments of the present disclosure.
Figure 22A:
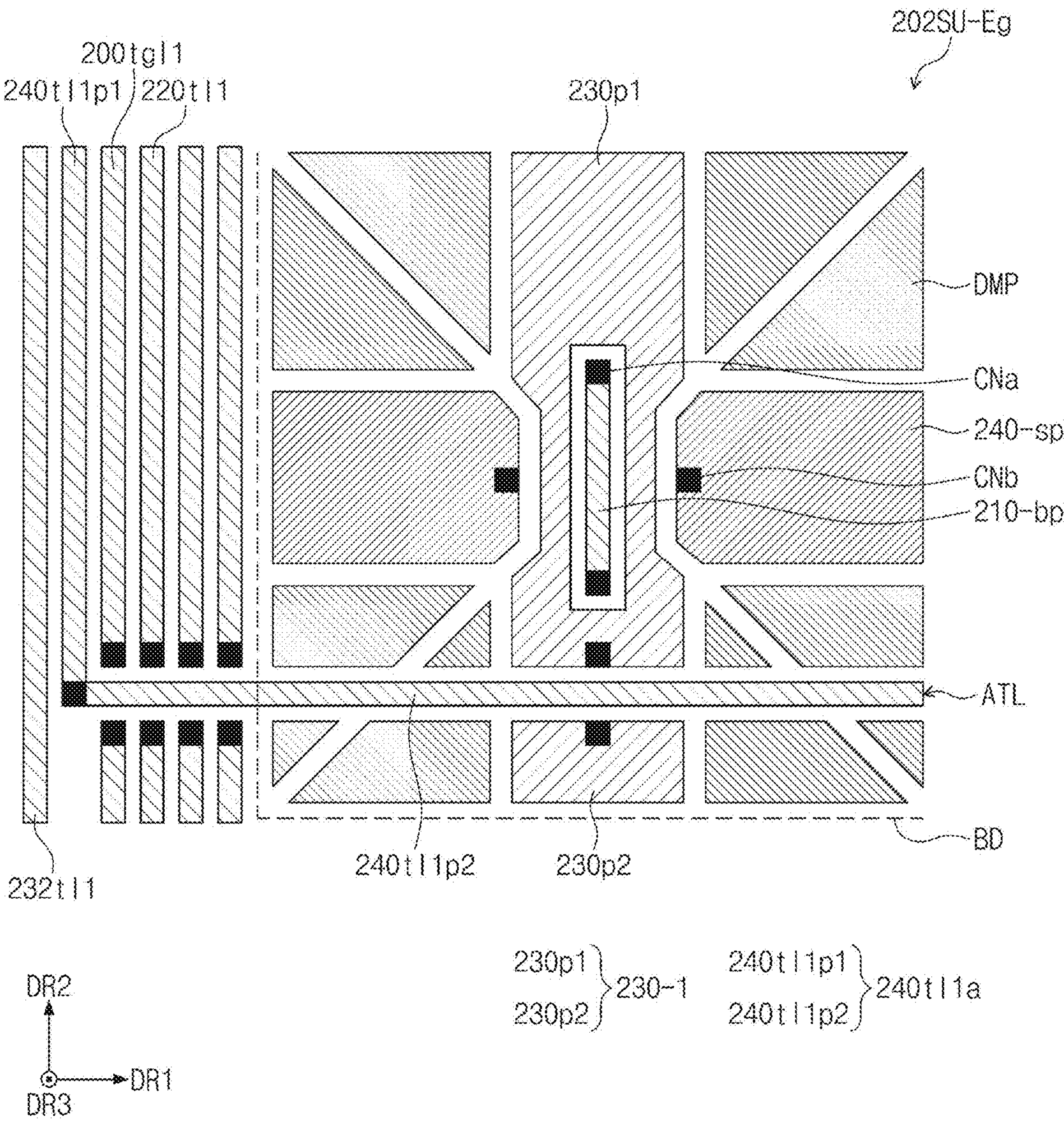
FIG. 22A is an enlarged plan view of a first conductive layer of a sensing unit according to some embodiments of the present disclosure.
Figure 22B:
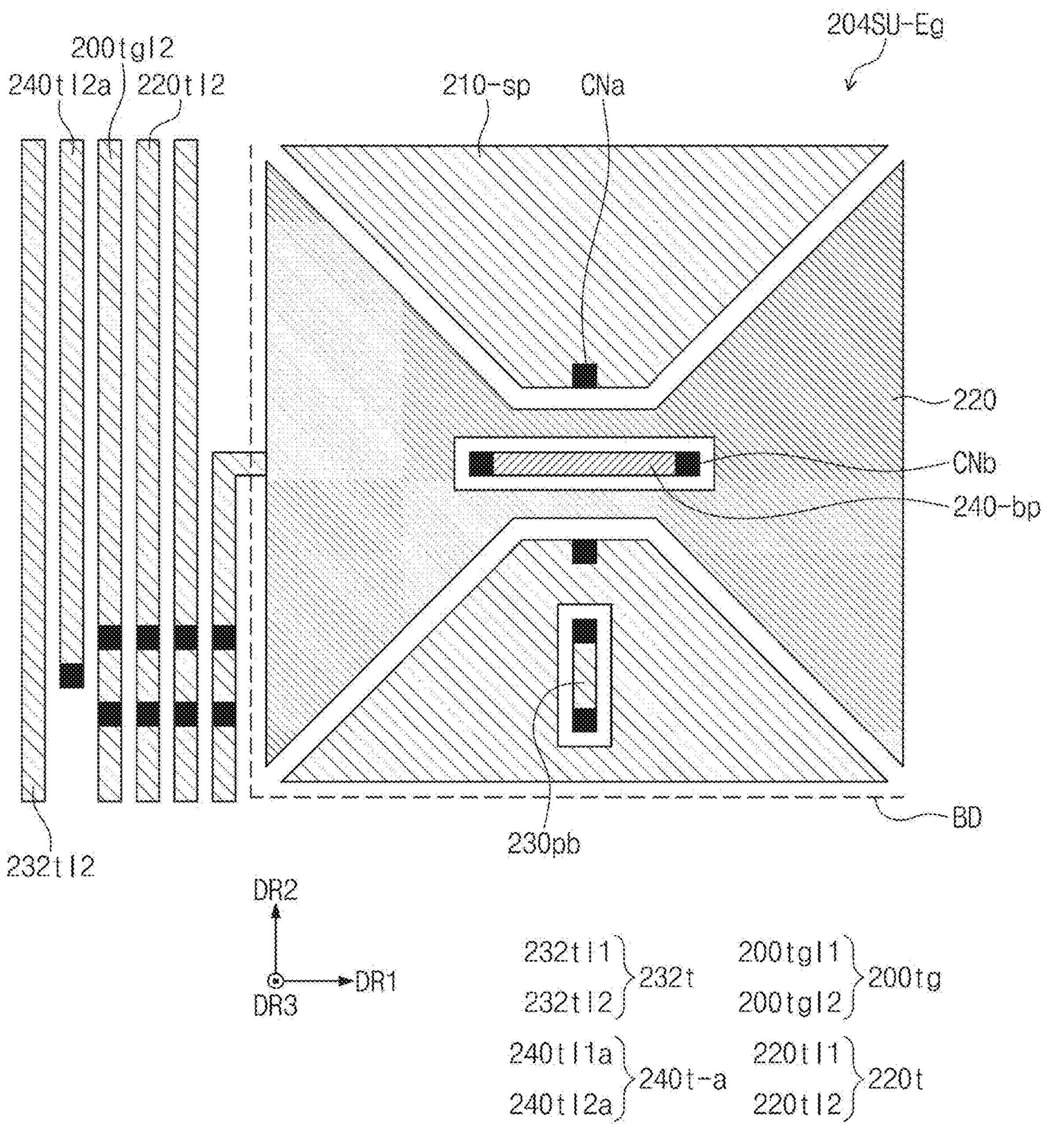
FIG. 22B is an enlarged plan view of a second conductive layer of a sensing unit according to some embodiments of the present disclosure.

FIG. 21 is a plan view of a display panel DPd according to some embodiments of the present disclosure. FIG. 22A is an enlarged plan view of a portion of a first conductive layer 202SU-Eg of a sensor layer according to some embodiments of the present disclosure. FIG. 22B is an enlarged plan view of a portion of a second conductive layer 204SU-Eg of a sensor layer according to some embodiments of the present disclosure. FIGS. 22A and 22B correspond to an area CC' of FIG. 21.

Referring to FIGS. 21, 22A, and 22B, the display panel DPd may include a sensor layer 200-4. The sensor layer 200-4 may include first, second, third, and fourth electrodes 210, 220, 230, and 240 arranged in a sensing area 200A.

The sensor layer 200-4 may include first trace lines 210_t_ electrically connected to the first electrodes 210 in a one-to-one correspondence and arranged in a peripheral area 200NA and second trace lines 220_t_ electrically connected to the second electrodes 220 in a one-to-one correspondence and arranged in the peripheral area 200NA.

The sensor layer 200-4 may further include first auxiliary trace lines 230_rt_1 electrically connected to the third electrodes 230 in a one-to-one correspondence, a second auxiliary trace line 230_rt_2 electrically connected to the third electrodes 230, and auxiliary trace lines 240_t-a_ electrically connected to the fourth electrodes 240.

One auxiliary trace line 240_t-a_ of the auxiliary trace lines 240_t-a_ may be insulated from at least some second trace lines 220_t_ among the second trace lines 220_t_ while intersecting the at least some second trace lines 220_t_. As an example, one auxiliary trace line 240_t-a_ electrically connected to the fourth electrodes 240 included in the electrode group arranged at the top among the two electrode groups may be insulated from some second trace lines 220*t* routed in the same direction as the one auxiliary trace line 240*t-a* while intersecting the some second trace lines 220*t*.

Referring to FIGS. 22A and 22B, one auxiliary trace line 240*t-a* may include a first layer line 240*tl*1*a* and a second layer line 240*tl*2*a* located on and electrically connected to the first layer line 240*tl*1*a*. The first layer line 240*tl*1*a* may include a first portion 240*tl*1*p*1 extending from at least one of the fourth electrodes 240 and overlapping the peripheral area 200NA and a second portion 240*tl*1*p*2 extending from the first portion 240*tl*1*p*1 to the sensing area 200A. The second trace lines 220*t* may be insulated from the second portion 240*tl*1*p*2 while intersecting the second portion 240*tl*1*p*2.

According to some embodiments, the trace lines may have a multi-layer structure. As an example, each of the second trace lines 220*t* may include a first layer trace line 220*tl*1 and a second layer trace line 220*tl*2 located on and electrically connected to the first layer trace line 220*t*1. A second line portion 232*t* may include a first layer portion 232*tl*1 and a second layer portion 232*tl*2 located on and electrically connected to the first layer portion 232*tl*1. A guard line 200*tg* may include a first layer guard line 200*tgl*1 and a second layer guard line 200*tgl*2 located on and electrically connected to the first layer guard line 200*tgl*1.

Figure 23:
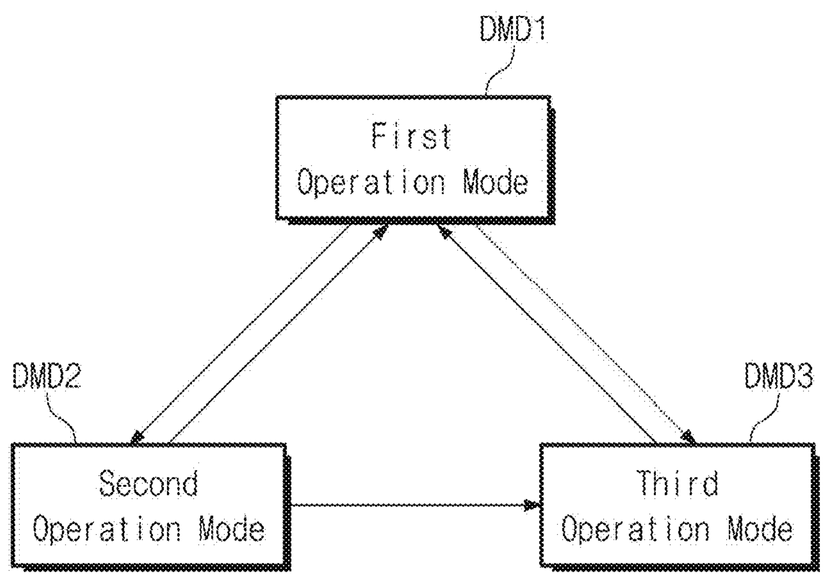
FIG. 23 is a view illustrating an operation of a sensor driver according to some embodiments of the present disclosure.

FIG. 23 is a view illustrating an operation of the sensor driver 2000 according to some embodiments of the present disclosure.

Referring to FIGS. 5 and 23, the sensor driver 2000 may be selectively driven in one of a first operation mode DMD1, a second operation mode DMD2, and a third operation mode DMD3.

The first operation mode DMD1 may be referred to as a touch and pen standby mode, the second operation mode DMD2 may be referred to as a touch activation and pen standby mode, and the third operation mode DMD3 may be referred to as a pen activation mode. The first operation mode DMD1 may refer to a mode of waiting for the first input 2000 and the second input 3000. The second operation mode DMD2 may refer to a mode of sensing the first input 2000 and waiting for the second input 3000. The third operation mode DMD3 may refer to a mode of sensing the second input 3000.

According to some embodiments, the sensor driver 2000 may be driven first in the first operation mode DMD1. When the first input 2000 is sensed in the first operation mode DMD1, the operation mode of the sensor driver 2000 may be switched (or changed) to the second operation mode DMD2. When the second input 3000 is sensed in the first operation mode DMD1, the operation mode of the sensor driver 2000 may be switched (or changed) to the third operation mode DMD3.

When the second input 3000 is sensed in the second operation mode DMD2, the operation mode of the sensor driver 2000 may be switched (or changed) to the third operation mode DMD3. When the first input 2000 is released (or not detected) in the second operation mode DMD2, the operation mode of the sensor driver 2000 may be switched to the first operation mode DMD1. When the second input 3000 is released (or not detected) in the third operation mode DMD3, the operation mode of the sensor driver 2000 may be switched to the first operation mode DMD1.

Figure 24:
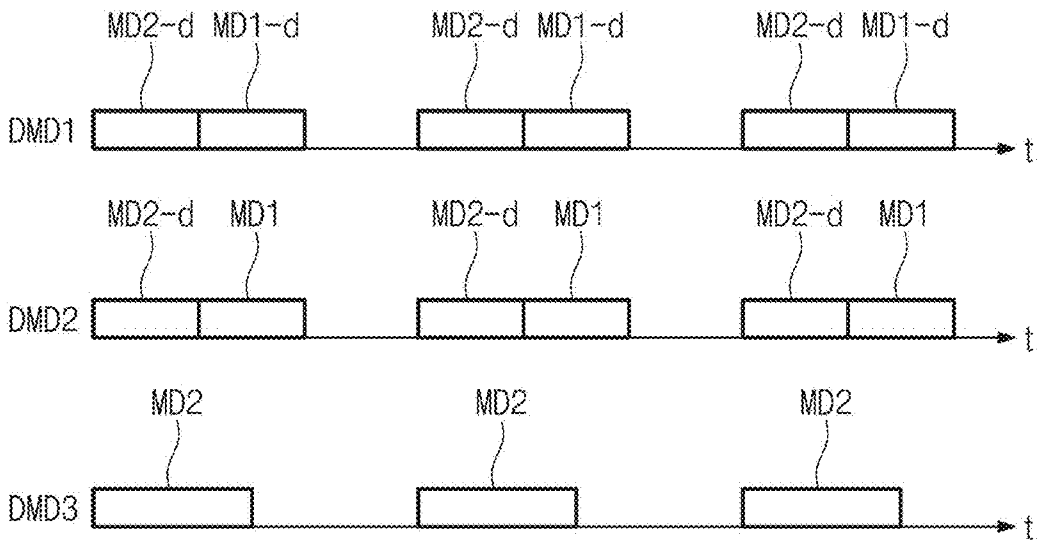
FIG. 24 is a view illustrating an operation of a sensor driver according to some embodiments of the present disclosure.

FIG. 24 is a view illustrating an operation of the sensor driver according to some embodiments of the present disclosure.

Referring to FIGS. 5, 23, and 24, operations in the first, second, and third operation modes DMD1, DMD2, and DMD3 are shown in time (t) order.

In the first operation mode DMD1, the sensor driver 2000 may be repeatedly driven in a second mode MD2-*d* and a first mode MD1-*d*. During the second mode MD2-*d*, the sensor layer 200 may be scan-driven to detect the second input 3000. During the first mode MD1-*d*, the sensor layer 200 may be scan-driven to detect the first input 2000. FIG. 24 shows an operation that the sensor driver 2000 is continuously driven in the first mode MD1-*d* after the second mode MD2-*d* as a representative example, however, the order of the operation of the sensor driver 2000 should not be limited thereto or thereby.

In the second operation mode DMD2, the sensor driver 2000 may be repeatedly driven in the second mode MD2-*d* and a first mode MD1. During the second mode MD2-*d*, the sensor layer 200 may be scan-driven to detect the second input 3000. During the first mode MD1, the sensor layer 200 may be scan-driven to detect coordinates of the first input 2000.

In the third operation mode DMD3, the sensor driver 2000 may be driven in a second mode MD2. During the second mode MD2, the sensor layer 200 may be scan-driven to detect coordinates of the second input 3000. In the third operation mode DMD3, the sensor driver 2000 may not be driven in the first mode MD1-*d* or MD1 before the second input 3000 is released (or not detected).

Figure 25:
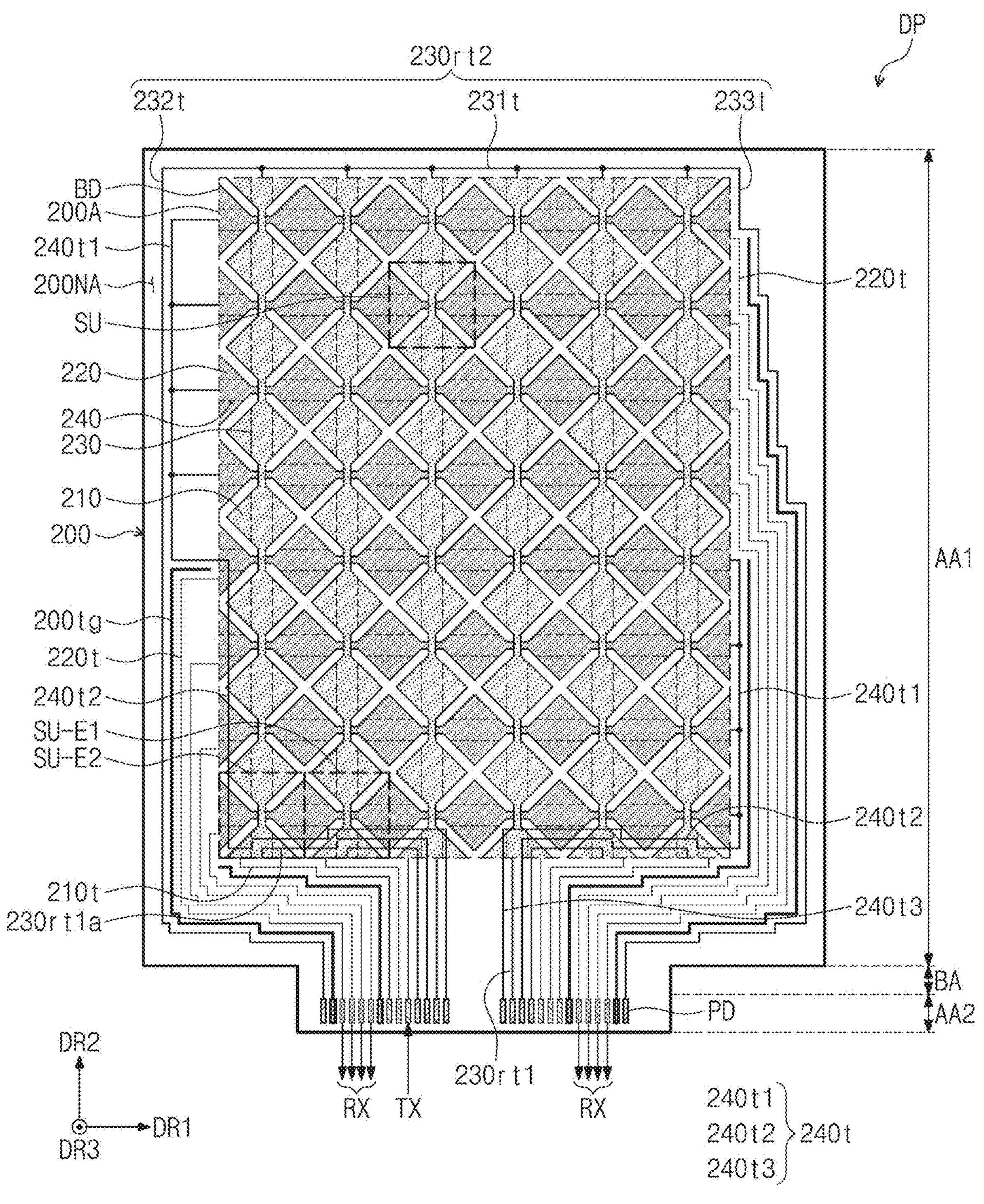
FIG. 25 is a view illustrating a first mode according to some embodiments of the present disclosure.

FIG. 25 is a view illustrating the first mode according to some embodiments of the present disclosure.

Referring to FIGS. 5, 24, and 25, the first mode MD1-*d* of the first operation mode DMD1 and the first mode MD1 of the second operation mode DMD2 may include a mutual capacitance detection mode. FIG. 25 is a view to illustrate the mutual capacitance detection mode in the first mode MD1-*d* of the first operation mode DMD1 and the first mode MD1 of the second operation mode DMD2.

In the mutual capacitance detection mode, the sensor driver 2000 may sequentially apply a transmission signal TX to the first electrodes 210 and may detect coordinates of the first input 2000 using a reception signal RX detected through the second electrodes 220. As an example, the sensor driver 2000 may sense a variation in mutual capacitance between the first electrodes 210 and the second electrodes 220 to calculate input coordinates.

FIG. 25 shows a structure in which the transmission signal TX is applied to one first electrode 210 and the reception signal RX is output from the second electrodes 220 as a representative example. The one first electrode 210 to which the transmission signal TX is provided is shown in bold in FIG. 25 to clearly display the signal. The sensor driver 2000 may sense a variation in capacitance between the first electrode 210 and each of the second electrodes 220 to detect the input coordinates of the first input 2000.

According to some embodiments, at least one of the first mode MD1-*d* of the first operation mode DMD1 or the first mode MD1 of the second operation mode DMD2 may further include a self-capacitance detection mode. The sensor driver 2000 may output driving signals to the first electrodes 210 and the second electrodes 220 in the self-capacitance detection mode and may sense a variation in capacitance of each of the first electrodes 210 and the second electrodes 220 to calculate the input coordinates. In the self-capacitance detection mode, the third electrodes 230 and the fourth electrodes 240 may be grounded, and the guard lines 200*tg* may receive the same signal as the signal applied to the trace lines adjacent thereto. Accordingly, a parasitic capacitance formed between the trace lines may be reduced (or prevented) by the guard lines 200*tg*.

In the first mode MD1-*d* of the first operation mode DMD1 and the first mode MD1 of the second operation mode DMD2, the third electrodes 230, the fourth electrodes 240, and the guard lines 200*tg* may be grounded. Therefore, a touch noise entering through the third electrodes 230 and the fourth electrodes 240 may be prevented or reduced.

Figure 26:
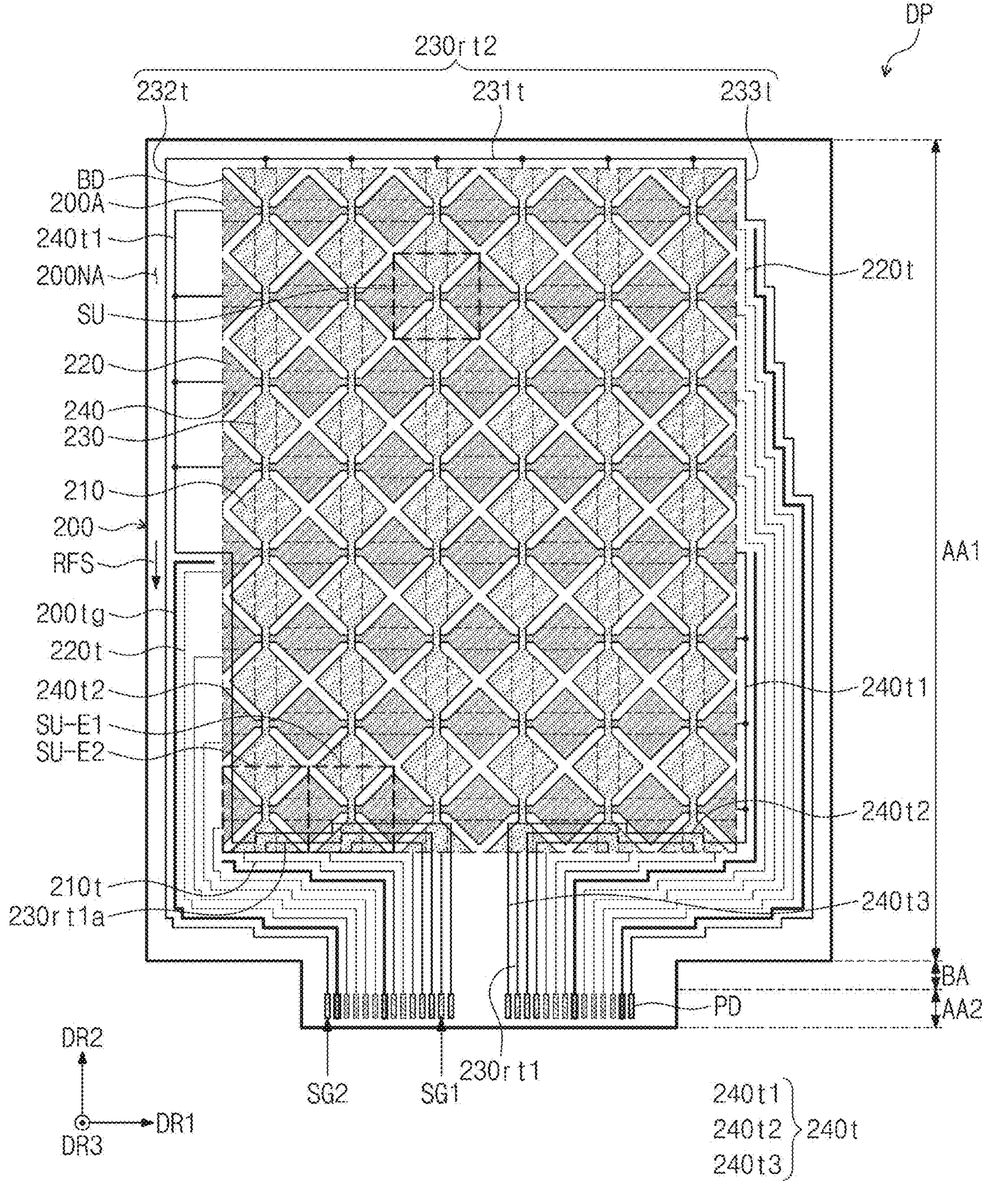
FIG. 26 is a view illustrating a second mode according to some embodiments of the present disclosure.
Figure 27A:
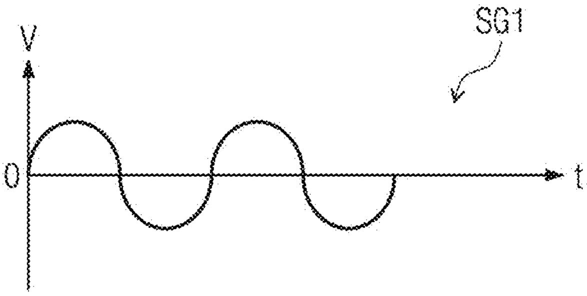
FIG. 27A is a view illustrating a waveform of a first signal according to some embodiments of the present disclosure.
Figure 27B:
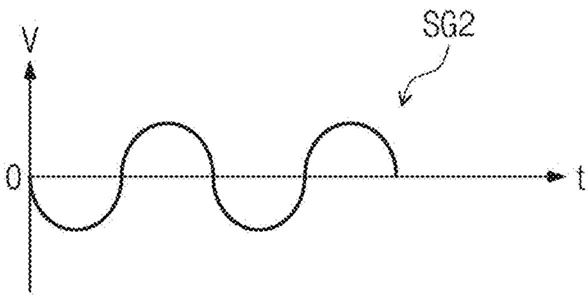
FIG. 27B is a view illustrating a waveform of a second signal according to some embodiments of the present disclosure.

FIG. 26 is a view illustrating the second mode according to some embodiments of the present disclosure. FIG. 27A is a graph illustrating a waveform of a first signal SG1 according to some embodiments of the present disclosure. FIG. 27B is a graph illustrating a waveform of a second signal SG2 according to some embodiments of the present disclosure.

Referring to FIGS. 26, 27A, and 27B, the second mode MD2 may include the charging driving mode. The charging driving mode may include a searching charging driving mode and a tracking charging driving mode.

The searching charging driving mode may be a driving mode before the location of the pen is sensed. Accordingly, the first signal SG1 or the second signal SG2 may be applied to entire channels included in the sensor layer 200. That is, an entire area of the sensor layer 200 may be scanned during the searching charging driving mode. When the pen PN (refer to FIG. 5) is sensed in the searching charging driving mode, the sensor layer 200 may be driven in the tracking charging driving mode. As an example, the sensor driver 2000 may sequentially output the first signal SG1 and the second signal SG2 to an area overlapping a point where the pen PN is sensed rather than the entire sensor layer 200 in the tracing charging driving mode.

In the charging driving mode, the sensor driver 2000 may apply the first signal SG1 to one pad and may apply the second signal SG2 to another pad. The second signal SG2 may be a reverse signal of the first signal SG1. As an example, the first signal SG1 may be a sinusoidal signal.

Because the first signal SG1 and the second signal SG2 are applied to at least two pads, a current RFS may flow a current path from one pad to another pad. In addition, because the first signal SG1 and the second signal SG2 are sinusoidal signals in reverse-phase with each other, a direction of the current RFS may be changed periodically. According to some embodiments of the present disclosure, the first signal SG1 and the second signal SG2 may be square wave signals in reverse-phase with each other.

When the first signal SG1 and the second signal SG2 are in reverse-phase with each other, noises caused by the first signal SG1 in the display layer 100 (refer to FIG. 4) may be cancelled out by noises caused by the second signal SG2. Accordingly, a flicker phenomenon occurring in the display layer 100 may be prevented or reduced, and a display quality of the display layer 100 may be relatively improved.

According to some embodiments, the first signal SG1 may be a sinusoidal signal. However, embodiments according to the present disclosure are not limited thereto or thereby, and the first signal SG1 may be a square wave signal. The second signal SG2 may have a certain constant voltage. As an example, the second signal SG2 may be a ground voltage. That is, the pad to which the second signal SG2 is applied may be considered grounded. In this case, the current RFS may flow from one pad to another pad. In addition, even though the another pad is grounded, the direction of the current RFS may be periodically changed because the first signal SG1 is the sinusoidal signal or the square wave signal.

FIG. 26 shows a structure in which the first signal SG1 is applied to one pad connected to one first auxiliary trace line 230*rt*1 and the second signal SG2 is applied to one pad connected to the second auxiliary trace line 230*rt*2. The current RFS may flow through the current path defined by one first auxiliary trace line 230*rt*1, one third electrode 230 connected to the one first auxiliary trace line 230*rt*1, and a portion of the second auxiliary trace line 230*rt*2. The current path may have a coil shape. Accordingly, a resonant circuit of the pen PN may be charged by a magnetic field formed by the current path in the charging driving mode of the second mode.

According to the present disclosure, the current path with a loop coil pattern may be implemented by components included in the sensor layer 200. Therefore, the electronic device 1000 (refer to FIG. 1A) may charge the pen PN using the sensor layer 200. Thus, because there is no need to add a separate component with a coil used to charge the pen PN, the thickness and weight of the electronic device 1000 may not increase, and the flexibility of the electronic device 1000 may not be deteriorated.

In the charging driving mode, the first electrodes 210, the second electrodes 220, the fourth electrodes 240, and the guard lines 200*tg* may be grounded, may receive a constant voltage, or may be electrically floated. In particular, the first electrodes 210, the second electrodes 220, the fourth electrodes 240, and the guard lines 200*tg* may be floated. In this case, the current RFS may not flow through the first electrodes 210, the second electrodes 220, the fourth electrodes 240, and the guard lines 200*tg*.

Figure 28:
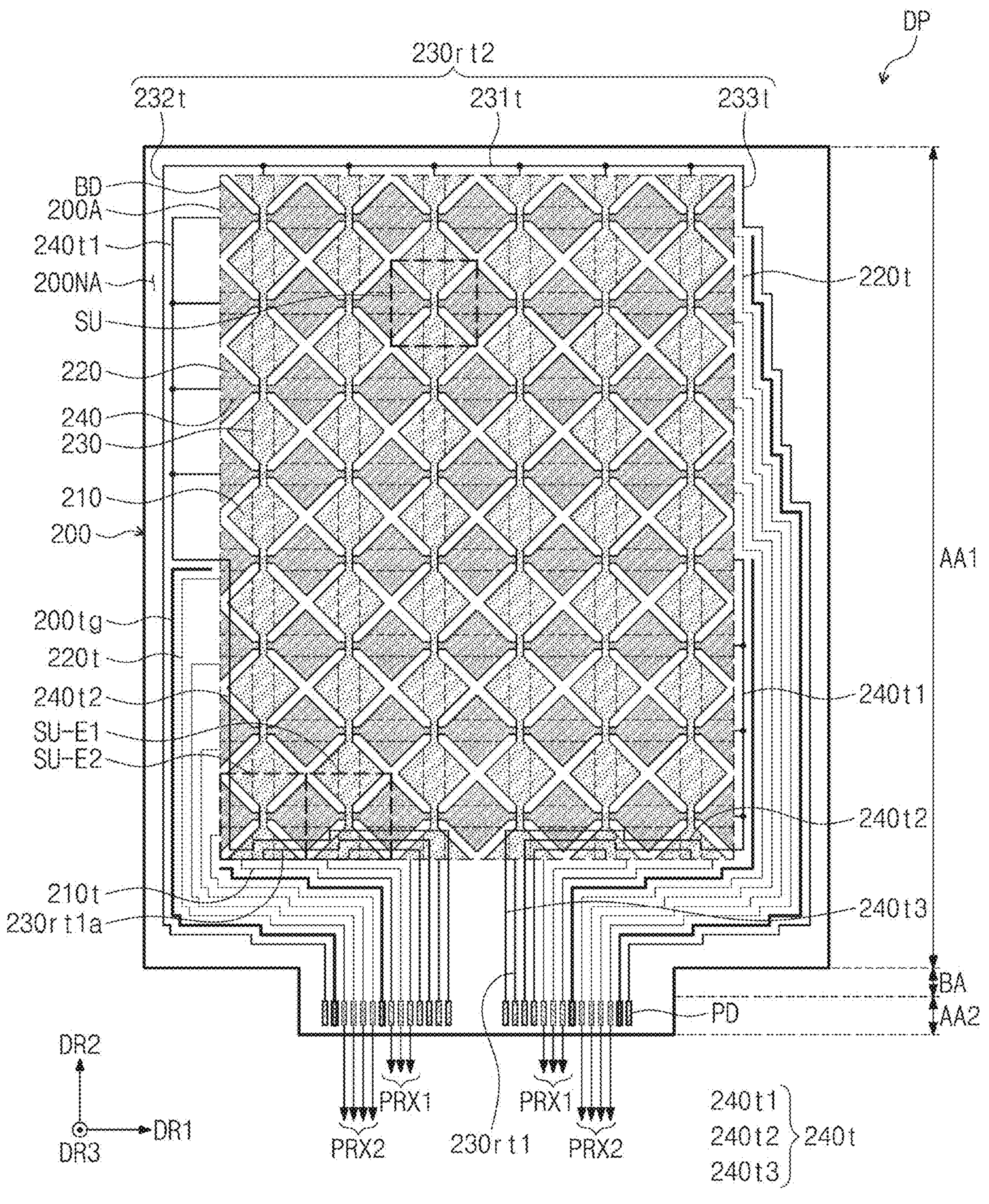
FIG. 28 is a view illustrating a second mode according to some embodiments of the present disclosure.
Figure 29:
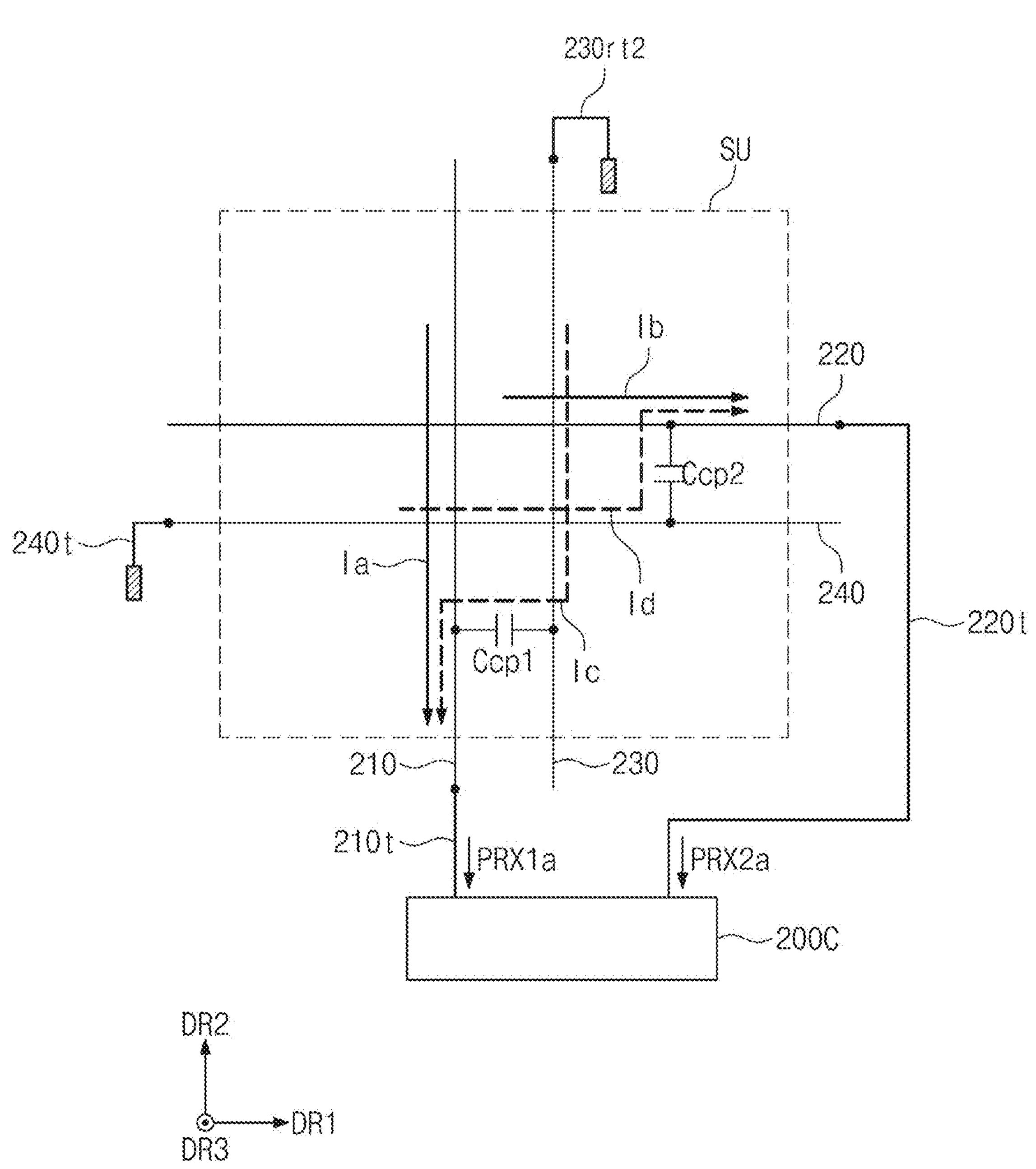
FIG. 29 is a view illustrating a second mode with respect to a sensing unit according to some embodiments of the present disclosure.

FIG. 28 is a view illustrating the second mode according to some embodiments of the present disclosure. FIG. 29 is a view illustrating the second mode with respect to the sensing unit according to some embodiments of the present disclosure.

Referring to FIGS. 28 and 29, the second mode may include a charging driving mode and a pen sensing driving mode. FIGS. 28 and 29 are views to illustrate the pen sensing driving mode. FIG. 29 shows one sensing unit SU through which first, second, third, and fourth induction currents Ia, Ib, Ic, and Id generated by the pen PN (refer to FIG. 5) flow.

In the pen sensing driving mode, the sensor driver 2000 may receive first reception signals PRX1 from first electrodes 210 and second reception signals PRX2 from second electrodes 220.

A routing direction of one electrode and a routing direction of another electrode overlapping the one electrode of a sensor layer 200 may be different from each other. As an example, a routing direction of the first electrode 210 may be different from a routing direction of a third electrode 230. In addition, the routing direction of the second electrode 220 may be different from a routing direction of a fourth electrode 240. As an example, as shown in FIG. 29, the first electrode 210 may be connected to a first trace line 210*t* at a lower side of the sensing unit SU, and the third electrode 230 may be connected to a second auxiliary trace line 230*rt*2 at an upper side of the sensing unit SU. The second electrode 220 may be connected to a second trace line 220*t* at a right side of the sensing unit SU, and the fourth electrode 240 may be connected to an auxiliary trace line 240*t* at a left side of the sensing unit SU.

An RLC resonant circuit of the pen PN may emit a magnetic field of resonant frequency while discharging charges charged therein. Due to the magnetic field provided from the pen PN, the first induction current Ia may be generated in the first electrode 210, and the second induction current Ib may be generated in the second electrode 220. In addition, the third induction current Ic may be generated in the third electrode 230, and the fourth induction current Id may be generated in the fourth electrode 240.

A first coupling capacitance Ccp1 may be formed between the third electrode 230 and the first electrode 210, and a second coupling capacitance Ccp2 may be formed between the fourth electrode 240 and the second electrode 220. The third induction current Ic may be supplied to the first electrode 210 through the first coupling capacitance Ccp1, and the fourth induction current Id may be supplied to the second electrode 220 through the second coupling capacitance Ccp2.

The sensor driver 2000 may receive a first reception signal PRX1*a* from the first electrode 210 based on the first induction current Ia and the third induction current Ic and may receive a second reception signal PRX2*a* from the second electrode 220 based on the second induction current Ib and the fourth induction current Id. The sensor driver 2000 may detect input coordinates of the pen PN based on the first reception signal PRX1*a* and the second reception signal PRX2*a*.

When the sensor driver 2000 receives the first reception signal PRX1*a* from the first electrode 210 and receives the second reception signal PRX2*a* from the second electrode 220, one ends of the third and fourth electrodes 230 and 240 may be floated. Accordingly, compensation for the sensing signal may be maximized by the coupling between the first electrode 210 and the third electrode 230 and the coupling between the second electrode 220 and the fourth electrode 240.

In addition, the other ends of the third and fourth electrodes 230 and 240 may be grounded or floated. Accordingly, the third induction current Ic and the fourth induction current Id may be sufficiently supplied to the first electrode 210 and the second electrode 220 by the coupling between the first electrode 210 and the third electrode 230 and the coupling between the second electrode 220 and the fourth electrode 240. In the case where all the one ends and the other ends of the third and fourth electrodes 230 and 240 are floated, even though the third electrode 230 is charged with charges in the charging driving mode, a potential may not be changed rapidly because the third and fourth electrodes 230 and 240 are floated during the pen sensing operation. Accordingly, noises caused by the change in the driving mode may be reduced.

Although aspects of some embodiments of the present disclosure have been described, it is understood that the present disclosure should not be limited to these embodiments but various changes and modifications can be made by one ordinary skilled in the art within the spirit and scope of embodiments according to the present disclosure as hereinafter claimed. Therefore, the disclosed subject matter should not be limited to any single embodiment described herein, and the scope of the present inventive concept shall be determined according to the attached claims.

What is claimed is:

1. An electronic device comprising:

a display layer comprising a display area and a non-display area adjacent to the display area; and a sensor layer on the display layer, the sensor layer comprising:

a plurality of first electrodes arranged in a first direction;

a plurality of second electrodes arranged in a second direction intersecting the first direction and intersecting the plurality of first electrodes;

a plurality of third electrodes arranged in the first direction and overlapping the plurality of first electrodes;

a plurality of fourth electrodes arranged in the second direction and overlapping the plurality of second electrodes; and an auxiliary trace line electrically connected to at least one fourth electrode among the plurality of fourth electrodes, wherein at least a portion of the auxiliary trace line overlaps the display area.

2. The electronic device of claim 1, wherein the auxiliary trace line comprises:

a first portion extending from the at least one fourth electrode and overlapping the non-display area;

a second portion extending from the first portion and overlapping the display area; and a third portion extending from the second portion and overlapping the non-display area.

3. The electronic device of claim 1, wherein at least one third electrode among the plurality of third electrodes comprises:

a first electrode portion;

a second electrode portion; and an auxiliary bridge electrically connected to the first electrode portion and the second electrode portion, the first electrode portion and the second electrode portion are spaced apart from each other with the auxiliary trace line interposed therebetween in the second direction, and the auxiliary trace line is insulated from the auxiliary bridge while intersecting the auxiliary bridge.

4. The electronic device of claim 1, wherein the auxiliary trace line comprises:

a first layer line; and a second layer line on the first layer line and electrically connected to the first layer line, wherein at least one third electrode among the plurality of third electrodes comprises:

a first electrode portion;

a second electrode portion; and an auxiliary bridge electrically connected to the first electrode portion and the second electrode portion, the first electrode portion and the second electrode portion are spaced apart from each other with the first layer line interposed between, the first layer line is insulated from the auxiliary bridge while intersecting the auxiliary bridge, at least one first electrode among the first electrodes comprises a first electrode pattern portion, a second electrode pattern portion, and an auxiliary bridge pattern electrically connected to the first electrode pattern portion and the second electrode pattern portion, the first electrode pattern portion is spaced apart from the second electrode pattern portion with the second layer line interposed therebetween, and the second layer line is insulated from the auxiliary bridge pattern while intersecting the auxiliary bridge pattern.

5. The electronic device of claim 1, wherein a length in the second direction of at least one third electrode among the plurality of third electrodes is shorter than a length in the second direction of another third electrode among the plurality of third electrodes.

6. The electronic device of claim 5, wherein the at least one third electrode is spaced apart from the non-display area with the auxiliary trace line interposed therebetween in a plan view.

7. The electronic device of claim 5, wherein the sensor layer further comprises an auxiliary electrode bridge electrically connected to the at least one third electrode and insulated from the auxiliary trace line while intersecting the auxiliary trace line.

8. The electronic device of claim 7, wherein the auxiliary trace line comprises a first layer line and a second layer line on the first layer line and electrically connected to the first layer line, the auxiliary electrode bridge is insulated from the first layer line while intersecting the first layer line, and the second layer line comprises a first line portion and a second line portion spaced apart from the first line portion with the auxiliary electrode bridge interposed therebetween.

9. The electronic device of claim 1, wherein the auxiliary trace line is connected to the at least one fourth electrode in an area overlapping the display area.

10. The electronic device of claim 9, wherein the sensor layer further comprises an additional auxiliary trace line that electrically connects the at least one fourth electrode to at least another fourth electrode among the plurality of fourth electrodes, and the additional auxiliary trace line overlaps the non-display area.

11. The electronic device of claim 9, wherein the auxiliary trace line is electrically connected to at least another fourth electrode among the plurality of fourth electrodes in the area overlapping the display area.

12. The electronic device of claim 1, wherein the sensor layer further comprises a plurality of first auxiliary trace lines electrically connected to the plurality of third electrodes, and a portion of at least one first auxiliary trace line of the plurality of first auxiliary trace lines overlaps the display area.

13. The electronic device of claim 12, wherein a length in the second direction of at least one third electrode electrically connected to the at least one first auxiliary trace line among the plurality of third electrodes is equal to or smaller than a length in the second direction of another third electrode among the plurality of third electrodes.

14. The electronic device of claim 12, wherein the auxiliary trace line is between the at least one first auxiliary trace line and the non-display area in a plan view.

15. The electronic device of claim 12, wherein the at least one first auxiliary trace line is between the auxiliary trace line and the non-display area in a plan view.

16. The electronic device of claim 15, wherein another fourth electrode among the plurality of fourth electrodes comprises a first electrode portion, a second electrode portion, and an auxiliary bridge electrically connected to the first electrode portion and the second electrode portion, the first electrode portion and the second electrode portion are spaced apart from each other with the auxiliary trace line interposed therebetween in the first direction, and the auxiliary trace line is insulated from the auxiliary bridge while intersecting the auxiliary bridge.

17. The electronic device of claim 1, wherein the sensor layer further comprises:

a plurality of first trace lines electrically connected to the plurality of first electrodes; and a plurality of second trace lines electrically connected to the plurality of second electrodes, and the auxiliary trace line is insulated from at least one second trace line among the plurality of second trace lines while intersecting the at least one second trace line.

18. The electronic device of claim 17, wherein the auxiliary trace line comprises:

a first portion extending from the at least one of the plurality of fourth electrodes and overlapping the non-display area; and a second portion extending from the first portion to the display area, and the at least one second trace line is insulated from the second portion while intersecting the second portion.

19. The electronic device of claim 1, wherein the auxiliary trace line overlaps at least one first electrode among the plurality of first electrodes, the at least one first electrode comprises a first mesh line extending in a first intersecting direction and a second mesh line extending in a second intersecting direction intersecting the first intersecting direction, and the auxiliary trace line comprises a third mesh line extending in the first intersecting direction and a fourth mesh line extending in the second intersecting direction.

20. The electronic device of claim 19, wherein the first mesh line intersects and overlaps the fourth mesh line in a plan view, and the second mesh line intersects and overlaps the third mesh line in the plan view.

21. The electronic device of claim 19, wherein the third mesh line comprises:

an end portion connected to the fourth mesh line; and an extension portion extending from the end portion to the first intersecting direction, and the extension portion does not overlap the first mesh line.

22. The electronic device of claim 11, wherein each of the plurality of first electrodes comprises:

a plurality of sensing patterns spaced apart from each other in the second direction; and a plurality of bridge patterns electrically connected to the plurality of sensing patterns, and the auxiliary trace line is closer to the display layer than the plurality of sensing patterns.

23. An electronic device comprising:

a display layer comprising a display area and a non-display area adjacent to the display area; and a sensor layer on the display layer, the sensor layer comprising:

a plurality of first electrodes arranged in a first direction;

a plurality of second electrodes arranged in a second direction intersecting the first direction and intersecting the plurality of first electrodes;

a sensing auxiliary electrode comprising a plurality of auxiliary electrodes extending in the first direction and arranged in the second direction; and an auxiliary trace line electrically connected to the sensing auxiliary electrode, wherein a first portion of the auxiliary trace line extends from the sensing auxiliary electrode and overlaps the non-display area, and a second portion of the auxiliary trace line extends from the first portion and overlaps the display area.

24. The electronic device of claim 23, wherein the sensor layer further comprises an additional auxiliary trace line that electrically connects the plurality of auxiliary electrodes and overlaps the non-display area.

25. The electronic device of claim 23, wherein the auxiliary trace line further comprises:

a third portion extending from the second portion and overlapping the non-display area.

26. The electronic device of claim 23, wherein the sensor layer further comprises:

a plurality of charging electrodes extending in the second direction and arranged in the first direction;

a plurality of first trace lines electrically connected to the plurality of first electrodes;

a plurality of second trace lines electrically connected to the plurality of second electrodes; and a plurality of first auxiliary trace lines electrically connected to the plurality of charging electrodes.

27. The electronic device of claim 26, wherein a portion of at least one first auxiliary trace line among the plurality of first auxiliary trace lines overlaps the display area, and the portion of the at least one first auxiliary trace line is between the auxiliary trace line and the non-display area.

28. The electronic device of claim 26, wherein the sensor layer further comprises a second auxiliary trace line electrically connected to the plurality of charging electrodes, the second auxiliary trace line surrounds an area in which the plurality of first trace lines, the plurality of second trace lines, the auxiliary trace line, and the plurality of first auxiliary trace lines are arranged.

29. The electronic device of claim 23, wherein the auxiliary trace line overlaps at least one first electrode among the plurality of first electrodes, the at least one first electrode comprises a first mesh line extending in a first intersecting direction and a second mesh line extending in a second intersecting direction intersecting the first intersecting direction, the auxiliary trace line comprises a third mesh line extending in the first intersecting direction and a fourth mesh line extending in the second intersecting direction, the first mesh line overlaps and intersects the fourth mesh line in a plan view, and the second mesh line overlaps and intersects the third mesh line in the plan view.

30. An electronic device comprising:

a sensor layer comprising a sensing area and a peripheral area adjacent to the sensing area; and a sensor driver driving the sensor layer and configured to be selectively driven in a first mode in which a touch input is sensed or a second mode in which a pen input is sensed, the sensor layer comprising:

a plurality of first electrodes on the sensor layer;

a plurality of second electrodes on the sensor layer;

a sensing auxiliary electrode on the sensor layer and comprising a plurality of auxiliary electrodes; and an auxiliary trace line electrically connected to the plurality of auxiliary electrodes and partially in the sensing area, wherein the plurality of auxiliary electrodes are floated or grounded in the first mode.

31. The electronic device of claim 30, wherein the auxiliary trace line comprises:

a first portion extending from the sensing auxiliary electrode and overlapping the peripheral area;

a second portion extending from the first portion and overlapping the sensing area; and a third portion extending from the second portion and overlapping the peripheral area.

32. The electronic device of claim 30, wherein the auxiliary trace line is connected to the sensing auxiliary electrode in the sensing area.

33. The electronic device of claim 30, wherein the auxiliary trace line overlaps at least one first electrode among the plurality of first electrodes, the at least one first electrode comprises:

a first mesh line extending in a first intersecting direction; and a second mesh line extending in a second intersecting direction intersecting the first intersecting direction, wherein the auxiliary trace line comprises:

a third mesh line extending in the first intersecting direction; and a fourth mesh line extending in the second intersecting direction, the first mesh line overlaps and intersects the fourth mesh line in a plan view, and the second mesh line overlaps and intersects the third mesh line in the plan view.

34. The electronic device of claim 30, wherein the second mode comprises a charging driving mode and a pen sensing driving mode, and the sensing auxiliary electrode is floated in the pen sensing driving mode.

35. The electronic device of claim 30, wherein the electronic device is a mobile phone.

* * * * *